(12) United States Patent
Poojary et al.

(10) Patent No.: US 10,942,815 B2
(45) Date of Patent: Mar. 9, 2021

(54) STORAGE CONTROL SYSTEM MANAGING FILE-LEVEL AND BLOCK-LEVEL STORAGE SERVICES, AND METHODS FOR CONTROLLING SUCH STORAGE CONTROL SYSTEM

(71) Applicants: HITACHI, LTD., Tokyo (JP); Hitachi Vantara LLC, Santa Clara, CA (US)

(72) Inventors: Sathisha Poojary, Reading (GB); Christopher James Aston, Hughenden Valley (GB); Graham Ellement, Frimley (GB); Simon Carl Johnson, Ascot (GB); Hiroyuki Mitome, Tokyo (JP); Naoki Inoue, Tokyo (JP); Norimitsu Hayakawa, Tokyo (JP); Yukari Hatta, Tokyo (JP); Yasuo Hirata, Tokyo (JP); Ryosuke Matsubara, Tokyo (JP)

(73) Assignees: HITACHI, LTD., Tokyo (JP); HITACHI VANTARA LLC, Santa Clara, CA (US)

( * ) Notice: Subject to any disclaimer, the term of this patent is extended or adjusted under 35 U.S.C. 154(b) by 383 days.

(21) Appl. No.: 15/572,510

(22) PCT Filed: Jul. 9, 2015

(86) PCT No.: PCT/EP2015/065762
§ 371 (c)(1),
(2) Date: Nov. 8, 2017

(87) PCT Pub. No.: WO2017/005330
PCT Pub. Date: Jan. 12, 2017

(65) Prior Publication Data
US 2018/0137013 A1    May 17, 2018

(51) Int. Cl.
*G06F 11/14* (2006.01)
*G06F 16/13* (2019.01)
(Continued)

(52) U.S. Cl.
CPC .......... *G06F 11/1456* (2013.01); *G06F 3/061* (2013.01); *G06F 3/064* (2013.01);
(Continued)

(58) Field of Classification Search
CPC .... G06F 11/1456; G06F 3/0689; G06F 3/061; G06F 3/0664; G06F 3/00607;
(Continued)

(56) References Cited

U.S. PATENT DOCUMENTS

| 6,826,615 B2 | 11/2004 | Barrall et al. |
| 7,457,822 B1 | 11/2008 | Barrall et al. |

(Continued)

FOREIGN PATENT DOCUMENTS

| WO | 01/28179 A2 | 4/2001 |
| WO | 2012/071335 A1 | 5/2012 |

OTHER PUBLICATIONS

Li et al., "An energy efficient backup scheme with low inrush current for nonvolatile SRAM in energy harvesting sensor nodes"—Proceedings of the 2015 Design, Automation & Test in Europe Conference & ExhibitionMarch, pp. 7-12 (Year: 2015).*

(Continued)

*Primary Examiner* — Mark D Featherstone
*Assistant Examiner* — Kweku William Halm
(74) *Attorney, Agent, or Firm* — Mattingly & Malur, PC

(57) ABSTRACT

A storage control system to provide file-level storage and block-level storage services. The storage control system has a computer system including a second I/O unit configured to receive block-level storage related requests, a processor unit, a first memory unit, and a storage unit; and a programmable (Continued)

logic device including a first I/O unit configured to receive file-level storage related requests, an interface unit configured to communicate with the computer system, one or more programmable hardware-implemented processing units and for processing of file-level storage related requests, and a second memory unit. The software components executed on the processor unit include a block-level storage management component and a virtualization management component; and a virtual machine managed by the virtualization management component executes a file-level management component to communicate with the programmable hardware-implemented processing units of the programmable logic device and to manage file-level storage services related to file-level storage related requests.

13 Claims, 30 Drawing Sheets

(51) Int. Cl.
*G06F 3/06* (2006.01)
*G06F 9/455* (2018.01)

(52) U.S. Cl.
CPC ............ *G06F 3/067* (2013.01); *G06F 3/0607* (2013.01); *G06F 3/0619* (2013.01); *G06F 3/0643* (2013.01); *G06F 3/0664* (2013.01); *G06F 3/0683* (2013.01); *G06F 3/0689* (2013.01); *G06F 9/45558* (2013.01); *G06F 11/1464* (2013.01); *G06F 11/1469* (2013.01); *G06F 16/13* (2019.01); *G06F 2009/45583* (2013.01); *G06F 2201/805* (2013.01)

(58) Field of Classification Search
CPC ........ G06F 3/067; G06F 3/0643; G06F 16/13; G06F 11/1469; G06F 11/1464; G06F 9/45558; G06F 3/0683; G06F 3/0619; G06F 3/064; G06F 2201/805; G06F 2009/45583

See application file for complete search history.

(56) References Cited

U.S. PATENT DOCUMENTS

| | | | |
|---|---|---|---|
| 8,180,897 B2 | 5/2012 | Barrall et al. | |
| 8,224,877 B2 | 7/2012 | Barrall et al. | |
| 8,738,570 B2 | 5/2014 | Picken et al. | |
| 2004/0030668 A1* | 2/2004 | Pawlowski | G06F 3/0607 |
| 2005/0044162 A1 | 2/2005 | Liang et al. | |
| 2005/0210191 A1* | 9/2005 | Kobayashi | G06F 3/0625 |
| | | | 711/114 |
| 2006/0080515 A1* | 4/2006 | Spiers | G06F 11/1441 |
| | | | 711/162 |
| 2008/0276040 A1* | 11/2008 | Moritoki | G06F 12/0804 |
| | | | 711/113 |
| 2011/0276963 A1* | 11/2011 | Wu | H04L 67/1097 |
| | | | 718/1 |
| 2013/0007436 A1 | 1/2013 | Bookman et al. | |
| 2013/0055249 A1 | 2/2013 | Vaghani et al. | |
| 2015/0039925 A1* | 2/2015 | Huang | G06F 1/3212 |
| | | | 713/323 |
| 2015/0199367 A1* | 7/2015 | Hammer | G06F 16/125 |
| | | | 707/654 |

OTHER PUBLICATIONS

Google Search (Year: 2007).*
International Search Report of PCT/EP2015/065762 dated Mar. 31, 2016.

* cited by examiner

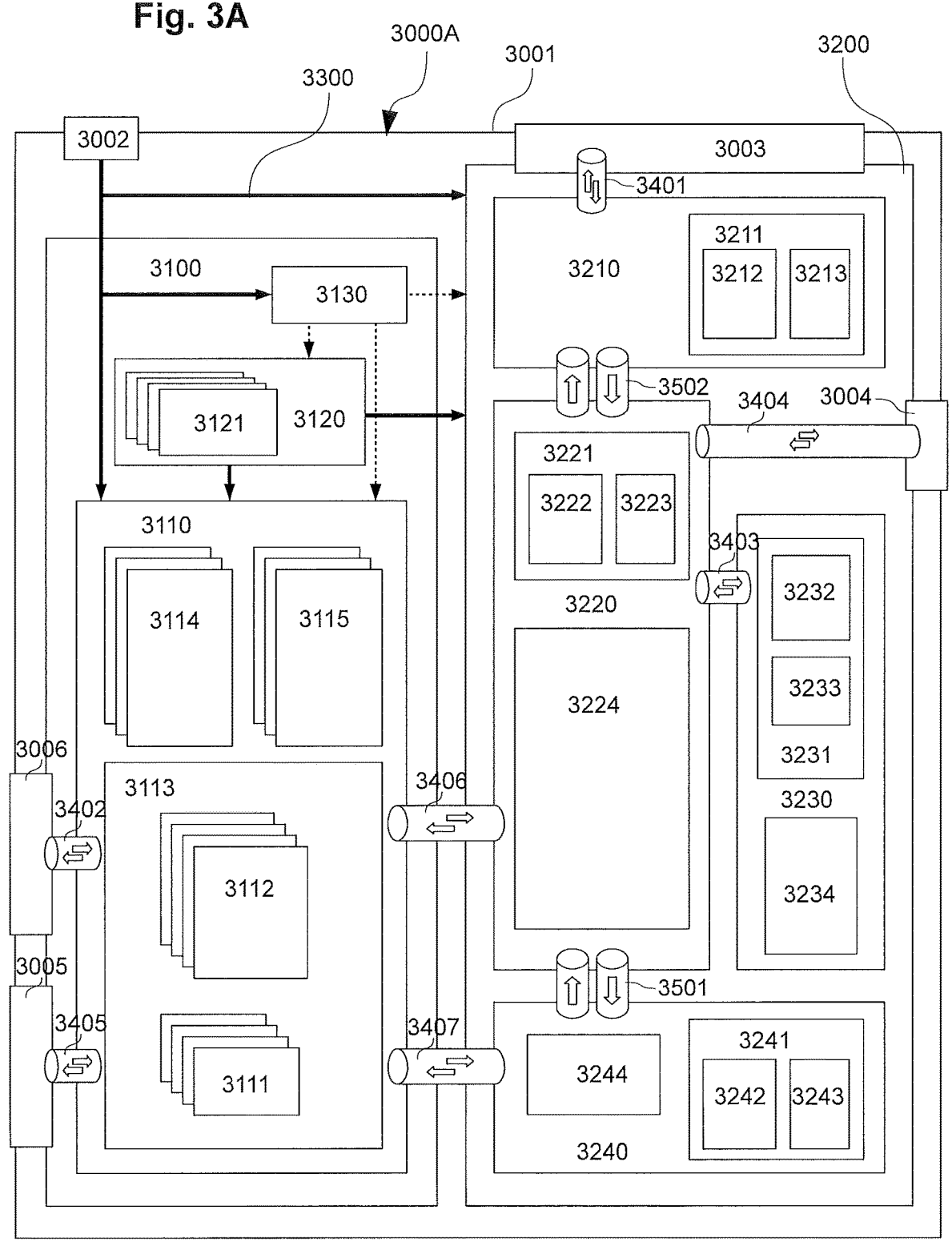

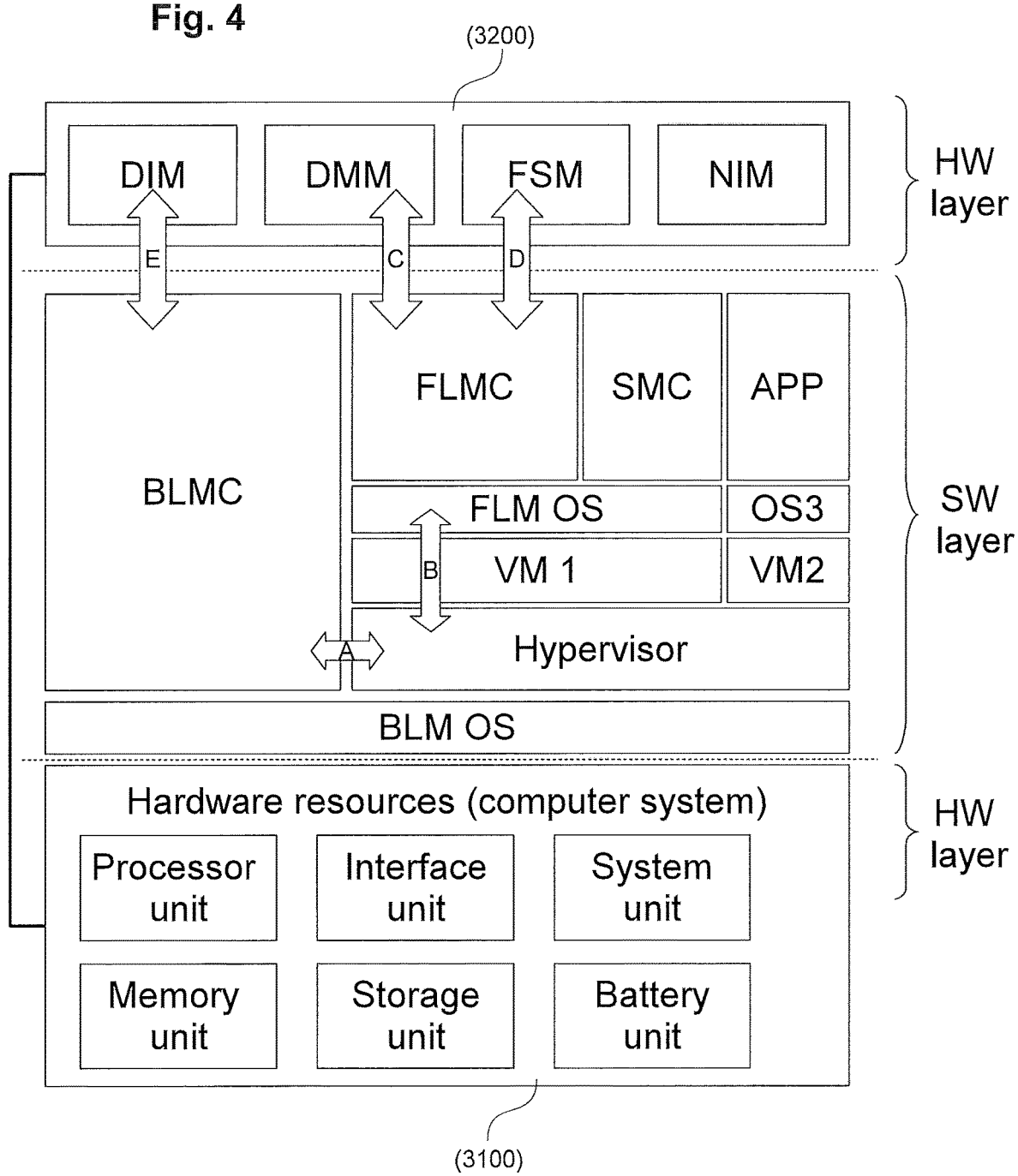

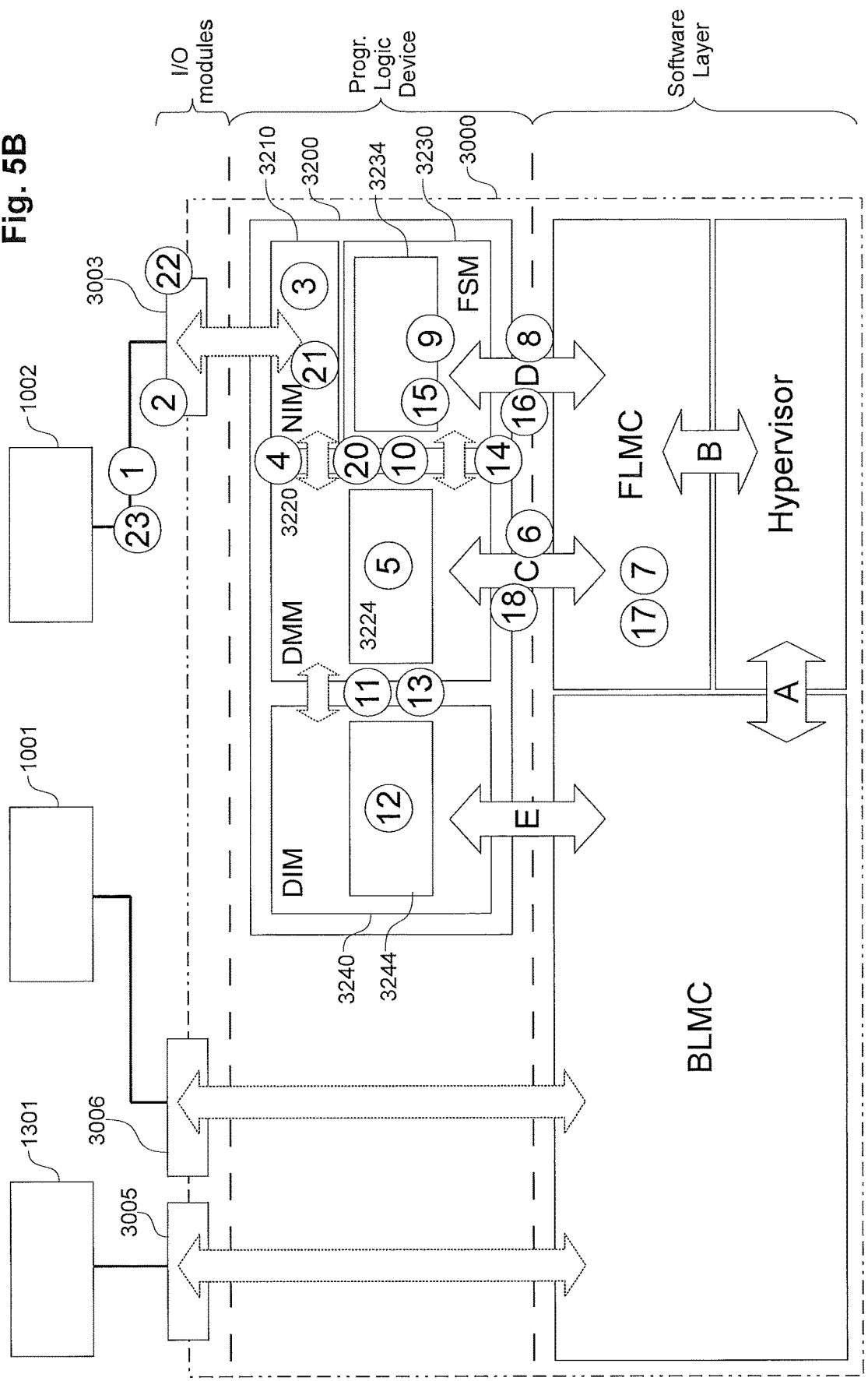

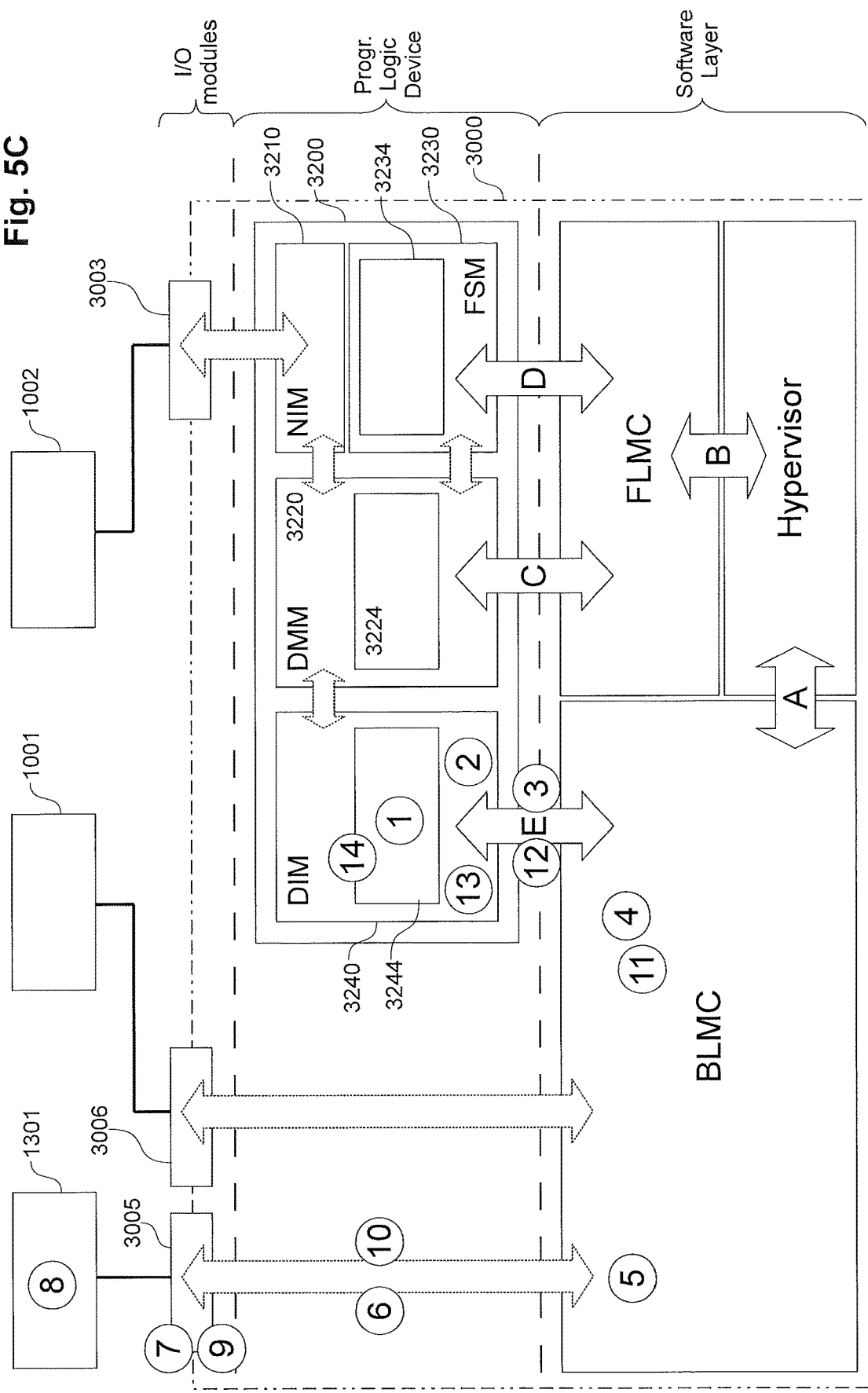

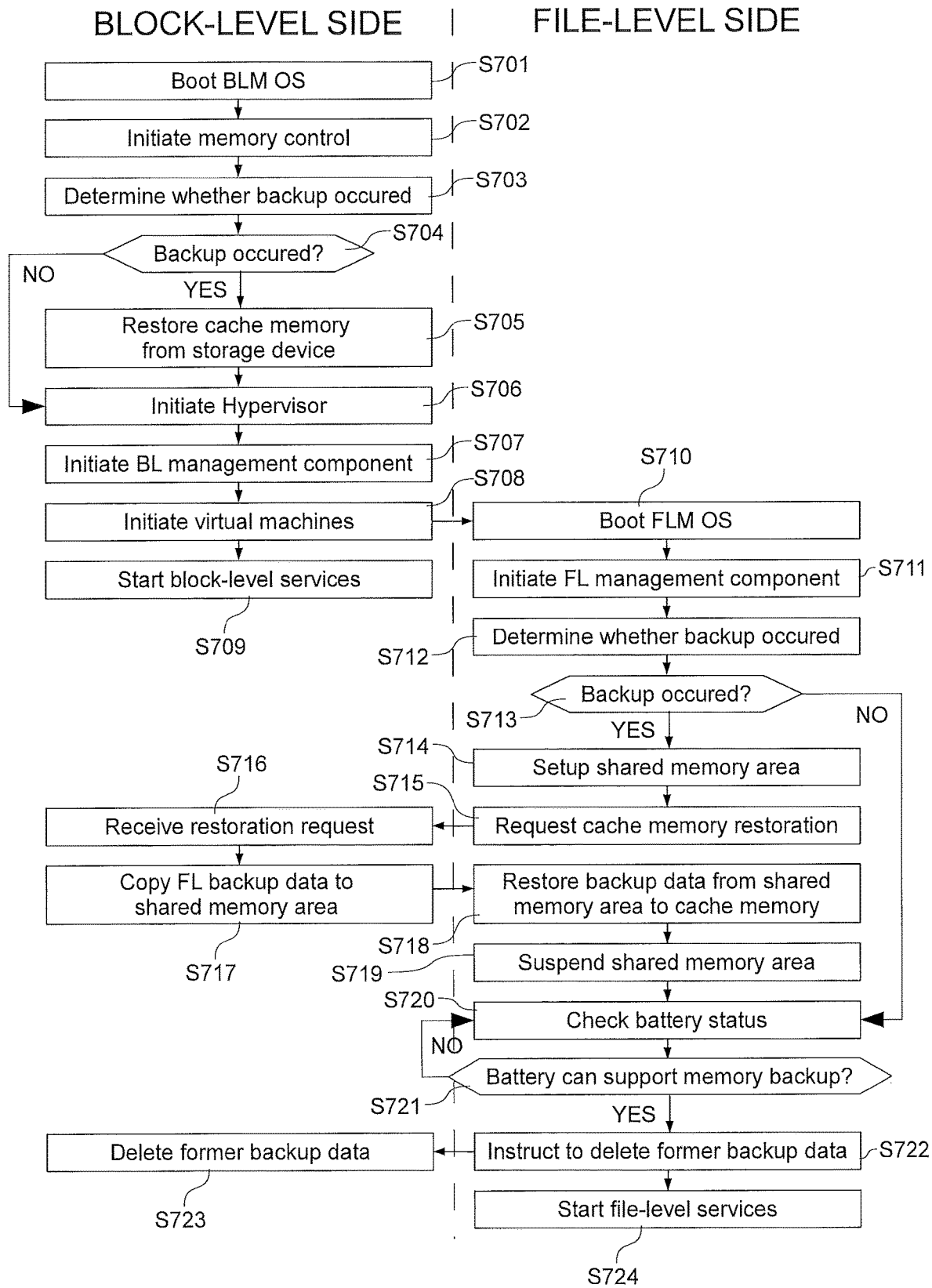

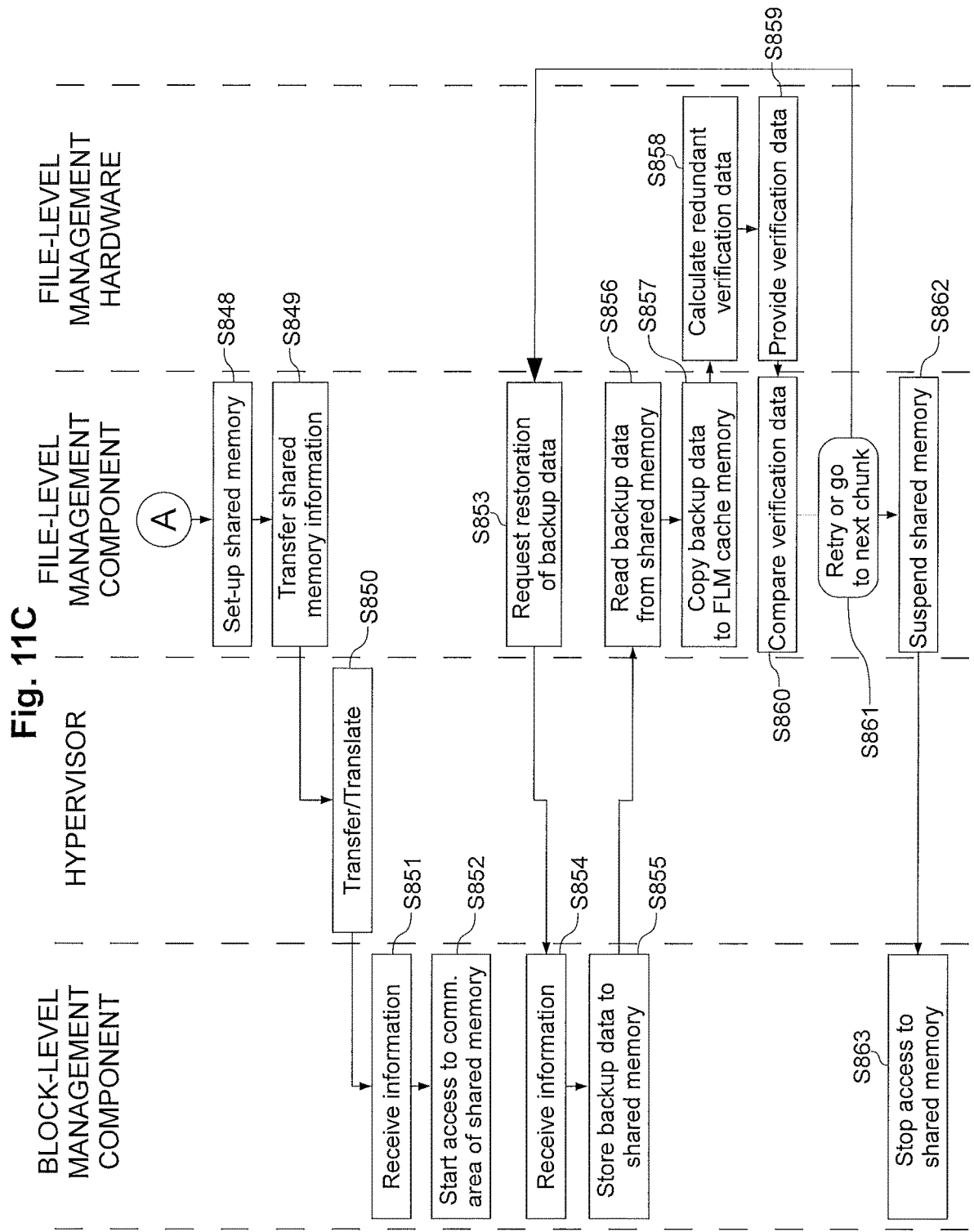

STORAGE CONTROL SYSTEM MANAGING FILE-LEVEL AND BLOCK-LEVEL STORAGE SERVICES, AND METHODS FOR CONTROLLING SUCH STORAGE CONTROL SYSTEM

The present disclosure relates to a storage control system being configured to provide both of file-level storage service(s) and block-level storage service(s) to one or more host computers connectable to the storage control system.

Further, the present disclosure relates to methods of control of such storage control system including, for example, a method for controlling memory data backup and memory data restoration in case of power failure.

Other aspects may relate to a computer system configured to operate software components including a non-volatile memory control component and a virtualization component providing and managing one or more virtual machines, one of the virtual machines operating an application, and to methods of control of such computer system including, for example, a method for controlling memory data backup and memory data restoration in case of power failure.

BACKGROUND

In the prior art of storage systems, it is known to manage storage environments at a file-level (i.e. relating to files and directories of one of more file systems, e.g. managed in directory and file trees) or at a block-level (i.e. relating to data blocks as stored on storage devices and referring to logical or physical block addresses of data blocks), wherein file-level related I/O communication messages are typically exchanged between host computers and connected file system servers, and block-related I/O communication messages are typically exchanged between storage controllers and connected file system servers, or storage controllers and connected storage apparatuses.

However, as system structures are becoming more and more demanding and compact, efficient, reliable and scalable solutions are desired, it has been a desire to provide unified storage solutions in which one apparatus or system is provided to manage both of file-level services and block-level services, depending on the requirements of the respectively connected client.

In view of the above, it is one of the objects to provide a compact, efficient, reliable and scalable unified storage system in which one apparatus/system is provided to manage both of file-level services and block-level services, including efficient and reliable data backup and data restoration handling.

SUMMARY

According to aspects and some embodiments, there is proposed a storage control system, a control method for controlling such storage control system, and a related computer program product according to the respective independent claims. Dependent claims and further below described aspects relate to some of the exemplary preferred embodiments.

According to an aspect and some embodiments, there may be provided a storage control system being configured to provide both of file-level storage service(s) and block-level storage service(s) to one or more host computers connectable to the storage control system.

The storage control system may comprise a computer system including a second I/O unit for receiving block-level storage related requests from the one or more host computers, a processor unit configured to execute a first operating system and further software components executed on the first operating system, a first memory unit to temporarily store data for processing by the processor unit, and/or a storage unit including one or more storage devices to store user data.

The storage control system may comprise a programmable logic device interfacing with the computer system via an interface unit, the programmable logic device including a first I/O unit configured to receive file-level storage related requests from the one or more host computers, one or more programmable hardware-implemented processing units for processing of file-level storage related requests received from the one or more host computers by the first I/O unit, and/or a second memory unit to temporarily store data required by the programmable hardware-implemented processing units and user data.

The software components executed on the first operating system of the processor unit may include a block-level storage management component (block-level storage management software) configured to manage block-level storage services related to block-level storage related requests and/or a virtualization management component (virtualization management software, e.g. a hypervisor or hypervisor environment) configured to manage one or more virtual machines on the computer system.

Exemplarily one of the virtual machines managed by the virtualization management component is configured to execute a second operating system and/or a file-level storage management component (file-level storage management software) executed on the second operating system, the file-level storage management component being configured to communicate with the programmable hardware-implemented processing units of the programmable logic device and to manage file-level storage services related to file-level storage related requests.

Also, in other aspects, the file-level storage management component may alternatively be operated on the first operating system or on another operating system running in parallel to the first operating system on the processor unit of the computer system, e.g. on a parallel core or parallel cores of the processor unit in a multi-core environment.

In other words, according to an aspect and some embodiments, there may be provided a storage control system being configured to provide both of file-level storage service(s) and block-level storage service(s) to one or more host computers connectable to the storage control system The storage control system may be comprising: a programmable logic device including (i) a first I/O unit configured to receive file-level storage related requests from the one or more host computers, and/or (ii) one or more programmable hardware-implemented processing units configured to process file-level storage related requests received from the one or more host computers by the first I/O unit and/or to create first block-level storage related requests corresponding to the file-level storage related requests; and/or a computer system configured to communicate with the programmable logic device (e.g. by interfacing with an interface unit of the programmable logic device) and/or to manage both of the file-level storage services and the block-level storage services, the computer system preferably including (iii) a second I/O unit configured to receive second block-level storage related requests from the one or more host computers and (iv) a processor unit configured to execute a first operating system and further software components executed on the first operating system.

An interface unit of the programmable logic device may preferably be configured to transmit first block-level storage related requests converted from file-level storage related requests received from the one or more host computers by the first I/O unit of the programmable logic device to the computer system. Accordingly, the computer system may be configured to receive first block-level storage related requests from the programmable logic device via the interface unit and second block-level storage related requests from the host computers via the second I/O unit.

The software components executed on the first operating system of the processor unit may include a block-level storage management software configured to manage the block-level storage services related to the first block-level storage related requests sent/received by/from the programmable logic device and the second block-level storage related requests sent/received by/from second I/O unit, and/or the software component may further include a virtualization management software configured to manage one or more virtual machines on the computer system and/or to communicate with the block-level storage management software.

One of the virtual machines managed by the virtualization management software may be configured to execute a second operating system and a file-level storage management software executed on the second operating system, the file-level storage management software being configured to communicate with the programmable hardware-implemented processing units of the programmable logic device and to manage the programmable hardware-implemented processing units of the programmable logic device e.g. to provide the file-level storage services related to file-level storage related requests.

The virtualization management software may be configured to communicate with each of the block-level storage management software and the file-level storage management software, and the block-level storage management software and the file-level storage management software may be configured to indirectly communicate with each other via the virtualization management software, e.g. in that the virtualization management software is configured to translate and/or transfer messages such as requests or responses from the block-level storage management software to the file-level storage management software or vice versa.

In some exemplary aspects or embodiments, the file-level storage management software, the programmable logic device and/or the at least one of the one or more programmable hardware-implemented processing units of the programmable logic device may be configured to convert the file-level storage related requests received by the first I/O unit to the corresponding first block-level storage related requests on the basis of file system metadata, wherein an interface unit of the programmable logic device may preferably be configured to transmit the first block-level storage related requests converted from corresponding file-level storage related requests to the computer system.

In some exemplary aspects or embodiments, the block-level storage management software may be configured to communicate with at least one of the one or more programmable hardware-implemented processing units of the programmable logic device through the interface unit of the programmable logic device.

In some exemplary aspects or embodiments, the block-level storage management software may be configured to manage block-level storage services related to first block-level storage related requests received through the interface unit of the programmable logic device and/or to manage block-level storage services related to second block-level storage related requests received from the one or more host computers via the second I/O unit.

In some exemplary aspects or embodiments, the storage control system may preferably further comprise a battery unit configured to supply electric energy to the computer system and/or the programmable logic device in case of an external power failure.

Preferably, in case of an external power failure and/or when being supplied with electric energy from the battery unit and when the computer system includes a first memory unit to temporarily store data and a storage unit having one or more storage devices and when the programmable logic device includes a second memory unit to temporarily store data, the storage control system may be configured to perform a data backup process which may include copying data stored in the first memory unit of the computer system (e.g. as first backup data) and/or data stored in the second memory unit of the programmable logic device (e.g. as second backup data) to one or more storage devices of the storage unit of the computer system.

Further preferably, the storage control system may be configured to shut down after the data backup process is completed, in particular after data stored in the first memory unit of the computer system and/or data stored in the second memory unit of the programmable logic device is fully copied to the one or more storage devices of the storage unit of the computer system.

In some exemplary aspects or embodiments, copying data in the data backup process may include copying data stored in the second memory unit of the programmable logic device to the first memory unit of the computer system, and thereafter copying data stored in the first memory unit of the computer system, which preferably includes the data (backup data) copied from the second memory unit, to the one or more storage devices of the storage unit of the computer system.

For example, copying data in the data backup process may include copying the first backup data from the second memory unit of the programmable logic device to the first memory unit of the computer system, and thereafter copying the first backup data and the second backup data from the first memory unit of the computer system to the one or more storage devices of the storage unit of the computer system.

Further preferably, the storage control system may be configured to shut down after data stored in the first memory unit of the computer system, which preferably includes the data (second backup data) copied from the second memory unit, is fully copied to the one or more storage devices of the storage unit of the computer system.

In some exemplary aspects or embodiments, the storage control system (in particular, e.g., the computer system) may further comprise a power failure detection unit configured to detect an occurrence of an external power failure.

Preferably, in some of the above exemplary aspects or embodiments, the programmable logic device may be configured, when the power failure detection unit detects an occurrence of an external power failure, to operate in a low power mode including deactivation of components not involved in the execution of the data backup process. Exemplarily, a step of switching to the low power mode may include deactivating of the I/O unit, the interface unit, and/or one or more of the one or more programmable hardware-implemented processing units. Preferably, the low power mode includes operating at least the second memory unit, and preferably at least one of the programmable hardware-implemented processing units controlling the second memory unit.

Preferably, in some of the above exemplary aspects or embodiments, the computer system may be configured, when the power failure detection unit detects an occurrence of an external power failure, to reboot to a data backup state in which the processor unit is configured to execute a data backup process environment configured to perform the data backup process, e.g. as part of a system BIOS function or as a firmware component running on the computer system after the power failure reboot.

Preferably, the computer system is configured, upon being rebooted to the data backup state, to obtain data stored in the second memory unit of the programmable logic device, e.g. including the second backup data, in particular preferably via direct memory access, e.g. via direct memory access communication between the data backup process environment, the first memory unit and/or the second memory unit.

In some exemplary aspects or embodiments, the programmable logic device, in particular one or more of the one or more programmable hardware-implemented processing units, may be configured to generate redundant verification data for the data stored in the second memory unit of the programmable logic device, in particular for the second backup data or at least parts thereof, or, in other aspects, the file-level storage management component may be configured to generate redundant verification data for the data stored in the second memory unit of the programmable logic device e.g. regularly or prior to a reboot to the backup process environment.

Preferably, in the data backup process managed/controlled by the data backup process environment, the generated redundant verification data may be copied together with the data stored in the second memory unit of the programmable logic device in the data backup process, in particular the second backup data and redundant verification data associated with the second backup data may be copied.

In some exemplary aspects or embodiments, when restarting after an external power failure, the computer system may preferably be configured to determine whether data restoration to the first memory unit from the one or more storage devices is required, and to copy at least the first backup data or both of the first and second backup data from the one or more storage devices to the first memory unit.

In some exemplary aspects or embodiments, when restarting after an external power failure, the file-level storage management component may preferably be configured to determine whether data restoration to the second memory unit is required (e.g. from the one or more storage devices, or from the first memory unit if the second backup data has been restored already to the first memory unit, for example), and/or to manage or request a data restoration process of restoring the second backup data to the second memory unit.

For example, the file-level storage management component may preferably be configured to determine whether data restoration to the second memory unit is required by inquiring the first operating system or the block-level management component indirectly via the virtualization management component.

Preferably, in the data restoration process of restoring the second backup data to the second memory unit, the programmable logic device may be configured to generate redundant verification data for the restored second backup data (e.g. restored from the first memory unit or the one or more storage devices), and/or the programmable logic device or the file-level storage management component may preferably configured to compare the generated redundant verification data with redundant verification data generated for the second backup data in the data backup process.

If such comparison indicates an error or data corruption, e.g. if the compared redundant verification data is different, in connection with the second backup data or part of the second backup data, the file-level storage management component may retry to restore the second backup data or the part of the second backup data again.

In some exemplary aspects or embodiments, when restarting after an external power failure, the computer system may preferably be configured to provide a shared communication storage memory area for data restoration of the second backup data (e.g. initiated or set up by the virtualization management component).

Preferably, the shared communication storage memory area may be accessible by each of the file-level storage management component and the block-level storage management component for data restoration to the second memory unit, in particular preferably via direct memory access.

Preferably, the shared communication storage memory area includes an interface control memory area and a backup data memory area.

Preferably, the file-level storage management component and the block-level storage management component are configured to exchange backup process protocol commands and backup process protocol responses by access to the interface control memory area, in particular preferably via direct memory access.

Preferably, the block-level storage management component is configured to copy the second backup data from the first memory unit or the one or more storage devices to the backup data memory area of the shared communication storage memory area, in particular preferably via direct memory access.

Preferably, the file-level storage management component is configured to copy the second backup data from the backup data memory area of the shared communication storage memory area to the second memory unit, in particular preferably via direct memory access.

In some exemplary aspects or embodiments, when restarting after an external power failure and after restoring the second backup data to the second memory unit, the file-level storage management component may preferably be configured to detect a battery status of the battery unit of the computer system, and/or to start providing file-level storage services to the one or more host computers when it is detected that the battery unit is able to support another data backup process to backup data stored in the second memory unit.

In some exemplary aspects or embodiments, the storage control system may include a plurality of nodes of similar or same architecture, wherein a second node of the storage control system may be communicably connectable to a first node, and/or the first node may include the (first) computer system including the second I/O unit, the (first) processor unit, the first memory unit, and the (first) storage unit; and the (first) programmable logic device including the first I/O unit, a (first) interface unit interfacing with the computer system of the first node, the one or more (first) programmable hardware-implemented processing units, and the second memory unit.

Preferably, the second node comprises a second programmable logic device including (i) a third I/O unit configured to receive file-level storage related requests from the one or more host computers and (ii) one or more second programmable hardware-implemented processing units configured to process file-level storage related requests received from the one or more host computers by the third I/O unit and/or to create first block-level storage related requests corresponding to the file-level storage related requests; and/or a second computer system configured to communicate with the second programmable logic device (e.g. by interfacing with a second interface unit of the second programmable logic device) and/or to manage both of file-level storage services and block-level storage services, the second computer system including (iii) a fourth I/O unit configured to receive second block-level storage related requests from the one or more host computers and (iv) a second processor unit configured to execute a third operating system and further software components executed on the third operating system.

Preferably, the software components executed on the third operating system of the second processor unit may include a second block-level storage management software preferably configured to manage the block-level storage services related to the first block-level storage related requests sent/received by/from the programmable logic device and the second block-level storage related requests sent/received by/from the fourth I/O unit, and/or the software components further comprising a second virtualization management software preferably configured to manage one or more virtual machines on the second computer system and/or to communicate with the second block-level storage management software.

Preferably, one of the virtual machines managed by the second virtualization management software may be configured to execute a fourth operating system and/or a second file-level storage management software executed on the fourth operating system, the second file-level storage management software being preferably configured to communicate with the second programmable hardware-implemented processing units of the second programmable logic device and to manage the one or more second programmable hardware-implemented processing units of the second programmable logic device e.g. to provide the file-level storage services related to file-level storage related requests.

Preferably, the second node may further comprise a second battery unit configured to supply electric energy to the second computer system and/or the second programmable logic device in case of an external power failure.

Preferably, the second computer system may include a third memory unit to temporarily store data and a second storage unit including one or more storage devices, and the second programmable logic device preferably includes a fourth memory unit to temporarily store data;

Preferably, in case of an external power failure and when being supplied with electric energy from the second battery unit, the second node is configured to perform a data backup process including copying data stored in the third memory unit of the second computer system as third backup data and data stored in the fourth memory unit of the second programmable logic device as fourth backup data to one or more storage devices of the second storage unit of the second computer system.

Preferably, the programmable logic device of the first node is communicably connectable to the second programmable logic device of the second node, and the storage control system is preferably configured to manage the fourth memory unit of the second node as a data mirror of the second memory unit of the first node.

In some of the above aspects or exemplary embodiments, in a data restoration process of restoring the second backup data to the second memory unit performed at the first node, when it is determined that an error occurred based on a comparison of redundant verification data generated for the second backup data during the data backup process and redundant verification data generated for the second backup data during the data restoration process in the first node, the storage control system may preferably be further configured to restore at least part of the second backup data to the second memory unit in the first node on the basis of the fourth backup data from the second node.

In some of the above aspects or exemplary embodiments, when restarting after an external power failure and after restoring the second backup data to the second memory unit in the first node, the (first) file-level storage management component of the first node may be configured to detect a battery status of the first battery unit of the first node and the battery status of the second battery unit of the second node, and/or to start providing file-level storage services to the one or more host computers when it is detected that at least one of the first battery unit of the first node and the second battery unit of the second node is able to support another data backup process, in particular to backup data stored in the fourth memory unit.

According to an aspect, there may be provided a control method for controlling a storage control system being configured to provide both of file-level storage services and block-level storage services to one or more host computers connectable to the storage control system as discussed in one or more of the above aspects or exemplary embodiments.

The control method may comprise: executing the software components on the first operating system of the processor unit including executing a block-level storage management component for managing the block-level storage services related to the first block-level storage related requests sent/received by/from the programmable logic device and the second block-level storage related requests sent/received by/from the second I/O unit, and/or executing a virtualization management component for managing one or more virtual machines on the computer system and/or for communicating with the block-level storage management software; and/or executing, on one of the virtual machines managed by the virtualization management component, a second operating system and a file-level storage management component executed on the second operating system, the file-level storage management component communicating with the programmable hardware-implemented processing units of the programmable logic device and/or managing the programmable hardware-implemented processing units of the programmable logic device e.g. for providing the file-level storage services related to file-level storage related requests.

In some aspects and embodiments, the control method may preferably further comprise performing, in case of an external power failure and when the computer system is supplied with electric energy from the battery unit, a data backup process including copying data stored in the first memory unit of the computer system as first backup data and data stored in the second memory unit of the programmable logic device as second backup data to one or more storage devices of the storage unit of the computer system.

According to an aspect, there may be provided a computer program product comprising computer-readable program instructions which, when running on or loaded into a storage control system, cause the storage control system to execute a control method for controlling the storage control system as discussed above to provide both of file-level storage services and block-level storage services to one or more host computers connectable to the storage control system as discussed in one or more of the above aspects or exemplary embodiments.

According to yet another aspect, there may be provided a computer system including a processor unit, a non-volatile memory, and one or more storage devices, the computer system being configured to operate/execute, as software components on a first operating system executed by the processor unit of the computer system, a memory control component controlling and managing a non-volatile memory of the computer system and a virtualization management component (e.g. a hypervisor) for managing one or more virtual machines (e.g. a virtual hardware environment, e.g. a so-called logical partition managed by the virtualization management component on the basis of hardware resources of the computer system) on the computer system. The computer system may be configured to execute, on one of the virtual machines managed by the virtualization management component, a second operating system and an application using a virtual machine memory provided by the virtualization management component on the basis of a memory unit of hardware resources of the computer system. The computer system may preferably be further comprising a battery unit configured to supply electric energy to the computer system in case of an external power failure.

In addition, the computer system may, in some aspects or exemplary embodiments, be configured to perform, in case of an external power failure and when the computer system is supplied with electric energy from the battery unit, a data backup process which may include copying data stored in the non-volatile memory of the computer system as first backup data and data stored in the virtual machine memory as second backup data to one or more storage devices of the computer system.

Preferably, the data backup process may include copying data stored in the virtual machine memory (second backup data) from the virtual machine memory, e.g. by means of direct memory access, to the non-volatile memory of the computer system, and thereafter copying data stored in the non-volatile memory of the computer system (first backup data and second backup data) to the one or more storage devices of the computer system.

Preferably, the computer system may be configured to shut down after performing the data backup process, e.g. after the data backup process is completed, in particular after copying the first backup data and the second backup data to the one or more storage devices of the computer system.

Preferably, the computer system may further include a power failure detection unit configured to detect an occurrence of an external power failure, wherein if the power failure detection unit detects an occurrence of an external power failure, the computer system may be configured to switch to a low power mode (e.g. deactivating one or more units of the computer system not required in the backup process and/or reducing the number of operating processors in an exemplary multi-core processing unit), to halt the software components and operating systems of the computer system, and to reboot to a data backup state in which the processor unit of the computer system is configured to execute a data backup process environment configured to perform the data backup process.

Preferably, upon being rebooted to the data backup state, the computer system may be configured to obtain the data stored in the virtual machine memory previously used by the application from the memory unit of the computer system, in particular by means of direct memory access, and to copy the obtained data (second backup data) to the non-volatile memory, and to then preferably copy the data stored in the non-volatile memory (first and second backup data) to the one or more storage devices of the computer system. In some alternative aspects or embodiments, the obtained data (second backup data) may be directly copied to the storage device(s).

Preferably, the computer system may be configured to generate redundant verification data for the second backup data (e.g. by the application prior to the reboot, by another software component prior to the reboot, e.g. included in the hypervisor, by the data backup process environment, or by a hardware component such as by a programmable logic device including one or more programmable hardware-implemented processing units), wherein the generated redundant verification data may be copied together with the second backup data to the one or more storage devices in the data backup process (in particular the second backup data and the redundant verification data associated with the second backup data).

Preferably, when restarting after an external power failure, the computer system may be configured to determine whether data restoration to the non-volatile memory from the one or more storage devices is required, and to copy at least the first backup data or both of the first and second backup data from the one or more storage devices to the non-volatile memory.

Preferably, when restarting after an external power failure, the application may be configured to determine whether data restoration to the virtual machine memory is required, in particular by inquiring the first operating system or the memory control component indirectly via the virtualization management component, and to manage a data restoration process of restoring the second backup data to the virtual machine memory.

Preferably, in the data restoration process, the computer system may be configured to generate redundant verification data for the second backup data restored from the non-volatile memory or the one or more storage devices, and the computer system or the application may be configured to compare the generated redundant verification data with redundant verification data generated for the second backup data in the data backup process.

Preferably, when restarting after an external power failure, the computer system may be configured to provide a shared communication storage memory area for data restoration of the second backup data, the shared communication storage memory area being accessible by each of the memory control component and the application for data restoration to the virtual machine memory, in particular via direct memory access.

Preferably, the shared communication storage memory area includes an interface control memory area and a backup data memory area, wherein the application and the memory control component are preferably configured to exchange backup process protocol commands and backup process protocol responses by access to the interface control memory area, and/or wherein the memory control component is preferably configured to copy the second backup data from the non-volatile memory or the one or more storage devices to the backup data memory area of the shared communication storage memory area, and/or wherein the application is configured to copy the second backup data from the backup data memory area of the shared communication storage memory area to the virtual machine memory.

Preferably, when restarting after an external power failure and after restoring the second backup data to the virtual machine memory, the application is preferably configured to detect a battery status of the battery unit of the computer system, and to start providing its application services, e.g. to a user or to one or more host computers, when it is detected that the battery unit is able to support another data backup process to backup data stored in the virtual machine memory.

Preferably, the computer system includes a first node and a second node communicably connectable to the first node, wherein the first node includes: a first processor unit, a first non-volatile memory, and one or more first storage devices, the first node being configured to operate/execute, as software components on a first operating system executed by the first processor unit, a first memory control component controlling and managing the first non-volatile memory of the first node and a first virtualization management component (e.g. a hypervisor) for managing one or more virtual machines (e.g. a virtual hardware environment, e.g. a so-called logical partition managed by the virtualization management component on the basis of hardware resources of the computer system) on the first node; and the second node includes a second processor unit, a second non-volatile memory, and one or more second storage devices, the second node being configured to operate/execute, as software components on another operating system executed by the second processor unit, a second memory control component controlling and managing the second non-volatile memory of the second node and a second virtualization management component (e.g. a hypervisor) for managing one or more virtual machines (e.g. a virtual hardware environment, e.g. a so-called logical partition managed by the virtualization management component on the basis of hardware resources of the computer system) on the second node.

Both of the above first and second nodes may preferably operate as discussed for aspects or embodiments above. Specifically, the first node may execute, on one of the virtual machines managed by the first virtualization management component, a first application using a first virtual machine memory provided by the first virtualization management component on the basis of a first memory unit of hardware resources of the first node; and the second node may execute, on one of the virtual machines managed by the second virtualization management component, a second application using a second virtual machine memory provided by the second virtualization management component on the basis of a second memory unit of hardware resources of the second node. Also, both of the nodes may include their own respective (first or second) battery unit configured to supply electric energy to the respective node in case of an external power failure.

Further preferably, the first node may, in some aspects or exemplary embodiments, be configured to perform, in case of an external power failure and when the first node is supplied with electric energy from the first battery unit, a first data backup process which may include copying data stored in the first non-volatile memory of the first node as first backup data and data stored in the first virtual machine memory as second backup data to one or more first storage devices of the first node; and the second node may, in some aspects or exemplary embodiments, be configured to perform, in case of an external power failure and when the second node is supplied with electric energy from the second battery unit, a second data backup process which may include copying data stored in the second non-volatile memory of the second node as third backup data and data stored in the second virtual machine memory as fourth backup data to one or more second storage devices of the second node.

Further preferably, the first node is communicably connectable to the second node, and the computer system is configured to manage the second virtual machine memory of the second node as a data mirror of the first virtual machine memory of the first node.

Further preferably, in a data restoration process of restoring the second backup data, when it is determined that an error occurred based on a comparison of redundant verification data generated for the second backup data during the data backup process and redundant verification data generated for the second backup data during the data restoration process in the first node, the computer system is configured to restore at least part of the second backup data in the first node on the basis of the fourth backup data from the second node.

Further preferably, when restarting after an external power failure and after restoring the second backup data the first application of the first node is configured to detect a battery status of the first battery unit of the first node and the battery status of the second battery unit of the second node, and to start providing its application services when it is detected that at least one of the first battery unit and the second battery unit of the second node is able to support another data backup process to backup data stored in the first virtual machine memory.

Also, in one of the above aspects of a computer system, there may be provided further aspects such as e.g. a control method in such computer system or a computer program product including program instructions to execute such control method in such computer system, the control method preferably including: operating/executing, as software components on a first operating system executed by the processor unit of the computer system, a memory control component controlling and managing a non-volatile memory of the computer system and a virtualization management component (e.g. a hypervisor) for managing one or more virtual machines (e.g. a virtual hardware environment, e.g. a so-called logical partition managed by the virtualization management component on the basis of hardware resources of the computer system) on the computer system; operating/executing, on one of the virtual machines managed by the virtualization management component, a second operating system and an application using a virtual machine memory provided by the virtualization management component on the basis of a memory unit of hardware resources of the computer system; and/or performing, in case of an external power failure and when the computer system is supplied with electric energy from a battery unit, a data backup process which may include copying data stored in the non-volatile memory of the computer system as first backup data and data stored in the virtual machine memory as second backup data to one or more storage devices of the computer system.

BRIEF DESCRIPTION OF THE ACCOMPANYING DRAWINGS

FIG. 3A is an exemplary schematic diagram showing an exemplary structural architecture of a storage control system according to an exemplary embodiment;

FIG. 4 is an exemplary schematic diagram showing an exemplary functional architecture of a storage control system in a normal operation state according to an exemplary embodiment;

FIG. 5B is an exemplary schematic diagram showing an exemplary functional architecture of a storage control system and functional operations in handling file-level related requests from a host according to an exemplary embodiment;

FIG. 5C is an exemplary schematic diagram showing an exemplary functional architecture of a storage control system and functional operations in handling block-level related requests from a programmable logic device providing file-level services according to an exemplary embodiment;

FIG. 10 is an exemplary logic flow diagram schematically showing a data restoration process in accordance with exemplary embodiments;

FIGS. 11B and 11C are exemplary logic flow diagrams schematically showing a data restoration process in accordance with exemplary embodiments;

DETAILED DESCRIPTION OF EMBODIMENTS AND THE ACCOMPANYING DRAWINGS

Figure 1:
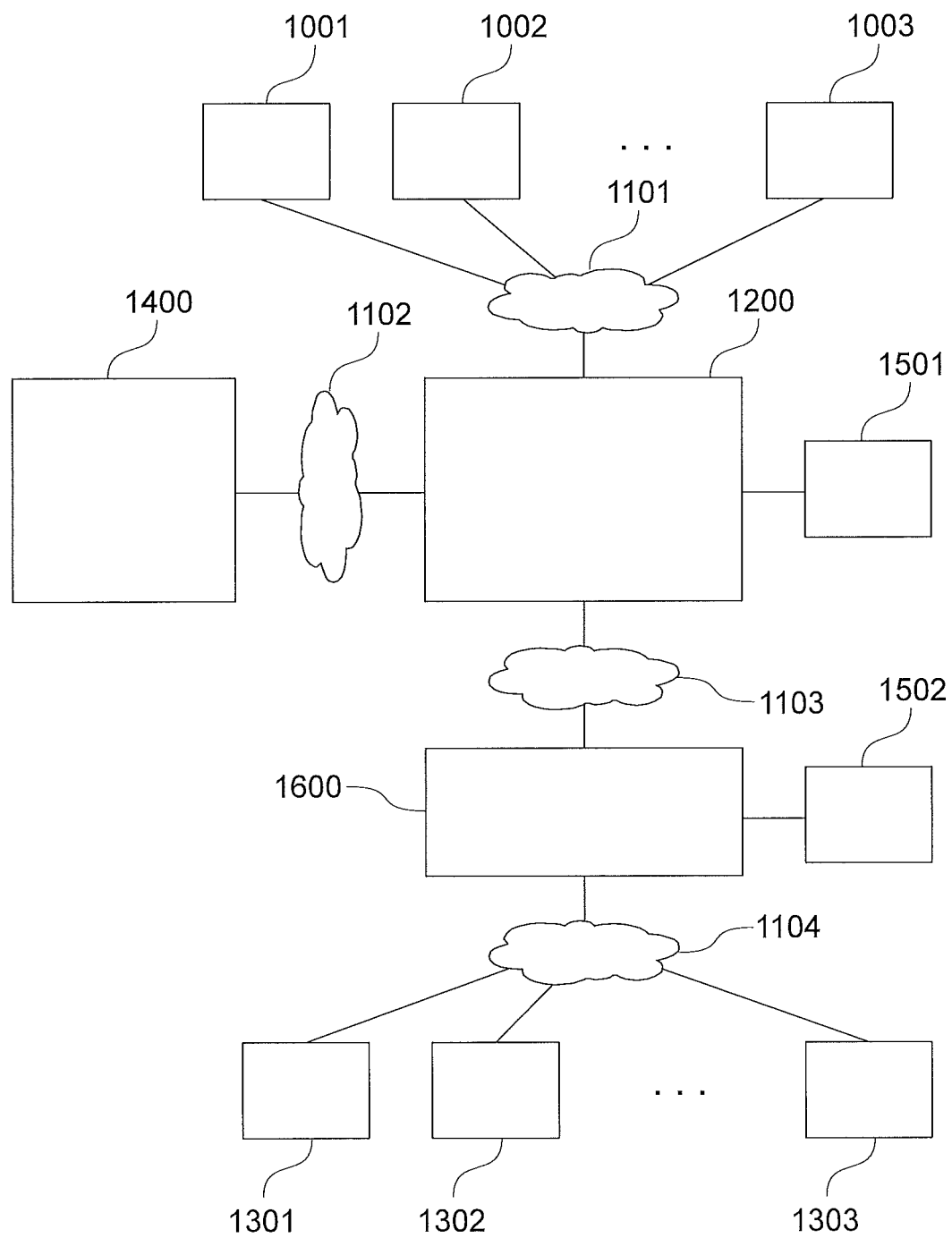
FIG. 1 is an exemplary schematic diagram showing a data storage system.

In the following, preferred aspects and exemplary embodiments will be described in more detail with reference to the accompanying figures. Same or similar features in different drawings and embodiments are sometimes referred to by similar reference numerals. It is to be understood that the detailed description below relating to various preferred aspects and preferred embodiments are not to be meant as limiting the scope of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

A "block" is generally a unit of storage of predetermined size. A "storage block" may be a unit of storage in the file system that corresponds to portion of physical storage in which user data and/or system data is stored. A file system object (discussed below) generally includes one or more blocks. A "data block" may refer to a unit of data (e.g. user data or metadata) to be written to one storage block. Typically the terms "block", "data block" or "data storage block" may be used interchangeably in the framework of the present disclosure since usually the allocation of a storage block is followed by writing the data to the storage block, hence "data block" may also refer to the unit of storage in the file system that corresponds to portion of physical storage in which user data and/or system data is stored.

Exemplary embodiments of the present invention are described with reference to an exemplary file system of the type used in various file servers e.g. as sold by Hitachi Data Systems and known generally as BlueArc Titan™ and Mercury™ file servers, although it should be noted that various concepts may be applied to other types of file systems.

An exemplary file server is described in U.S. Pat. No. 7,457,822, entitled "Apparatus and Method for Hardware-based File System", which is incorporated herein by reference, and PCT application publication number WO 01/28179 A2, published Apr. 19, 2001, entitled "Apparatus and Method for Hardware Implementation or Acceleration of Operating System Functions", which is incorporated herein by reference. Another implementation of an exemplary file server and hardware-implemented file system management is set forth in U.S. application Ser. No. 09/879,798, filed Jun. 12, 2001, entitled "Apparatus and Method for Hardware Implementation or Acceleration of Operating System Functions", which is incorporated herein by reference. An exemplary file storage system is described in WO 2012/071335 and U.S. application Ser. No. 13/301,241 entitled "File Cloning and De-Cloning in a Data Storage System", which was filed on Nov. 21, 2011, which are incorporated herein by reference. An exemplary file server including various hardware-implemented and/or hardware-accelerated subsystems, for example, is described in U.S. patent application Ser. No. 09/879,798 and Ser. No. 10/889,158, which are incorporated by reference herein, and such file server may include a hardware-based file system including a plurality of linked sub-modules, for example, as described in U.S. patent application Ser. No. 10/286,015 and Ser. No. 11/841,353, which are incorporated by reference herein.

FIG. 1 exemplarily shows a schematic illustration of a configuration of a data storage system.

The data storage system exemplarily comprises a file system server 1200 connected to at least one host computer (client) and in FIG. 1 exemplarily a plurality of host computers (clients) 1001, 1002 and 1003 via a communication network 1101 (which may be organized and managed as a LAN, for example). The file system server 1200 is exemplarily configured to manage one or more file systems and to receive and process I/O requests from the host computers to one or more file systems managed/controlled by the file system server 1200.

The file system server 1200 is further connected to a storage control apparatus 1600 via another communication network 1103 (which may be organized and managed as a FiberChannel connection or an SCSI connection, for example), wherein the storage control apparatus 1600 is further connected to a plurality of storage apparatuses 1301, 1302 and 1303 via another communication network 1104 (which may be organized and managed as a SAN, for example). The storage apparatuses 1301, 1302 and 1303 may include a plurality of storage devices including, for example, storage drives such as hard disk drives and/or flash drives or solid state drives or the like.

In other embodiments, only one storage apparatus may be connected to the storage control apparatus 1600, or in other embodiments the storage control apparatus 1600 and the one or more storage apparatuses (or at least a plurality of storage devices) may be implemented within one single storage device.

The file system server 1200 is adapted to manage one or a plurality of file systems, each file system being accessible by one or more of the host computers 1001 to 1003, possibly depending on individually set access rights, and, for accessing the one or more file systems, the host computers issue access requests to the file system server 1200.

Such access may include operations such as write new user data (e.g. write new files) and create new directories of the file system(s), read user data (read user data of one or more files), lookup directories, delete user data (such as delete existing files) and delete directories, modify user data (e.g. modify an existing file such as by modifying the file data or extend the file data by adding new user data to the file), create copies of files and directories, create soft links and hard links, rename files and directories etc.

Also, the host computers 1001 to 1003 may issue inquiries with respect to metadata of the file system objects (e.g. metadata on one or more files and metadata on one or more directories of the file systems).

The file system server 1200 manages the access requests and inquiries issued from the host computers 1001 to 1003, and the file system server 1200 manages the file systems that are accessed by the host computers 1001 to 1003. The file system server 1200 manages user data and metadata. The host computers 1001 to 1003 can communicate via one or more communication protocols with the file system server 1200, and in particular, the host computers 1001 to 1003 can send I/O requests to the file system server 1200 via the network 1101.

Such processing and management by the file system server 1200 is referred to as providing file-level services that are provided from the file system server 1200 to the clients/host computers. That is, I/O requests and communication messages exchanged between the file system server 1200 and the one or more host computers 100 to 1003 may use one or more communication protocols in which I/O access requests are referencing files and/or directories of one or more file systems, e.g. according to file-related (file-system-related) communication protocols such as SMB/CIFS or NFS or the like.

A management computer 1501 is exemplarily connected to the file system server 1200 for enabling control and management access to the file system server 1200. An administrator/user may control and adjust settings of the file system management and control different functions and settings of the file system server 1200 via the management computer 1501. For controlling functions and settings of the file system management of the file system server 1200, the user can access the file system server 1200 via a Graphical User Interface (GUI) and/or via a Command Line Interface (CLI). In other embodiments such control of the file system management of the file system server 1200 can be performed via one or more of the host computers instead of the management computer 1501.

The file system server 1200 is additionally connected to the storage control apparatus 1600 via the communication network 1104, wherein the storage control apparatus 1600 is connected to the one or more storage apparatuses 1301 to 1303 via the network 1104, and the user data (and potentially also the metadata of the one or more file systems managed on the file system server 1200) is stored to storage devices of the storage apparatuses 1301 to 1303, wherein the storage devices may be embodied by plural storage disks and/or flash memory devices. In some embodiments, the storage devices of the storage apparatuses 1301 to 1303 may be controlled according to one or more RAID configurations of specific RAID levels.

The storage devices of the storage apparatuses 1301 to 1303 are controlled by the storage control apparatus 1600, and the storage control apparatus 1600 may include a RAID controller which is configured to control the RAID configurations of the storage devices of the storage apparatuses 1301 to 1303, and be configured to perform parity calculations for controlling the RAID configurations of the storage devices of the storage apparatuses 1301 to 1303, and when writing data and parity data to the RAID configurations of the storage devices of the storage apparatuses 1301 to 1303.

The storage control apparatus 1600 manages the access requests and inquiries issued from the file system server 1200, and the storage control apparatus 1600 manages the storage devices of the storage apparatuses 1301 to 1303 and data stored thereon. The storage control apparatus 1600 can communicate via one or more communication protocols with the file system server 1200, and in particular, the file system server 1200 can send I/O requests to the storage control apparatus 1600 via the network 1103 and the storage control apparatus 1600 can return messages and data stored on the storage apparatuses 1301 to 1303 to the file system server 1200.

Such processing and management by the storage control apparatus 1600 is referred to as providing block-level services that are provided from the storage control apparatus 1600 to the file system server 1200. Such block-related access may include operations such as write data and read data to/from logical blocks and/or physical blocks on storage devices of the storage apparatuses 1301 to 1303.

That is, I/O requests and communication messages exchanged between the file system server 1200 and the storage control apparatus 1600 may use one or more communication protocols in which I/O access requests are referencing data blocks and block addresses (logical block addresses and/or physical block addresses), and data stored on storage devices of the storage apparatuses 1301 to 1303 is managed by the storage control apparatus 1600 on a block-level and based on block addresses of the data blocks (logical blocks or physical blocks on the storage devices), e.g. according to block-related communication protocols such as SCSI and FiberChannel protocols or the like. Furthermore, the storage control apparatus 1600 may be configured to manage mapping between logical block addresses used by the file system server 1200 and physical block addresses of the respective data on the storage devices of the storage apparatuses 1301 to 1303.

Another management computer 1502 is exemplarily connected to storage control apparatus 1600 for enabling control and management access to the storage control apparatus 1600. An administrator/user may control and adjust settings of the storage device management (e.g. RAID management or other storage device related functions) and control different functions and settings of the storage control apparatus 1600 via the management computer 1502. For controlling functions and settings of the storage management storage control apparatus 1600 such as management of RAID configurations, the user can access the storage control apparatus 1600 via a Graphical User Interface (GUI) and/or via a Command Line Interface (CLI). In other embodiments such control of the storage control apparatus 1600 can be performed via the same management computer 1501 that is connected to the file system server 1200 directly, or indirectly through the connection via the communication network 1103 and the file system server 1200.

Exemplarily, the file system server 1200 is additionally connected to a remote storage apparatus 1400 via another communication network 1102 for remote mirroring of the file system data (user data and/or metadata) to a remote site. Such remote mirroring may be performed synchronously and asynchronously, for example, and settings of the function of the remote mirror operation may be controlled also via the management computer 1500. The storage apparatus 1400 may be embodied by another remote file system server connected to another storage control apparatus or by another storage control apparatus connected to one or more apparatuses similar to the storage apparatuses 1301 to 1303.

Figure 2A:
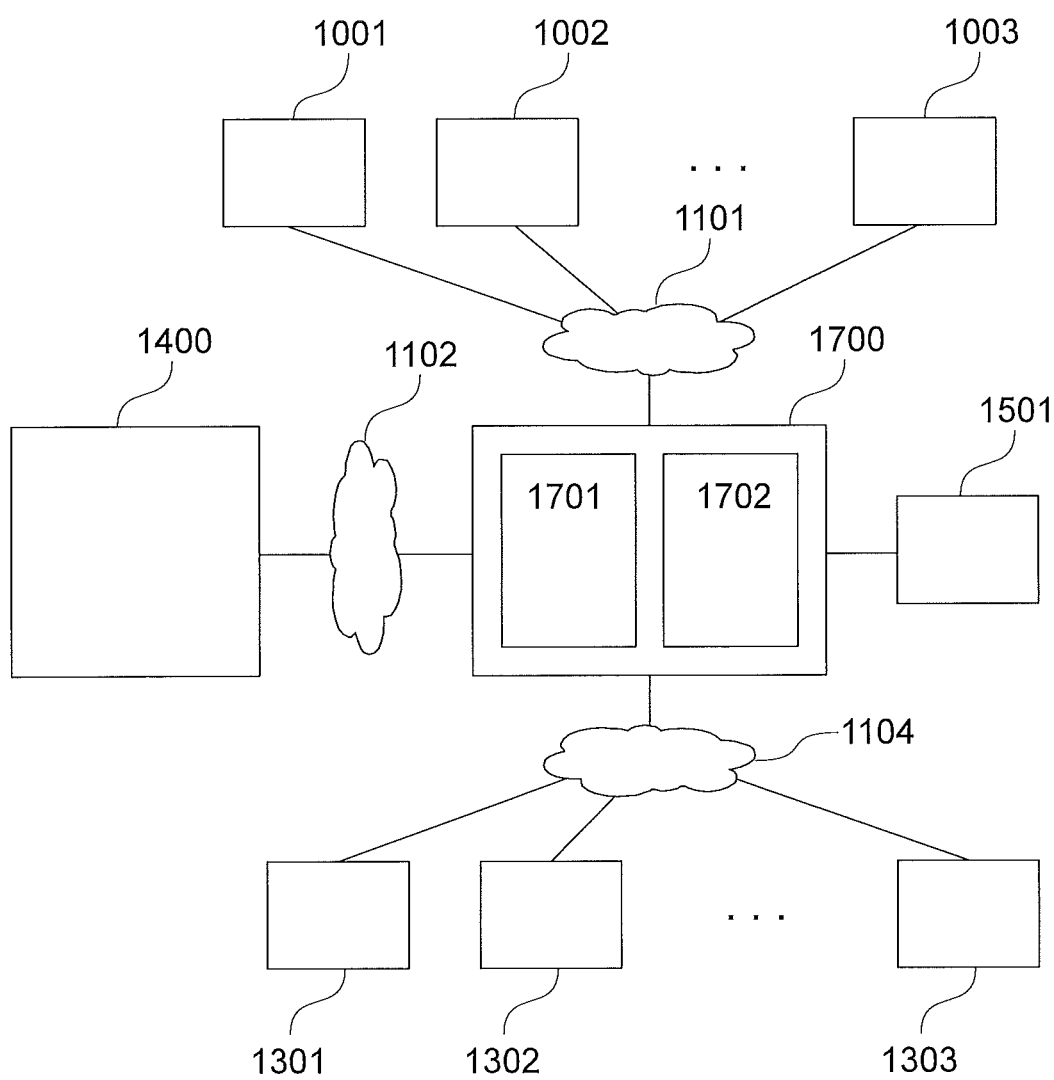
FIG. 2A is an exemplary schematic diagram showing a data storage system according to an exemplary embodiment.

FIG. 2A is an exemplary schematic diagram showing a data storage system according to an exemplary embodiment. The system of FIG. 2A is similar to the system of FIG. 1 with the exception of the difference that instead of independently providing the file system server 1200 and the storage control apparatus 1600 of FIG. 1, a single unified storage control apparatus 1700 (such as e.g. a storage control server or the like) is provided that provides both of file-level services and block-level services.

That is, in FIG. 2A, the host computers 1001 to 1003 are connected, via communication network 1101, to the storage control apparatus 1700 and the storage control apparatus 1700 is connected, via communication network 1104, to the storage apparatuses 1301 to 1303. Still, similar to the file system server 1200 in FIG. 1, the storage control apparatus 1700 may exemplarily be connected to the management computer 1501 and to the remote storage apparatus 1400 via network 1102.

However, the storage control apparatus 1700 exemplarily comprises a file system management module 1701 (which may be embodied by hardware, software or any combination thereof, e.g. by one or more physical modules and/or one or more software components running on one or more physical modules) and a storage control module 1702 (which may be embodied by hardware, software or any combination thereof, e.g. by one or more physical modules and/or one or more software components running on one or more physical modules).

The file system management module 1701 and the storage control module 1702 may be integrated into one single chassis e.g. using a same backplane (including e.g. to share physical ports, cooling fans or other cooling systems, power supply systems, etc.), or the file system management module 1701 and the storage control module 1702 may be included into plural chassis but having a fixed physical communication connection.

Different to the FIG. 1, although possible in some embodiments, the file system management module 1701 and the storage control module 1702 of FIG. 2A may exemplarily be not connected by a communication network such as a FibreChannel network but may be connected by an internal shared bus systems e.g. based on one or more PCIe connections, or by connection of their respective internal bus systems.

Also, in some exemplary embodiments, the storage control apparatus 1700 may be provided with a shared port/interface system so that external request or communication messages can be input to the file system management module 1701 and the storage control module 1702 via the same interfaces. Then, external requests directed to files or directories according to a file-level protocol may be input to and handled by the file system management module 1701, and external requests directed to blocks and block addresses according to a block-level protocol may be input to and handled by the storage control module 1701.

Exemplarily, a request transfer unit may be included that analyzes incoming requests and communication messages as to the used protocol, to distinguish whether it is relating to block-level services or file-level services, and to transfer the request or communication message to the file system management module 1701 if related to file-level services or to transfer the request or communication message to the storage control module 1702 if related to block-level services.

Similar to FIG. 1, the file system management module 1701 of the storage control apparatus 1700 of FIG. 2A provides the functions of the file system server 1200 in FIG. 1 and the storage control module 1702 of the storage control apparatus 1700 of FIG. 2A provides the functions of the storage control apparatus 1600 in FIG. 1.

However, in the connection with the host computers 1001 to 1003 via network 1101, in FIG. 2A, the storage control apparatus can handle both types of communication protocols, i.e. the first type (file-level related) of one or more communication protocols in which I/O access requests are referencing files and/or directories of one or more file systems, e.g. according to file-related (file-system-related) communication protocols such as SMB/CIFS or NFS or the like; and the second type (block-level related) of one or more communication protocols in which I/O access requests are referencing data blocks and block addresses (logical block addresses and/or physical block addresses), e.g. according to block-related communication protocols such as SCSI and FiberChannel protocols or the like.

Accordingly, some of the host computers 1001 to 1003 may act as typical user computers accessing files and directories of file system(s) managed by the file system management module 1701 of the storage control apparatus 1700 (file-level services) but other ones of the host computers 1001 to 1003 may act as file servers accessing data blocks and referencing block addresses (block-level services). Accordingly, the storage control module 1702 of the storage control apparatus 1700 may provide block-level services to the file system management module 1701 of the storage control apparatus 1700 as well as to the one or more external hosts 1001 to 1003.

Figure 2B:
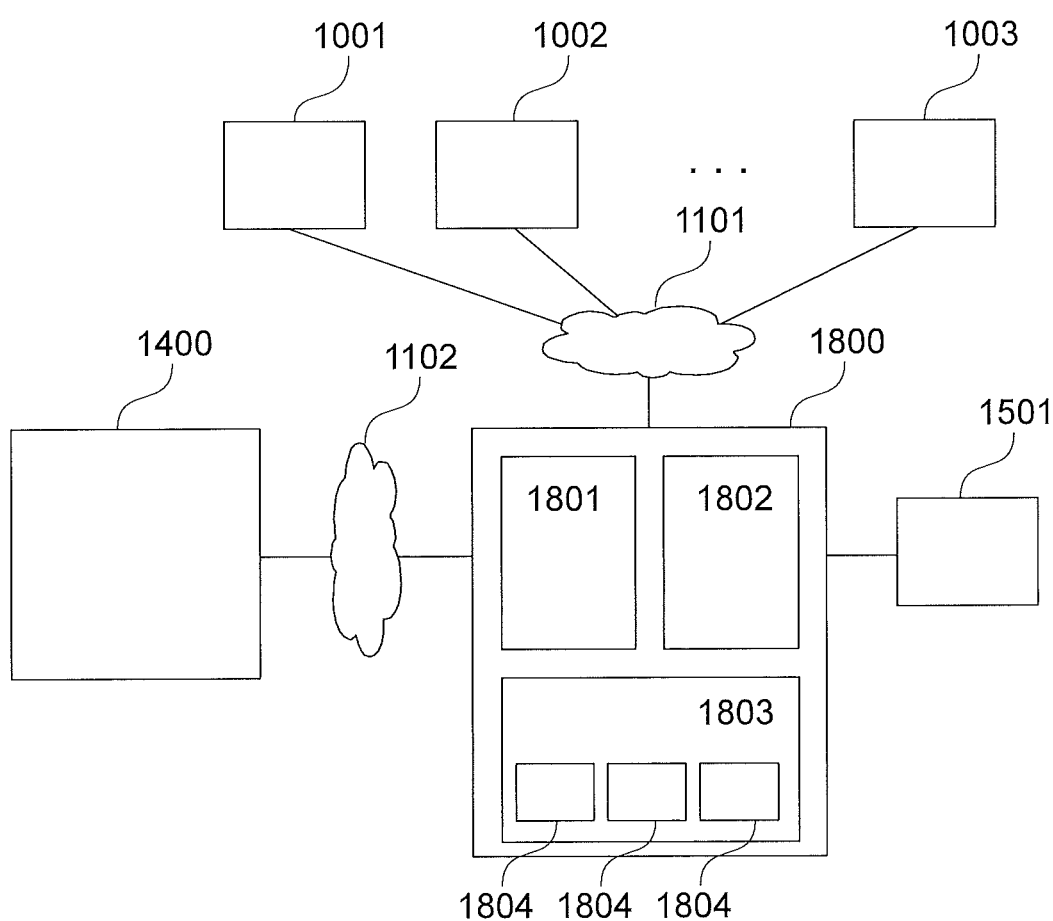
FIG. 2B is an exemplary schematic diagram showing another data storage system according to another exemplary embodiment.

FIG. 2B is an exemplary schematic diagram showing a data storage system according to another exemplary embodiment. The system of FIG. 2B is similar to the system of FIG. 1 with the exception of the difference that instead of independently providing the file system server 1200, the storage control apparatus 1600 and the storage apparatuses 1301 to 1303 of FIG. 1, a single unified storage control apparatus 1800 (such as e.g. a storage control server or the like) is provided that provides both of file-level services and block-level services and includes the storage devices previously provided externally by storage apparatuses 1301 to 1303.

That is, in FIG. 2B, the host computers 1001 to 1003 are connected, via communication network 1101, to the storage control apparatus 1800. Similar to the file system server 1200 in FIG. 1, the storage control apparatus 1800 may exemplarily be connected to the management computer 1501 and to the remote storage apparatus 1400 via network 1102.

However, the storage control apparatus 1800 exemplarily comprises a file system management module 1801 (which may be embodied by hardware, software or any combination thereof, e.g. by one or more physical modules and/or one or more software components running on one or more physical modules) and a storage control module 1802 (which may be embodied by hardware, software or any combination thereof, e.g. by one or more physical modules and/or one or more software components running on one or more physical modules). These modules may be provided similarly to the file system management module 1701 and the storage control module 1702 of the storage control apparatus 1700 of FIG. 2A, respectively.

In addition, the storage control apparatus 1800 includes a storage device unit 1803 including a plurality of storage devices 1804. The storage devices 1804 may be embodied by plural storage disks and/or flash memory devices. In some embodiments, the storage devices may be controlled according to one or more RAID configurations of specific RAID levels.

The file system management module 1801 and the storage control module 1802 may be integrated into one single chassis e.g. using a same backplane (including e.g. to share physical ports, cooling fans or other cooling systems, power supply systems, etc.), or the file system management module 1701 and the storage control module 1702 may be included into plural chassis but having a fixed physical communication connection. In addition, the storage devices 1804 and the storage device unit 1803 may be included into the same chassis with the storage control module 1802 or at least into another chassis but having a fixed physical communication connection.

Different to the FIG. 1, although possible in some embodiments, the file system management module 1801 and the storage control module 1802 of FIG. 2B may exemplarily be not connected by a communication network such as a FibreChannel network but may be connected by an internal shared bus systems e.g. based on one or more PCIe connections, or by connection of their respective internal bus systems. Also the storage device unit 1803 (and the storage devices 1804 therein) may be connected to the storage control module 1802 via the internal shared bus systems e.g. based on one or more PCIe connections, or by connection of their respective internal bus systems.

Similar to FIG. 1, the file system management module 1801 of the storage control apparatus 1800 of FIG. 2B provides the functions of the file system server 1200 in FIG. 1 and the storage control module 1802 of the storage control apparatus 1800 of FIG. 2B provides the functions of the storage control apparatus 1600 in FIG. 1. Furthermore, the file system management module 1801 of the storage control apparatus 1800 of FIG. 2B provides the functions of the file system management module 1701 of the storage control apparatus 1700 of FIG. 2A and the storage control module 1802 of the storage control apparatus 1800 of FIG. 2B provides the functions of the storage control module 1702 of the storage control apparatus 1700 of FIG. 2A.

FIG. 3A is an exemplary schematic diagram showing an exemplary structural architecture of a storage control system 3000A according to an exemplary embodiment. The storage control system 3000A of FIG. 3A may exemplarily be used in connection with an example of embodying a storage control apparatus 1700 according to the exemplary concept of FIG. 2A.

Exemplarily, the storage control system 3000A may structurally be provided as a single apparatus (e.g. using a same chassis 3001 with shared cooling systems (not shown) and a shared power supply etc.).

The storage control system 3000A, also referred to exemplarily as storage control apparatus 3000A provided in the chassis 3001 in the some exemplary embodiments, includes a power supply unit 3002 (e.g. including one or more AC power connectors, and also potentially electric power converters such as AC-to-DC converters and/or AC-to-AC converters to reduce voltages of AC power) to supply the storage control apparatus 3000A with electric power from an external power supply.

Furthermore, the storage control apparatus 3000A includes the client network interface unit 3003 for being connected to one of more host computers (e.g. to host computers 1001 to 1003 in FIG. 2A) to receive file-level related requests from the host computer(s), the client network interface 3006 for being connected to one of more host computers to receive block-level related requests from the host computer(s), the management computer interface unit 3004 for being connected to one of more management computers (e.g. to management computer 1501 in FIG. 2A), and the storage network interface unit 3005 for being connected to one of more storage apparatuses including storage devices (e.g. to storage apparatuses 1301 to 1303 in FIG. 2A).

The storage control apparatus 3000A further includes a computer system 3100 (which may be provided structurally as one or more connected modules or the like), wherein the computer system 3100 is equipped with a data processing portion 3110, which is supplied with electric energy via the power supply line system 3300, the data processing portion 3110 being connected to the storage network interface unit 3005 via an internal bus connection 3405 and to the client network interface 3006 via an internal bus connection 3402.

The data processing portion 3110 (which may be provided structurally as one or more connected modules or one or more connected boards or a combination thereof, or the like) exemplarily includes a processing section 3113, a plurality of internal storage devices 3115 and a plurality of non-volatile memories 3114 (e.g. serving as cache memory/cache memories e.g. for to/from disk operations of a storage controller or the like). In some other embodiments, the data processing portion 3110 may include one single internal storage device 3115 and/or one single non-volatile memory 3114.

The processing section 3113 exemplarily includes a processor unit 3112 and a memory unit 3111, which are exemplarily provided as a multi-core architecture in which the processor unit 3112 includes multiple processor cores (a plurality of processors or CPUs, plural processor units) and the memory unit 3111 provides multiple volatile memories associated with the respective processor units 3112, i.e. for temporarily storing data processed by the processor units 3112.

Exemplarily, the data processing portion 3110 also includes a battery unit 3120 exemplarily including multiple batteries 3121 to supply power to the computer system 3100 in case of an external power failure. Furthermore, the data processing portion 3110 includes a power failure detection unit 3130 connected to the power supply line system 3300 to detect occurrence of an external power supply failure or accidental power loss in the computer system (e.g. by including a powerloss sensor which outputs a signal when detecting that a power failure has occurred, e.g. by detecting the power supply voltage in the power supply line system 3300 drops below a predetermined threshold). If necessary after a power failure, the batteries 3121 of the battery supply unit 3120 may be recharged via the power supply unit 3002 after the power failure when external power supply is re-established.

The storage control apparatus 3000A further exemplarily comprises a programmable logical device 3200. The programmable logical device 3200 can be provided as one or more modules. The programmable logical device 3200 is connected to the client network interface unit 3003 via an internal bus connection 3401 and to the management computer interface unit 3004 via an internal bus connection 3404. In other exemplarily embodiments, the client network interface unit 3003 and the management computer interface unit 3004 may be integrated into one interface unit. As will be explained in further detail below, the programmable logical device 3200 is further connected exemplarily to the data processing portion 3110 of the computer system 3100 by two independent internal bus connections 3406 and 3407.

Exemplarily, the programmable logical device 3200 includes a network interface portion 3210 interfacing with the client network interface unit 3003 via an internal bus connection 3401, a data movement management portion 3220 interfacing with the management computer interface unit 3004 via an internal bus connection 3404 and being internally connected to the computer system 3100 via the internal bus connection 3406, a file system management portion 3230 being internally connected to the data movement management portion 3220 via the internal bus connection 3403, and a disk network interface portion 3240 being internally connected to the computer system 3100 via the internal bus connection 3407.

Each of the above mentioned portions includes a respective processing section, each of which includes one or more programmable hardware-implemented processing units and associated memories to temporarily store data processed by the programmable hardware-implemented processing units.

Exemplarily, the programmable hardware-implemented processing units may include or be embodied by one or more programmed or programmable hardware-implemented chips or ICs or VLSI(s) such as for example one or more Field Programmable Gate Arrays referred to as FPGAs).

In the exemplary embodiments according to FIG. 3A, the network interface portion 3210 comprises the processing section 3211 including the one or more programmable hardware-implemented processing units 3212 and the thereto associated processing memory 3213, the data movement management portion 3220 comprises the processing section 3221 including the one or more programmable hardware-implemented processing units 3222 and the thereto associated processing memory 3223, the file system management portion 3230 comprises the processing section 3231 including the one or more programmable hardware-implemented processing units 3232 and the thereto associated processing memory 3233, and the disk network interface portion 3240 comprises the processing section 3241 including the one or more programmable hardware-implemented processing units 3242 and the thereto associated processing memory 3243.

The data movement management portion 3220 exemplarily further comprises a non-volatile memory 3224 for temporarily storing data associated with received messages and I/O requests, I/O requests and with generated I/O responses (preferably including header data and associated user data or metadata of a payload of messages, I/O requests and generated I/O responses).

The file system management portion 3230 exemplarily further comprises a cache memory 3234 for temporarily storing metadata associated with files and/or directories of one or more file systems managed by the file system management portion 3230.

The disk interface portion 3240 exemplarily further comprises a cache memory 3234 for temporarily storing data received from the data movement management portion 3220 (directed to the storage controller) and received from the storage controller (software component on the computer system) via the bus connection 3407.

Also, in addition to the depicted bus connections, while the network interface portion 3240 with the data movement management portion 3220 and the data movement management portion 3220 with the network interface portion 3210 may respectively be provided also as internal bus connections, the respective connections are exemplarily provided by the more efficient and quicker fast-path connections 3501 and 3502, respectively. That is, the disk interface portion 3240 and the data movement management portion 3220 are internally connected via the fast-path connection 3501, and the network interface portion 3210 and the data movement management portion 3220 are internally connected via the fast-path connection 3502.

Exemplarily, the fast-path connections may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

Exemplarily, in FIG. 3A, the power supply line system 3300 also connects the power supply unit 3002 to supply electric power to the programmable logic device 3200 in addition to the computer system 3100. Accordingly, the computer system 3100 and the programmable logic device 3200 exemplarily share the same electric power supply. The power failure detection unit 3130 is configured to input a power failure indicating signal to both of the data processing section 3110 and the programmable logic device 3200.

The above-described network interface portion 3210, data movement management portion 3220, file system management portion 3230, and disk interface portion 3240 may be respectively provided by one or more connected modules, one or more connected boards or even one or more modules or boards also having parts of the computer system 3100 in some exemplary embodiments.

Also, it is possible to integrate two or more of the network interface portion 3210, data movement management portion 3220, file system management portion 3230, and disk interface portion 3240 into a single portion or the like.

For example, in some embodiments, the data movement management portion 3220 and file system management portion 3230 may be integrated into a single portion, which may be referred to as a data movement and file system management portion, or, in some embodiments, the network interface portion 3210 and the data movement management portion 3220 may be integrated into a single portion, which may be referred to as a disk interface and data movement management portion.

Figure 3B:
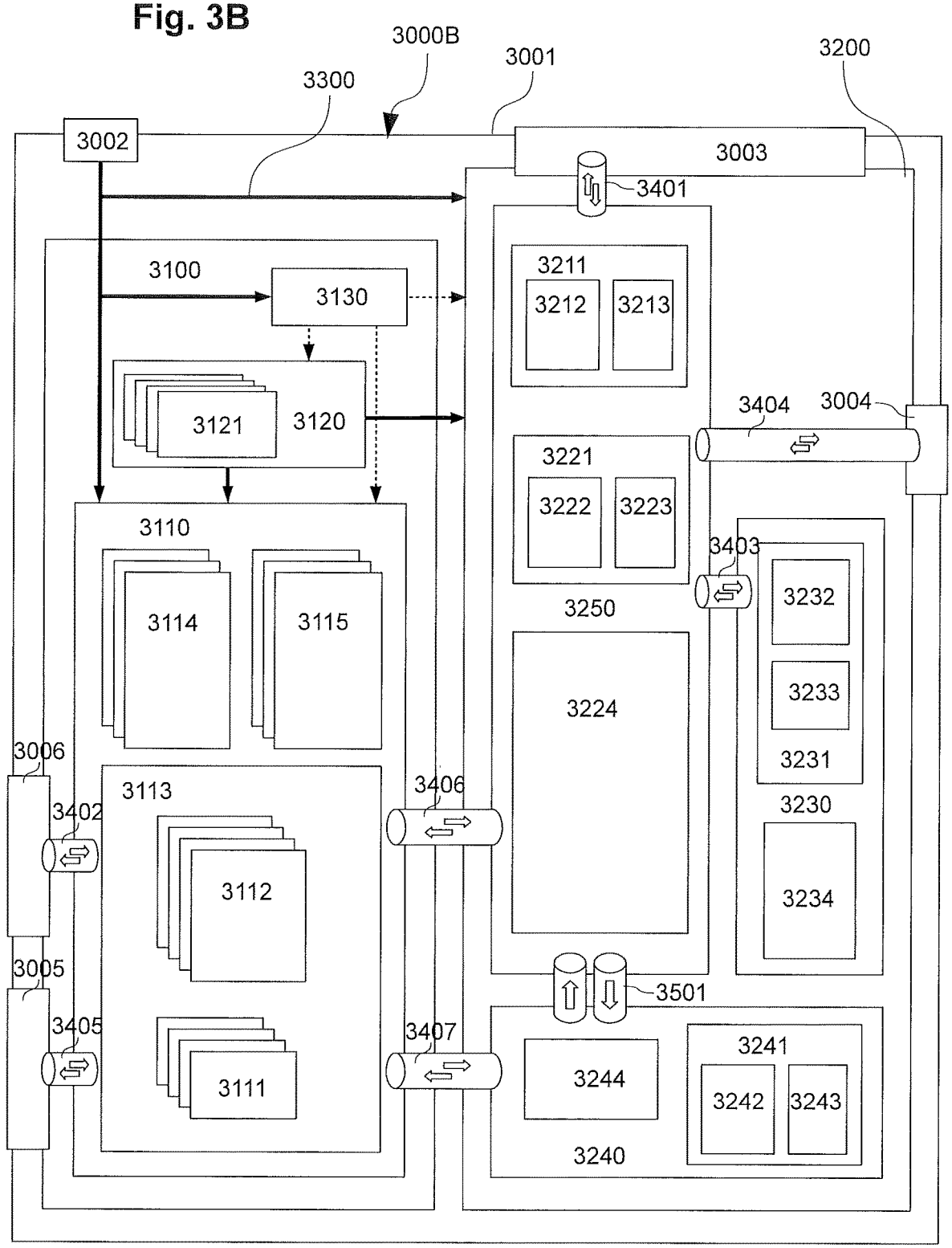
FIG. 3B is an exemplary schematic diagram showing another exemplary structural architecture of a storage control system according to another exemplary embodiment.

FIG. 3B is an exemplary schematic diagram showing another exemplary structural architecture of a storage control system according to another exemplary embodiment, in which an exemplary storage control apparatus 3000B is exemplarily shown which differs from the apparatus in FIG. 3A in particular in that the network interface portion and the data movement management portion are integrated into a single portion, i.e. into the network interface and data movement management portion 3250 (while the fast-path connections 3502 are exemplarily not shown in FIG. 3B, similar fast-path connections may be provided between the processing units 3211 and 3221). It is to be noted that similar or same units, modules or portions having similar or same structure and/or functions are depicted with similar reference numerals in FIGS. 3A and 3B.

Figure 3C:
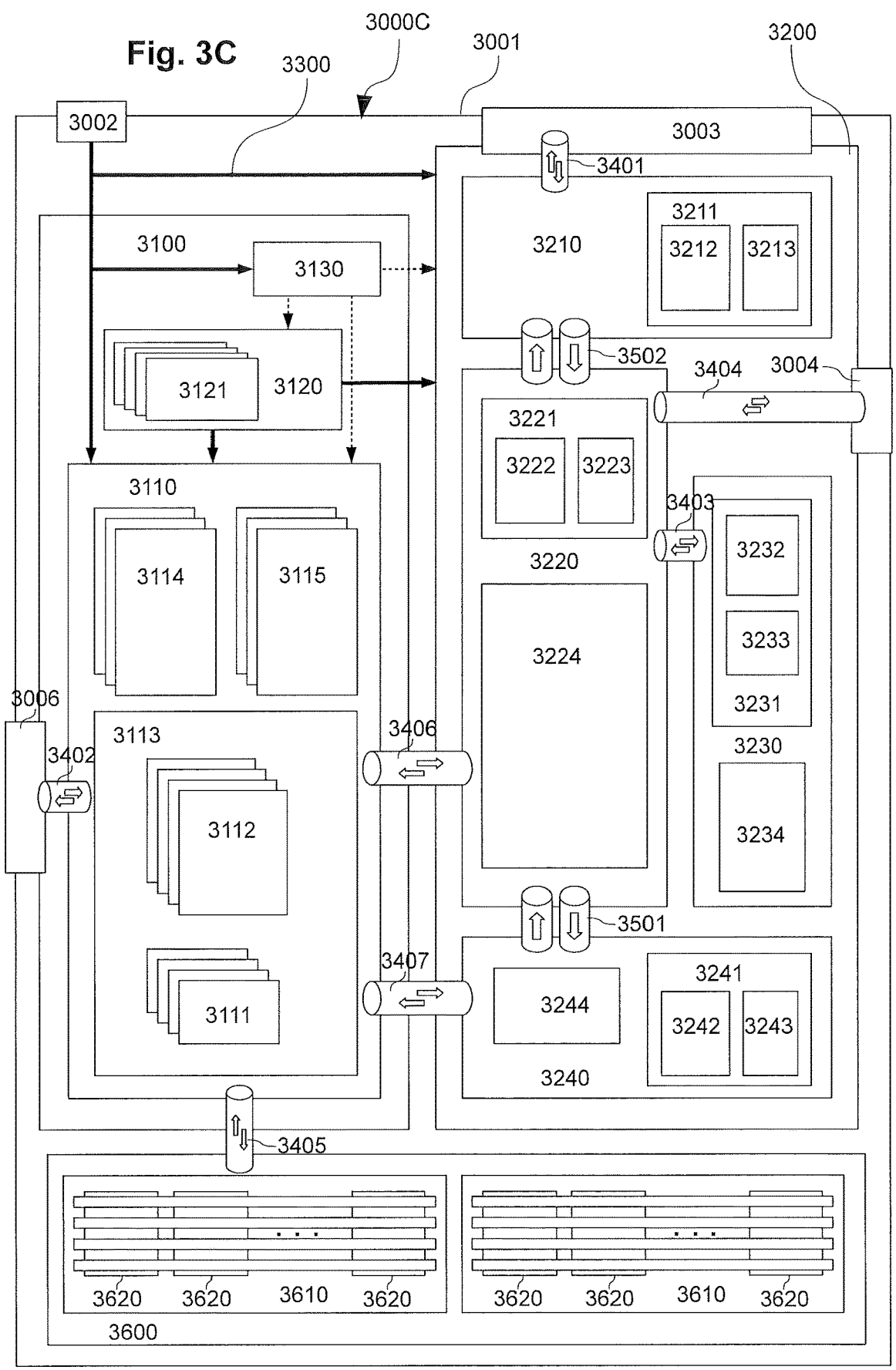
FIG. 3C is an exemplary schematic diagram showing another exemplary structural architecture of a storage control system according to another exemplary embodiment.

FIG. 3C is an exemplary schematic diagram showing another exemplary structural architecture of a storage control system according to another exemplary embodiment. The exemplary storage control apparatus 3000C of FIG. 3C may exemplarily be used in connection with an example of embodying a storage control apparatus 1800 according to the exemplary concept of FIG. 2B. It is to be noted that similar or same units, modules or portions having similar or same structure and/or functions are depicted with similar reference numerals in FIGS. 3A and 3C.

While the computer system 3100 and the programmable logic device 3200 of the storage control apparatus 3000C in FIG. 3C may be structurally and functionally be provided similar to the architecture of the storage control apparatus 3000A in FIG. 3A, The storage apparatus 3000C further comprises a storage device unit 3600 which comprises a plurality of storage devices 3620 (which may be provided in plural storage device groups 3610, e.g. package groups in case of flash memory devices or flash drives). The storage devices 3620 may be configured as one or more RAID groups 3630 spanning multiple storage devices 3620 to store data, mirror data and/or parity information according to one or more RAID configurations.

The data processing portion 3110 of the computer system 3100 is exemplarily and internally connected to the storage device unit 3600 by the bus connection 3402, so that storage interface unit 3005 is exemplarily omitted. In other exemplary embodiments, a storage interface unit 3005 may be additionally provided to connect additional external storage apparatuses, if desired, e.g. to enhance storage capacity or to remote copy data to a distant storage controller or storage system on a secondary site (e.g. for disaster recovery purposes).

In the above, plural structural exemplary embodiments have been described, and the following description relates to functional architecture of systems or apparatuses according to exemplary embodiments. These may be implemented on structural systems according to the above exemplary embodiments or modifications above, but are not limited to such structures. Specifically, the above structural implementations are in no way limited to operating according to the functional architectures as exemplarily explained below, and implementing the functional architectures as described exemplarily below is in no way limited to being implemented in structural as exemplarily explained above. In consequence, while the above and below structural and functional architectures may be related to each other in some embodiments, the may also be provided independently by utilizing a different structural implementation or by utilizing a different functional implementation.

FIG. 4 is an exemplary schematic diagram showing an exemplary functional architecture of a storage control system (e.g. storage control apparatus) in a normal operation state according to an exemplary embodiment.

On a first hardware layer (e.g. the computer system 3100 of one of the above exemplary embodiments), the hardware resources including a processor unit (e.g. a multi-core structure including a plurality of processors or processor cores), a memory unit (e.g. including volatile memories for the processors, as well as e.g. a non-volatile memory or multiple non-volatile memories (e.g. cache memories), an interface unit for interfacing to storage devices, external management computers and/or host computers, a system unit (e.g. including a BIOS or the like, and firmware memories or the like), a storage unit (including one or more storage devices such as one or more hard disks and/or one or more flash memories and/or solid-state drives), and a battery unit to provide electric power in a case of an occurred external power failure may exemplarily provided.

On a second hardware layer (which may be provided by the programmable logic device 3200 e.g. by a of one of the above exemplary embodiments, or which may alternatively be provided also by a software layer) provides the functions of a disk interface module DIM (e.g. by a disk interface portion as exemplarily described above), a data movement module DMM (e.g. by a data movement portion or network interface and data movement management portion as exemplarily described above), a file system management module FSM (e.g. by a file system management portion as exemplarily described above), and a network interface module NIM (e.g. by a network interface portion or network interface and data movement management portion as exemplarily described above).

On the processor unit of the first hardware layer, the block-level management operating system BLM OS is executed, and, among the software components executed on the block-level management operating system BLM OS, the processor unit of the first hardware layer exemplarily executes a block-level management component BLMC and a virtualization management component (e.g. a hypervisor), preferably on different processors or processor cores of the processor unit for reasons of efficiency and independent processing abilities.

The block-level management component BLMC and the hypervisor are configured to communicate via a communication interface A.

The block-level management component BLMC is configured to manage, process and control block-level services such as e.g. writing data to storage devices based on I/O request relating to block-level related services (e.g. processing and executing I/O requests of one or more communication protocols relating to logical data blocks, physical data blocks, logical block addresses and physical block addresses of data on storage devices internally and/or externally connected to the computer system of the first hardware layer). Also, the block-level management component BLMC is configured to control storage devices internally and/or externally connected to the computer system of the first hardware layer, and may be configured to control functions such as storage tiering, wear leveling functions and/or configuring storage devices in RAID groups according to one or more RAID configurations or RAID levels. The block-level management component BLMC may also be configured, in connection with controlling and managing RAID configurations or RAID levels, to calculate parities in connection with data writes to storage devices.

Exemplarily, the block-level management component BLMC may process block-level related storage requests which may be received either directly from connected host computers (e.g. via the interface unit 3006) or via the connection to the programmable logic device (e.g. via bus connection 3407).

The virtualization management component (e.g. a hypervisor) is exemplarily configured to provide and manage one or more virtual machines (e.g. referred to as logical partitions or LPARs) on the basis of hardware resources of the computer system of the first hardware layer. Such management of virtual machines may include assigning one or more processors or processor cores, one or more memories or memory areas, one or more storage devices or storage areas (e.g. as logical volumes or virtual logical volumes) on storage devices, and/or one or more interfaces to a virtual machine.

In FIG. 4, the virtualization management component (e.g. a hypervisor) exemplarily manages and provides the virtual machines VM1 and VM2. On the virtual machine VM2, an operating system OS3 is executed, and on the operating system OS3 there is exemplarily executed an application APP. More importantly, on the virtual machine VM1, an operating system FLM OS (file-level management operating system) is executed, and on the operating system FLM OS the file-level-management component FLMC is operated and, in parallel to the file-level-management component FLMC, the operating system FLM OS also exemplarily operates a system management component SMC.

The system management component SMC is configured to provide a graphical user interface (GUI) and/or command line interface (CLI) to a management computer connected via an interface unit (e.g. via the interface unit 3004 or via an interface unit of the computer system assigned to the virtual machine VM1 by the hypervisor). This allows an administrator to control management settings of the file system management of the storage control apparatus.

The file-level management component FLMC is configured to manage, process and control file-level services such as e.g. I/O request directed to files and directories or file objects and directory objects, or metadata relating to files and directories associated with one or more file systems managed by the storage control apparatus, e.g. I/O request relating to file-level related services (e.g. processing and executing I/O requests of one or more communication protocols relating to files and/or directories or metadata thereof). Specifically, the file-level management component FLMC may be configured to handle header processing and header decoding, or error handling in connection with I/O request relating to file-level related services.

The file-level management component FLMC is exemplarily configured to communicate with the virtualization management component (e.g. a hypervisor) via a communication interface B. For communicating with the block-level management component BLMC in the normal operation, the file-level management component FLMC can communicate indirectly via the virtualization management component (e.g. a hypervisor) by means of the communication interfaces A and B, wherein the virtualization management component (e.g. a hypervisor) is configured to transfer communication messages and translate between protocols of the communication interfaces A and B.

However, such communication is not preferable for transfer of larger amounts of data such as e.g. in a data backup process or a data restoration process as discussed below. Exemplary embodiments described below therefore propose different communication methods to perform data backup process or a data restoration process, e.g. in connection with an occurrence of a power failure.

In normal operation, in some exemplary embodiments, file-level related services are managed and processed by the modules of the second hardware layer and the file-level management component FLMC.

The network interface module NIM is exemplarily configured to receive I/O request (exemplarily for receiving file-level related requests) from one or more host computers connected to a network interface unit connected to the network interface module NIM, and to send the received (file-level related) I/O requests to the data movement management module DMM (which may exemplarily include a non-volatile memory to temporarily store such request messages, e.g. the memory 3224 in the above exemplary embodiments). The network interface module NIM is exemplarily further configured to transfer (file-level related) I/O responses received from the data movement management module DMM to the designated connected host computer in response to a previously received (file-level related) I/O request.

The data movement management module DMM is exemplarily configured to receive (file-level related) I/O requests from the network interface module NIM and to store such request to a non-volatile memory (e.g. the memory 3224 in the above exemplary embodiments). Here communications between the data movement management module DMM and the network interface module NIM may be implemented by a bus system or more preferably by fast-path connections as described for exemplary embodiments above.

The data movement management module DMM is exemplarily further configured to extract header information from received (file-level related) I/O requests and to either decode such headers on its own for simple (file-level related) I/O requests and/or to transfer the extracted header information, e.g. via an interface C (structurally e.g. via the bus connection 3406 in the above exemplary embodiments), to the file-level management component FLMC for header processing and message decoding by the file-level management component FLMC.

By decoding the headers, the file-level management component FLMC generates a corresponding file system management inquiry and transfers the corresponding file system management inquiry to the file system management module FSM, e.g. via an interface D (structurally e.g. via the bus connections 3406 and 3403 in the above exemplary embodiments). Alternatively, if the header can be decoded by the data movement management module DMM, the data movement management module DMM directly may send the corresponding file system management inquiry to the file system management module FSM directly (e.g. via the bus connection 3403 in the above exemplary embodiments).

That is, in case of a file-service related I/O request, upon receiving the internal file system management inquiry at the file system management module FSM, the file system management module translates the file-level I/O request to a block-level I/O request based on metadata on the managed file system. Then, the corresponding block-level I/O request is transferred via the interface E (structurally e.g. via the fast-path connections 3501 and the bus connections 3403 and 3407) to the block-level management component BLMC to be processed to provide the respective block-level service.

The file system metadata may either be held in a cache memory (e.g. memory 3234 in exemplary embodiments above) of the file system management module FSM or request such metadata from the storage devices via the disk interface module DIM (the DIM may also include its own cache memory such as e.g. the cache memory 3244 in exemplary embodiments above).

Here, obtaining the necessary metadata may also be requested from storage devices based on block-level I/O requests transferred via the disk interface module DIM, and based on the metadata the file system management module FSM may generate corresponding block-level I/O requests to be sent to the block-level-management side to process the corresponding block-level I/O requests.

In accordance with the above, block-level I/O requests are received at the block-level management component BLMC via the interface E from the disk interface module DIM to be then processes and managed by the block-level management component BLMC similar to block-level I/O requests which are directly received from host computers at the block-level management component BLMC through the interface unit 3006.

For generating a corresponding file-related I/O response, once the received block-level I/O requests are processed by the block-level management component BLMC and corresponding block-level I/O responses are generated by the block-level management component BLMC (either on the basis of data held in its own cache memory or based on data requested from storage devices), the respective block-level I/O responses are transferred back to the disk interface module DIM via interface E, to be returned to the requesting host as file-level I/O responses, via the data movement management module DMM and the network interface module NIM (which may also be implemented to a single network interface and data movement portion, see e.g. FIG. 3C) upon conversion into the corresponding file-level I/O response by the file system management module FSM and/or by involvement in response header generation by the file-level management component FLMC.

As becomes apparent from the above, the system/apparatus according to FIG. 4 may provide block-level services to hosts connected to the interface unit 3006 of the computer system and file-level services to hosts connected to the network interface module NIM, wherein block-services are managed and processed by the block-level management component BLMC and file-services are managed and processed by the file-level management component FLMC together with the network interface module NIM, the file system management module FSM, the data movement management module DMM and the disk interface module DIM, as may exemplarily be provided by a programmable logic device of the second hardware layer.

In other exemplary embodiments, the functions of the network interface module NIM, the file system management module FSM, the data movement management module DMM and the disk interface module DIM may be provided by software running on a virtual machine (either also on VM1 or on another virtual machine such as e.g. VM2).

However, as mentioned above, the indirect communication via the hypervisor through interfaces A and B between the block-level management component BLMC and the file-level management component FLMC is not preferable for transfer of larger amounts of data such as e.g. in a data backup process or a data restoration process as discussed below. Exemplary embodiments described below therefore propose different communication methods to perform data backup process or a data restoration process, e.g. in connection with an occurrence of a power failure.

FIGS. 5A to 5D represent exemplary schematic diagram showing an exemplary functional architecture of a storage control system 3000 and functional operations for handling various communications and handling of I/O requests for managing both of block-level storage services (e.g. FIG. 5A) and file-level storage services (e.g. FIGS. 5B and 5C), and for handling communications between the block-level management side and the file-level management side of the storage control system 3000. The storage control system 3000 is exemplary based on the storage control system 3000A of FIG. 3A but may also be applied to either of the storage control systems 3000B and 3000C of FIGS. 3B and 3C, while in the latter case, the storage apparatus 1301 will be implemented integrated into the storage control apparatus 3000C.

Exemplary, in FIGS. 5A to 5D, a host computer 1001 is communicably connected to the interface unit 3006 and another host computer 1002 is communicably connected to the interface unit 3003. The host computer 1001 (e.g. another file system server) may use block-level protocol communications, e.g. by directly addressing volumes and block addresses in storage devices, and the host computer 1002 may use file-level protocol communications, e.g. by directly addressing files or file objects and/or directories or directory objects in one or more file systems. However, other exemplary embodiments, one host computer may be connected to both of the interface units 3003 and 3006, and/or plural hosts may be connected to each of the interface units 3003 and 3006. Further exemplarily, a storage apparatus 1301 including multiple storage devices (such as e.g. hard disk drives, flash modules with flash packages and/or solid state drives) is communicably connected to the interface unit 3005 of the storage control system 3000.

Figure 5A:
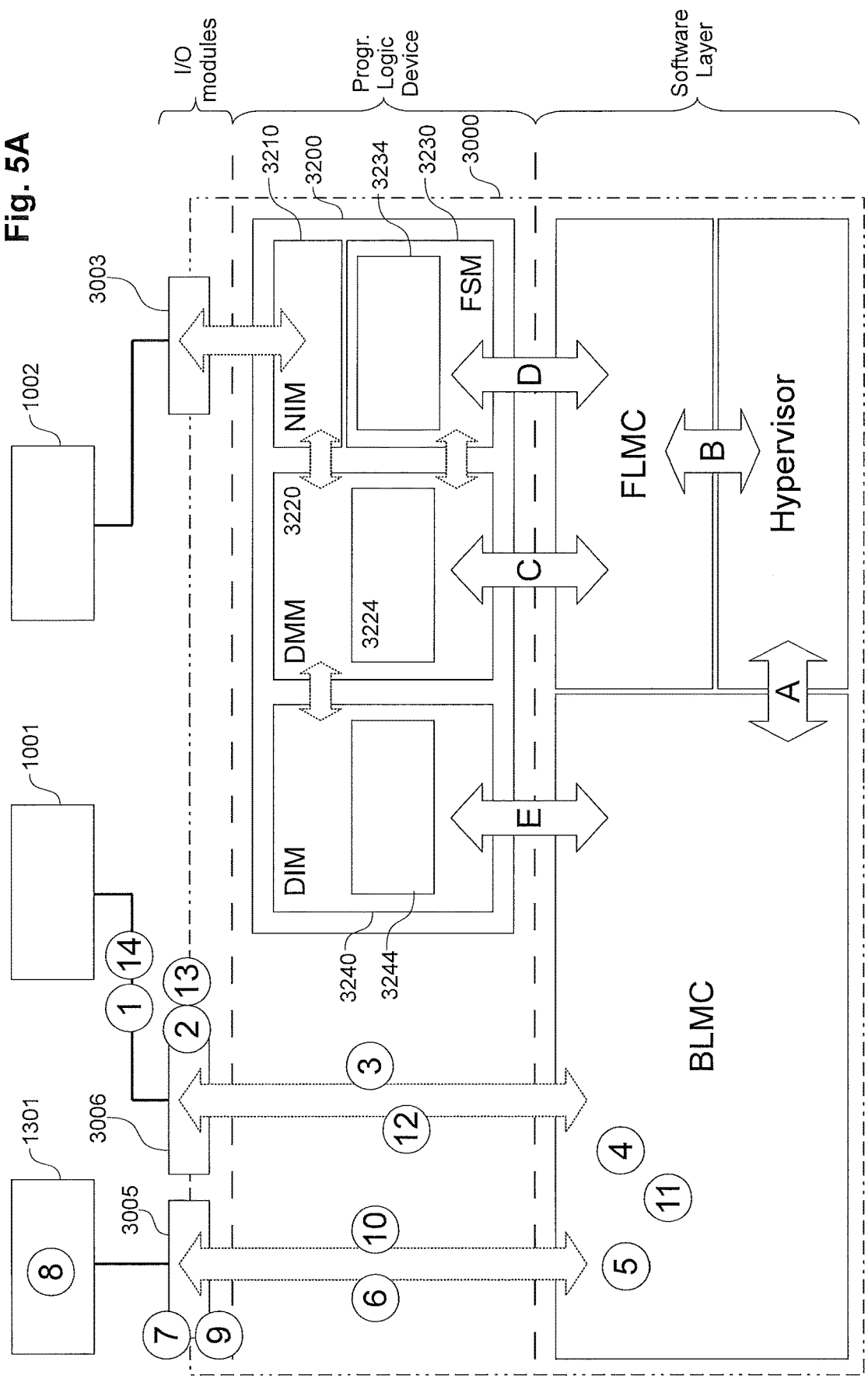
FIG. 5A is an exemplary schematic diagram showing an exemplary functional architecture of a storage control system and functional operations in handling block-level related requests from a host according to an exemplary embodiment.

FIG. 5A is an exemplary schematic diagram showing an exemplary functional architecture of a storage control system 3000 and functional operations in handling block-level related requests from a host according to an exemplary embodiment.

At first, via the connection to the interface unit 3006, the host computer 1001 exemplary issues an I/O request to the storage control system 3000 (as indicated by No. 1 in FIG. 5A). The I/O request may, for example, be a write request to write data—in units of blocks—to one or more blocks of a storage volume or a read request to read data—in units of blocks—from one or more blocks of a storage volume, by using a block-level storage communication protocol such as e.g. SCSI and FiberChannel protocols or the like.

Such (second) block-level storage related request is received at the interface unit 3006 (as indicated by No. 2 in FIG. 5A) and transmitted to the block-level management software component BLMC (as indicated by No. 3 in FIG. 5A), which is running on the computer system, and specifically exemplarily on the processor unit thereof, and the block-level management software component BLMC receives the (second) block-level storage related request (as indicated by No. 4 in FIG. 5A).

The received (second) block-level storage related request is processed by the block-level management software component BLMC (as indicated by No. 5 in FIG. 5A), and this processing may involve processing such as header decoding (e.g. decoding a header message of the received I/O request), volume address mapping processing (e.g. managing a mapping between a logical volume address used in the I/O request and a logical or physical volume address of the actual data on storage devices of the storage apparatus 1301), block address mapping management processing (e.g. managing a mapping between a logical block addresses and physical block addresses on storage devices of the storage apparatus 1301), RAID configuration management processing including e.g. performing parity calculations and RAID group management processing, or the like. Typically, such processing may include operations performed by RAID controllers and/or storage controllers operating on a block-service level.

Then, a corresponding storage control command message, which is generated by the block-level management software component BLMC, is transmitted to the storage apparatus 1301 (as indicated by No. 6 in FIG. 5A) via the interface unit 3005 (as indicated by No. 7 in FIG. 5A). The storage apparatus 1301 performs the operations as instructed in the storage control command message (as indicated by No. 8 in FIG. 5A) and returns a corresponding storage control response message to the interface unit 3005 (as indicated by No. 9 in FIG. 5A) so that the corresponding storage control response message is received at the block-level management software component BLMC (as indicated by No. 10 in FIG. 5A).

For example, if the received (second) block-related storage request related I/O request was relating to a write request, the storage control command message is generated as one or more instruction message(s) instructing the storage apparatus 1301 to write the write data (and potentially additional parity data in accordance with a RAID configuration) in units of data blocks to specified block addresses in specified storage volumes or specified storage drives of the storage devices of the storage apparatus 1301.

That is, the block-level management software component BLMC controls and manages storage of data in units of blocks across the storage devices of the storage apparatus 1301.

In some exemplary embodiments, the storage apparatus 1301 may directly write the write data according to the instructions to the specified block addresses in specified storage volumes or specified storage drives of the storage devices of the storage apparatus 1301 and return a write confirmation message as the corresponding storage control response message (as indicated by No. 10 in FIG. 5A), or, in other exemplary embodiments, it may write the data to its internal cache memory and immediately return a write request receipt acknowledgment as the corresponding storage control response message.

For example, if the received (second) block-related storage request related I/O request was relating to a read request, the storage control command message is generated as one or more instruction message(s) instructing the storage apparatus 1301 to read the read data in units of data blocks from specified block addresses in specified storage volumes or specified storage drives of the storage devices of the storage apparatus 1301.

The storage apparatus 1301 may then read the data according to the instructions from the specified block addresses in specified storage volumes or specified storage drives of the storage devices of the storage apparatus 1301 and return a read response message as the corresponding storage control response message (as indicated by No. 10 in FIG. 5A), including the requested read data. Otherwise, if the requested read data is already available in a cache memory of the computer system, the block-level management software component BLMC may directly generate the read response message to be transmitted back to the host on the basis of the cache data.

The block-level management software component BLMC receives the storage control response message from the storage apparatus 1301 via the interface unit 3005 (as indicated by No. 9 in FIG. 5A) to be received by the block-level management software component BLMC (as indicated by No. 10 in FIG. 5A). The block-level management software component BLMC also generates the appropriate I/O response (as indicated by No. 11 in FIG. 5A), e.g. including header encoding, and returns the generated I/O response as a block-level related response back to the host computer 1001 via the interface unit 3006 (as indicated by Nos. 12, 13 and 14 in FIG. 5A).

For example, in case of a block-level related write request, the write acknowledgment response is returned to the host computer (e.g. synchronously when the data has been written already to the storage devices of the storage apparatus 1301, or asynchronously after writing the data to its cache memory of the computer system of the storage control system 3000 and before actually writing the data to the storage devices of the storage apparatus 1301), and, in case of a block-level related read request, the read response including the requested data is returned to the host computer.

By above aspects, the storage control apparatus 3000 is configured to provide block-level storage services relating to (second) block-related storage requests to externally connected hosts via the interface unit 3006 under management and control by the block-level management software component BLMC.

FIG. 5B is an exemplary schematic diagram showing an exemplary functional architecture of a storage control system 3000 and functional operations in handling file-level related requests from a host according to an exemplary embodiment.

At first, via the connection to the interface unit 3003, the host computer 1002 exemplary issues a file-level storage related I/O request to the storage control system 3000 (as indicated by No. 1 in FIG. 5B). The I/O request may, for example, be a modifying I/O request to modify data in a managed file system or an information inquiring I/O request requesting data, metadata or other information on a managed file system, by using a file-level storage communication protocol such as e.g. SMB/CIFS or NFS or the like. Exemplarily, file systems may include file system structures including files, file objects, directories, directory trees, or the like, and one or more storage systems may by managed and/or controlled by the storage control system 3000.

File-level related modifying I/O requests may exemplarily include write requests for writing data to one or more files of the managed file system(s), file creation requests or directory creation requests for creating new files or new directories in the managed file system(s), move request for moving files and/or directories in the managed file system(s), delete requests for deleting files and/or directories in the managed file system(s), copy requests of copying files and/or directories in the managed file system(s), renaming requests for renaming files and/or directories in the managed file system(s), and many more. File-level related information inquiring I/O requests may exemplarily include read requests for reading data from one or more files of the managed file system(s), or metadata inquiries requesting metadata information on the files, directories or directory tree structure of the managed file system(s), including inquiries on names and handles of files and directories, names and attributes of child objects of directories or parent objects of directories or files, attributes such as length of file, link counts, etc., and many more.

Such file-level storage related request is received at the interface unit 3003 (as indicated by No. 2 in FIG. 5B) and transmitted to the network interface module/portion NIM 3210 of the programmable logic device 3200 (as indicated by No. 3 in FIG. 5B), The network interface module/portion NIM 3210 may store received data into an internal memory until the full packet of the request message of the file-level storage related I/O request is received at the network interface module/portion NIM 3210 via the interface unit 3003. In simple cases, such as for network requests (e.g. in session setup or the like, for opening or closing a connection to a host), the network interface module/portion NIM 3210 may be configured to handle response generation itself.

However, for file-level storage related I/O requests, the message packet of the I/O request is transferred from the network interface module/portion NIM 3210 to the data movement management module/portion DMM 3220 of the programmable logic device 3200 (as indicated by No. 4 in FIG. 5B), for example via a fast path communication path, and is stored by the the in the data movement management module/portion DMM 3220 into its non-volatile memory NVRAM 3224 (as indicated by No. 5 in FIG. 5B).

The data movement management module/portion DMM 3220 is configured to extract the header information from the received file-level storage related I/O request and to transmit the extracted header information (e.g. via an internal bus connection to the computer system) to the file-level management software component FLMC (as indicated by No. 6 in FIG. 5B), while maintaining the payload of the I/O request in the non-volatile memory NVRAM 3224 (e.g. in case of a write request, only the header information may need to be transferred to the file-level management software component FLMC, while the actual write data may stay only stored in the non-volatile memory NVRAM 3224).

Here, it is to be noted that in some exemplary embodiments, the full I/O request messages including header information and payload will be kept exemplarily in the non-volatile memory NVRAM 3224, and in below embodiments relating also to data backup processes, preferably the data from the non-volatile memory NVRAM 3224 is a source of such data backup processes, while in other exemplary embodiments the source of data backup may also be the cache memory 3244 of the disk interface module/portion DIM 3240 and/or the cache memory 3234 of the file system management module/portion FSM 3230 in other embodiments, alternatively or in addition.

The file-level management software component FLMC is running on the computer system in parallel to the block-level management software component BLMC, and specifically exemplarily on a virtual machine provided by the hypervisor/virtualization management software component running on the processor unit of the computer system, and the file-level management software component FLMC receives the file-level storage related request's header information (as indicated by Nos. 6 and 7 in FIG. 5B).

The file-level management software component FLMC is configured to process the file-level storage related request's header information and to perform header decoding of the file-level storage related request's header information (as indicated by No. 7 in FIG. 5B) and is configured to generate a corresponding I/O request and to send the corresponding I/O request (e.g. an internal file system inquiry according to the I/O request after conversion) to the file system management portion/module FSM 3230 of the programmable logic device 3200 (as indicated by No. 8 in FIG. 5B). Alternatively, in some simpler I/O request cases, the data movement management module/portion DMM 3220 may directly decode the header information and send the corresponding I/O request to the file system management portion/module FSM 3230 of the programmable logic device 3200 directly by bypassing the file-level management software component FLMC (sometimes referred to as a so-called Auto-Inquiry).

Based on the received request and based on metadata of the file system, the file system management portion/module FSM 3230 is configured to generate a corresponding (first) block-level related I/O request (as indicated by No. 9 in FIG. 5B), in particular on the basis of metadata management in which metadata associates file data and directory data (including their metadata) of the managed file system(s) with block addresses of data. Accordingly, the file system management portion/module FSM 3230 (e.g. in cooperation with management by the file-level management software component FLMC) is configured to translate/convert the file-level related I/O request to a corresponding (first) block-level related I/O request. The required metadata may either be read from the metadata cache 3234 of the file system management portion/module FSM 3230, or may be requested by another appropriate corresponding (first) block-level related I/O request from the block side.

The generated (first) block-level related I/O request(s) (i.e. either the block-level related I/O request corresponding to the file-level related I/O request or another block-level related I/O request requesting metadata required for converting the file-level related I/O request to the corresponding block-level related I/O request) is (are) transferred to the data movement management module/portion DMM 3220 from the file system management portion/module FSM 3230 (as indicated by No. 10 in FIG. 5B), and the generated (first) block-level related I/O request(s) is (are) then further transferred from data movement management module/portion DMM 3220 (e.g. also combined with the corresponding payload, e.g. the write data in case of a write request) to the disk interface portion/module DIM 3240 of the programmable logic device 3200 (as indicated by No. 11 in FIG. 5B) to be stored in the cache memory 3244 of the disk interface portion/module DIM 3240 and/or to be processed based on data stored in the cache memory 3244 of the disk interface portion/module DIM 3240 (as indicated by No. 12 in FIG. 5B).

For example, in case of a write request (or other modifying request), the disk interface portion/module DIM 3240 of the programmable logic device 3200 stores the write request in the cache memory 3244 of the disk interface portion/module DIM 3240, and the response processing may be initiated, and at regular intervals or upon certain criteria such as e.g. cache memory usage, the accumulated write requests may be sent to the block-side as explained below. Alternatively, in case of an information inquiring request such as a read request to read user data or a read request to read metadata, the request may be transferred immediately to the block side or be processed based on data in the cache memory 3244 of the disk interface portion/module DIM 3240, if the requested information can be provided based on the data of the cache memory 3244 already.

In case of an information inquiring request such as a read request to read user data or a read request to read metadata, the requested information is returned from the disk interface portion/module DIM 3240 of the programmable logic device 3200 to the data movement management module/portion DMM 3220 (e.g. including requested metadata or requested read data) or, in case of a modifying request such as a write request, the confirmation of writing the corresponding request to the cache memory 3244 of the disk interface portion/module DIM 3240 is acknowledged in a response to the data movement management module/portion DMM 3220 (as indicated by No. 13 in FIG. 5B). For the transmission of the (first) block-level storage related request to the block side, please continue with FIG. 5C further below.

Upon receipt of the corresponding response from the disk interface portion/module DIM 3240 of the programmable logic device 3200, the programmable logic device performs response generation to generate the corresponding file-level storage related I/O response.

In some simpler cases, the header encoding of the corresponding file-level storage related I/O response may be directly instructed (to FSM) or be performed by the data movement management module/portion DMM 3220 (sometimes referred to as so-called Auto-Response). The data movement management module/portion DMM 3220 acts to request (as indicated by No. 14 in FIG. 5B) the file system management portion/module FSM 3230 to generate a corresponding file-level storage related response (i.e. translating/converting back the block-level storage related response to the file-level storage related response based on the file system metadata), and the file system management portion/module FSM 3230 is configured to generate an internal file system response based on the received block-level storage related response or header information thereof and based on the corresponding file system metadata (as indicated by No. 15 in FIG. 5B), and to transfer the generated response to the file-level management software component FLMC (as indicated by No. 16 in FIG. 5B) or to the data movement management module/portion DMM 3220 in case of instructed auto-response.

The file-level management software component FLMC is then configured to generate corresponding header information of the corresponding file-level storage related I/O response based on the internal response received from the file system management portion/module FSM 3230 (as indicated by No. 17 in FIG. 5B). Alternatively, in case of auto-response, this may be performed by the data movement management module/portion DMM 3220.

The generated header information is then transmitted to the data movement management module/portion DMM 3220 (as indicated by No. 18 in FIG. 5B), which may combine a payload data (e.g. the read data in case of a read response) stored in the non-volatile memory NVRAM 3224 with the generated header information to generate the complete corresponding file-level storage related I/O response, and the file-level storage related I/O response (e.g. a read response or a write acknowledgement response) is transferred to the network interface portion/module NIM 3210 (as indicated by No. 20 in FIG. 5B) and the network interface portion/module NIM 3210 transfers the file-level storage related I/O response (as indicated by No. 21 in FIG. 5B) via the interface unit 3003 (as indicated by No. 22 in FIG. 5B) to the host computer 1002 to be received at the host computer 1002 (as indicated by No. 23 in FIG. 5B).

By above aspects, the storage control apparatus 3000 is configured to provide file-level storage services relating to file-related storage requests to externally connected hosts via the interface unit 3003 under management and control by the file-level management software component FLMC and/or the programmable logic device 3200. Specifically, the basic data transfer and response handling may be performed by the programmable logic device 3200, while the file-level management software component FLMC may be involved in higher level operations such as request header decoding and/or response header encoding, or also in more complicated error handling in the processing of file-level storage related requests.

FIG. 5C is an exemplary schematic diagram showing an exemplary functional architecture of a storage control system 3000 and functional operations in handling block-level related requests from a programmable logic device 3200 providing file-level services according to an exemplary embodiment.

Based on the above explanations of FIG. 5B, the block-level storage related request may be stored in the cache memory 3244 of the disk interface portion/module DIM 3240 of the programmable logic device 3200 (as indicated by No. 1 in FIG. 5C). This may be a write request to write data to blocks or a read request to read data from blocks (e.g. to read user data in connection with a file-level storage related read request received from host 1002 via interface unit 3003 as discussed above, or also to read data associated with metadata on the file system or on files or directories thereof, e.g. in connection with a file-level storage related metadata inquiring request received from host 1002 via interface unit 3003 as discussed above, or in connection with metadata needed by the file system management portion/module FSM 3230 required in converting a file-level related request into a block-level related request.

Specifically, the I/O request may, for example, be a write request to write data—in units of blocks—to one or more blocks of a storage volume or a read request to read data—in units of blocks—from one or more blocks of a storage volume, by using a block-level storage communication protocol such as e.g. SCSI and FiberChannel protocols or the like. It may also use an internal proprietary protocol, of course, since the communication is performed via an internal bus system in exemplary embodiments.

At first, the disk interface portion/module DIM 3240 of the programmable logic device 3200 transfers the (first) block-level related I/O request to the block-level management software component BLMC (as indicated by Nos. 2 and 3 in FIG. 5C). Such (first) block-level storage related request is received at block-level management software component BLMC (as indicated by No. 3 in FIG. 5C).

The received (first) block-level storage related request is processed by the block-level management software component BLMC (as indicated by No. 4 in FIG. 5C), and this processing may involve processing such as header decoding (e.g. decoding a header message of the received I/O request), volume address mapping processing (e.g. managing a mapping between a logical volume address used in the I/O request and a logical or physical volume address of the actual data on storage devices of the storage apparatus 1301), block address mapping management processing (e.g. managing a mapping between a logical block addresses and physical block addresses on storage devices of the storage apparatus 1301), RAID configuration management processing including e.g. performing parity calculations and RAID group management processing, or the like. Typically, such processing may include operations performed by RAID controllers and/or storage controllers operating on a block-service level.

Then, a corresponding storage control command message, which is generated by the block-level management software component BLMC, is transmitted to the storage apparatus 1301 (as indicated by Nos. 5 and 6 in FIG. 5C) via the interface unit 3005 (as indicated by No. 7 in FIG. 5C). The storage apparatus 1301 performs the operations as instructed in the storage control command message (as indicated by No. 8 in FIG. 5C) and returns a corresponding storage control response message to the interface unit 3005 (as indicated by No. 9 in FIG. 5C) so that the corresponding storage control response message is received at the block-level management software component BLMC (as indicated by No. 10 in FIG. 5C).

For example, if the received (first) block-related storage request related I/O request was relating to a write request, the storage control command message is generated as one or more instruction message(s) instructing the storage apparatus 1301 to write the write data (and potentially additional parity data in accordance with a RAID configuration) in units of data blocks to specified block addresses in specified storage volumes or specified storage drives of the storage devices of the storage apparatus 1301.

That is, the block-level management software component BLMC controls and manages storage of data in units of blocks across the storage devices of the storage apparatus 1301 similar as in FIG. 5A above.

In some exemplary embodiments, the storage apparatus 1301 may directly write the write data according to the instructions to the specified block addresses in specified storage volumes or specified storage drives of the storage devices of the storage apparatus 1301 and return a write confirmation message as the corresponding storage control response message, or, in other exemplary embodiments, it may write the data to its internal cache memory and immediately return a write request receipt acknowledgment as the corresponding storage control response message.

For example, if the received (first) block-related storage request related I/O request was relating to a read request, the storage control command message is generated as one or more instruction message(s) instructing the storage apparatus 1301 to read the read data in units of data blocks from specified block addresses in specified storage volumes or specified storage drives of the storage devices of the storage apparatus 1301.

The storage apparatus 1301 may then read the data according to the instructions from the specified block addresses in specified storage volumes or specified storage drives of the storage devices of the storage apparatus 1301 and return a read response message as the corresponding storage control response message (as indicated by No. 10 in FIG. 5C), including the requested read data. Otherwise, if the requested read data is already available in a cache memory of the computer system, the block-level management software component BLMC may directly generate the read response message to be transmitted back to the disk interface portion/module DIM 3240 of the programmable logic device 3200 on the basis of the cache data.

The block-level management software component BLMC receives the storage control response message from the storage apparatus 1301 via the interface unit 3005 (as indicated by No. 9 in FIG. 5C) to be received by the block-level management software component BLMC (as indicated by No. 10 in FIG. 5C). The block-level management software component BLMC also generates the appropriate I/O response (as indicated by No. 11 in FIG. 5C), e.g. including header encoding, and returns the generated I/O response as a block-level related response back to the disk interface portion/module DIM 3240 of the programmable logic device 3200 (as indicated by No. 12 in FIG. 5C).

For example, in case of a block-level related write request, the write acknowledgment response is returned to the disk interface portion/module DIM 3240 of the programmable logic device 3200 (e.g. synchronously when the data has been written already to the storage devices of the storage apparatus 1301, or asynchronously after writing the data to its cache memory of the computer system of the storage control system 3000 and before actually writing the data to the storage devices of the storage apparatus 1301), and, in case of a block-level related read request, the read response including the requested data is returned to the disk interface portion/module DIM 3240 of the programmable logic device 3200.

The disk interface portion/module DIM 3240 of the programmable logic device 3200 stores the received response in the cache memory 3244 (as indicated by No. 13 in FIG. 5C) and transfers it back to the data movement management portion/module DMM 3220 (for the following processing of converting the block-level related response back to a corresponding file-level related response to be returned to the host for providing the file-level services, please see again FIG. 5B above, starting with No. 12 in FIG. 5B).

By above aspects, the storage control apparatus 3000 is configured to provide block-level storage services relating to (first) block-related storage requests under management and control by the block-level management software component BLMC, underlying a processing in the block-side of the storage control system above which the block-level management software component BLMC and the programmable logic device 3200 rely to control and manage to provide file-level storage related services by processing file-level related I/O requests.

Figure 5D:
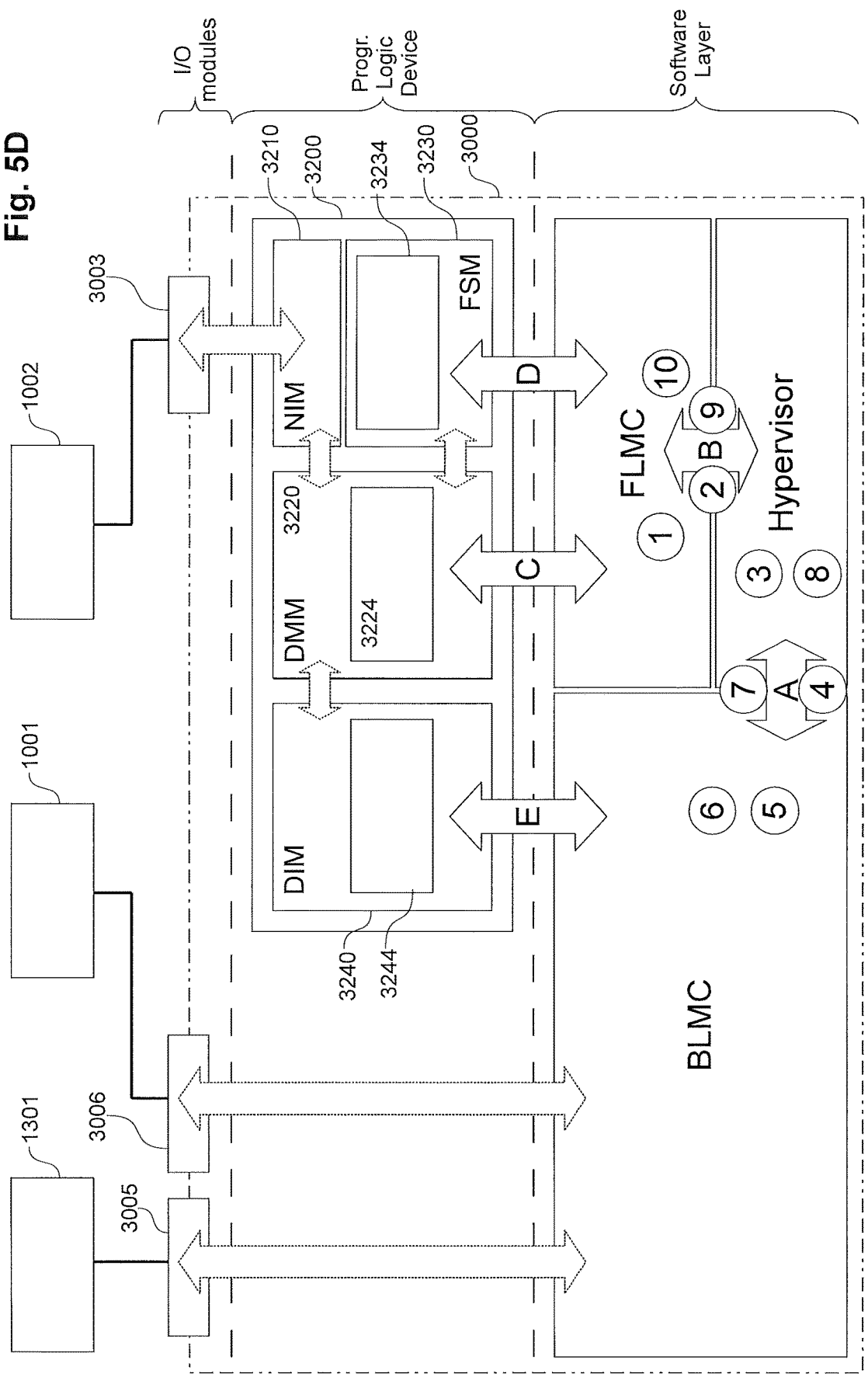
FIG. 5D is an exemplary schematic diagram showing an exemplary functional architecture of a storage control system and functional operations in communications between a block-level storage management software component and a file-level storage management software component according to an exemplary embodiment.

FIG. 5D is an exemplary schematic diagram showing an exemplary functional architecture of a storage control system 3000 and functional operations in communications between a block-level storage management software component BLMC and a file-level storage management software component FLMC according to an exemplary embodiment.

Under normal operation, the block-level storage management software component BLMC and the file-level storage management software component FLMC cannot communicate directly, and the communication is performed indirectly via the hypervisor (virtualization management software component) which managed the virtual machine on which the file-level storage management software component FLMC is running.

Each of the block-level storage management software component BLMC and the file-level storage management software component FLMC is communicably connected to the hypervisor (virtualization management software component) according to one or more respective software-implemented communication interfaces, i.e. the block-level storage management software component BLMC uses interface A to communicate with the hypervisor (virtualization management software component) and the file-level storage management software component FLMC uses interface B to communicate with the hypervisor (virtualization management software component).

Exemplarily, in FIG. 5C, the file-level storage management software component FLMC generates a communication request message according to a communication protocol of the interface B (as indicated by No. 1 in FIG. 5D) and transmits the communication request message via the interface B to the hypervisor (virtualization management software component); as indicated by No. 2 in FIG. 5D.

The hypervisor (virtualization management software component) translates the communication request message, in particular from a communication protocol of the interface B to a communication protocol of the interface A (as indicated by No. 3 in FIG. 5D), and transmits the communication request message via the interface A to the block-level storage management software component BLMC (as indicated by No. 4 in FIG. 5D).

The block-level storage management software component BLMC receives the communication request message (as indicated by No. 5 in FIG. 5D) via the interface A from the hypervisor (virtualization management software component) and processes according to the communication request message (as indicated by No. 6 in FIG. 5D).

An acknowledgement or a created communication response message is then returned/transferred from the block-level storage management software component BLMC (as indicated by No. 7 in FIG. 5D) via the interface A to the hypervisor (virtualization management software component).

The hypervisor (virtualization management software component) translates the communication response message, in particular from a communication protocol of the interface A to a communication protocol of the interface B (as indicated by No. 8 in FIG. 5D), and transmits the communication request message via the interface B to the file-level storage management software component FLMC (as indicated by No. 9 in FIG. 5D), which receives the communication request message from the hypervisor (virtualization management software component); as indicated by No. 10 in FIG. 5D.

In alternative exemplary embodiments, the communication may be performed even in a two-step approach, in which the Nos. 7 to 10 in FIG. 5D only relate to transfer of an acknowledgment response acknowledging receipt of the communication request message, whereas the actual response confirming the processing may be issued in a second step via the hypervisor or even be inquired by the requesting software component. This allows that the hypervisor does not need to wait the actual processing of the communication request message.

Figure 6A:
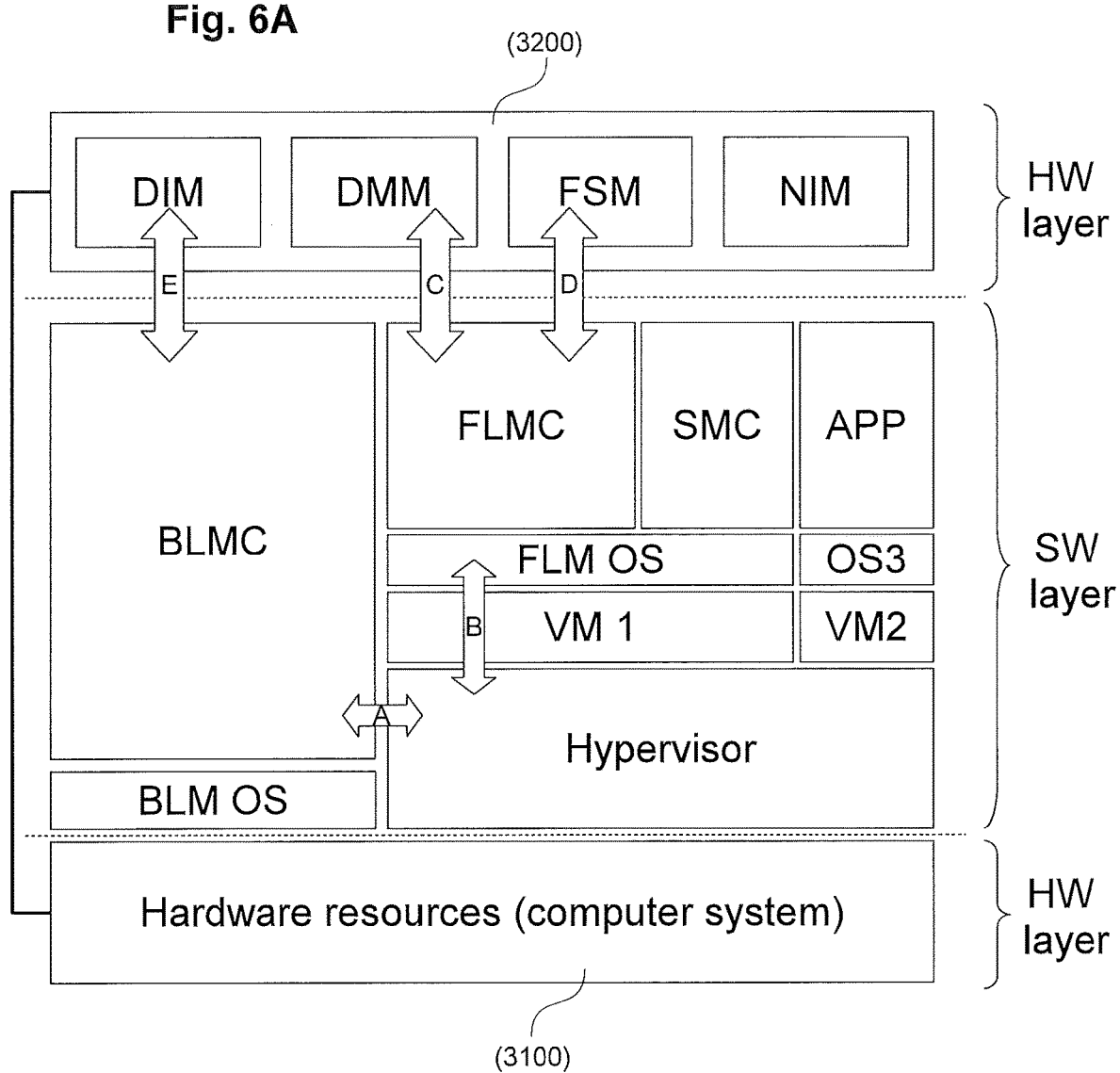
FIG. 6A is an exemplary schematic diagram showing another exemplary functional architecture of a storage control system in a normal operation state according to another exemplary embodiment.

FIG. 6A is an exemplary schematic diagram showing another exemplary functional architecture of a storage control system in a normal operation state according to another exemplary embodiment.

In contrast to FIG. 4, in the storage control system of FIG. 6A, the virtualization management component (e.g. a hypervisor) operates directly on the processor unit of the computer system of the first hardware layer, i.e. in parallel to the block-level management operating system. This has the advantage that the hypervisor may operate more independently from the block-level management component BLMC, and the block-level management component BLMC can be initiated or re-started independently of the hypervisor (and with it the file-level management component FLMC) and vice versa.

Figure 6B:
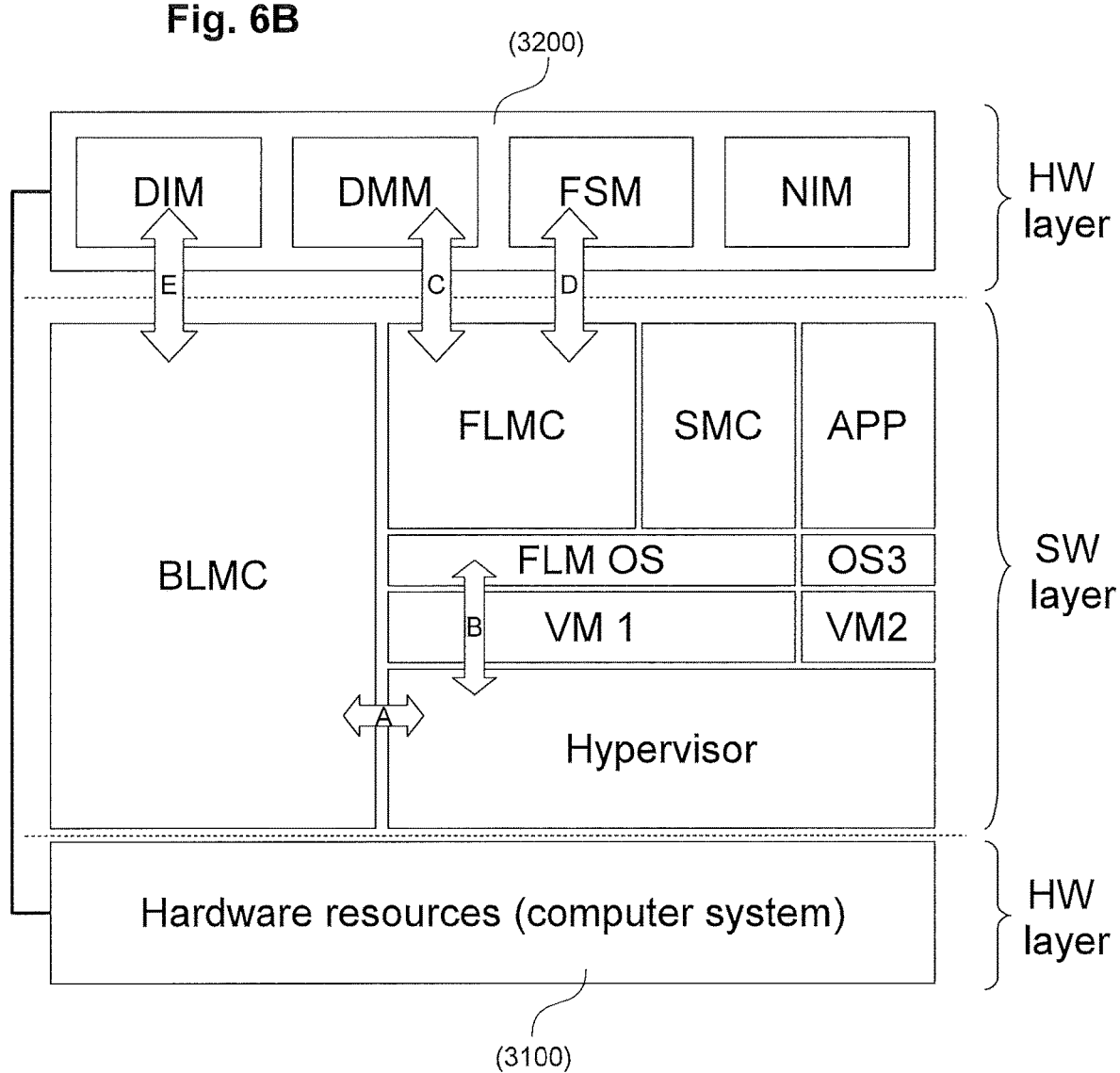
FIG. 6B is an exemplary schematic diagram showing another exemplary functional architecture of a storage control system in a normal operation state according to another exemplary embodiment.

FIG. 6B is an exemplary schematic diagram showing another exemplary functional architecture of a storage control system in a normal operation state according to another exemplary embodiment.

In contrast to FIG. 6A, in the storage control system of FIG. 6B, the block-level management component BLMC operates directly on the processor unit of the computer system of the first hardware layer, independent of an underlying operating system, and the block-level management component BLMC may include a proprietary operating system included into the block-level management component BLMC.

Figure 6C:
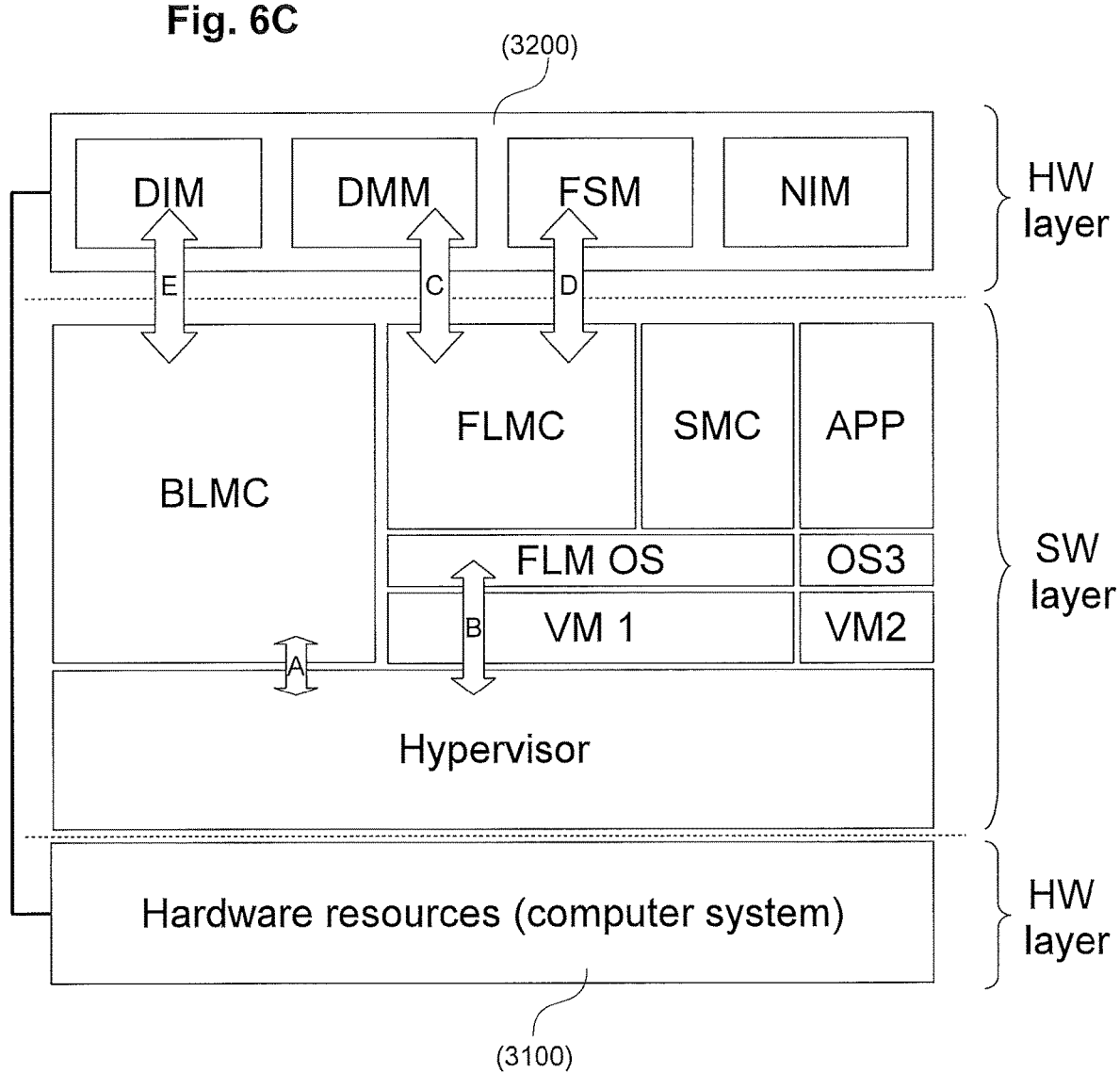
FIG. 6C is an exemplary schematic diagram showing another exemplary functional architecture of a storage control system in a normal operation state according to another exemplary embodiment.

FIG. 6C is an exemplary schematic diagram showing another exemplary functional architecture of a storage control system in a normal operation state according to another exemplary embodiment.

In contrast to FIG. 6B, in the storage control system of FIG. 6C, the block-level management component BLMC operates also on the hypervisor (or on another virtual machine provided by the hypervisor). Still, the block-level management component BLMC communicates indirectly via interfaces A and B through the hypervisor with the file-level management component FLMC.

In view of the above, the below exemplary aspects and embodiments relate to data backup processes and data restoration processes with more efficient transfer of data, in terms of saving power for the data backup process, e.g. in case of a power failure, and in terms of more efficient data transfer in both of the data backup process and the data restoration process.

An underlying idea of some embodiments is, in case of detecting a power failure or voltage drop in the voltage of the power supply, and when preferably switching to a low power mode during an operation under battery power supply, to reboot the computer system to a specifically provided software environment configured to perform quick and energy efficient data backup from non-volatile memories (in particular non-volatile memories which are supplied by the battery unit to preserve the stored data in contrast to storage devices such as hard disks or solid state drives, which preserve stored data without any power supply) to one or more (preferably internal) storage devices, preferably to solid state drives or flash memories which do not consume power when not being accessed (in contrast to hard disks which need power to spin the disk even when not being accessed in some operation states).

That is, when a power failure is detected (e.g. by the power failure detection unit 3130) and the operation of the storage control apparatus/system switches to battery power supply, the apparatus/system initiates a reboot to an energy efficient and data transfer efficient data backup state based on a data backup management environment (software or firmware component).

Figure 7:
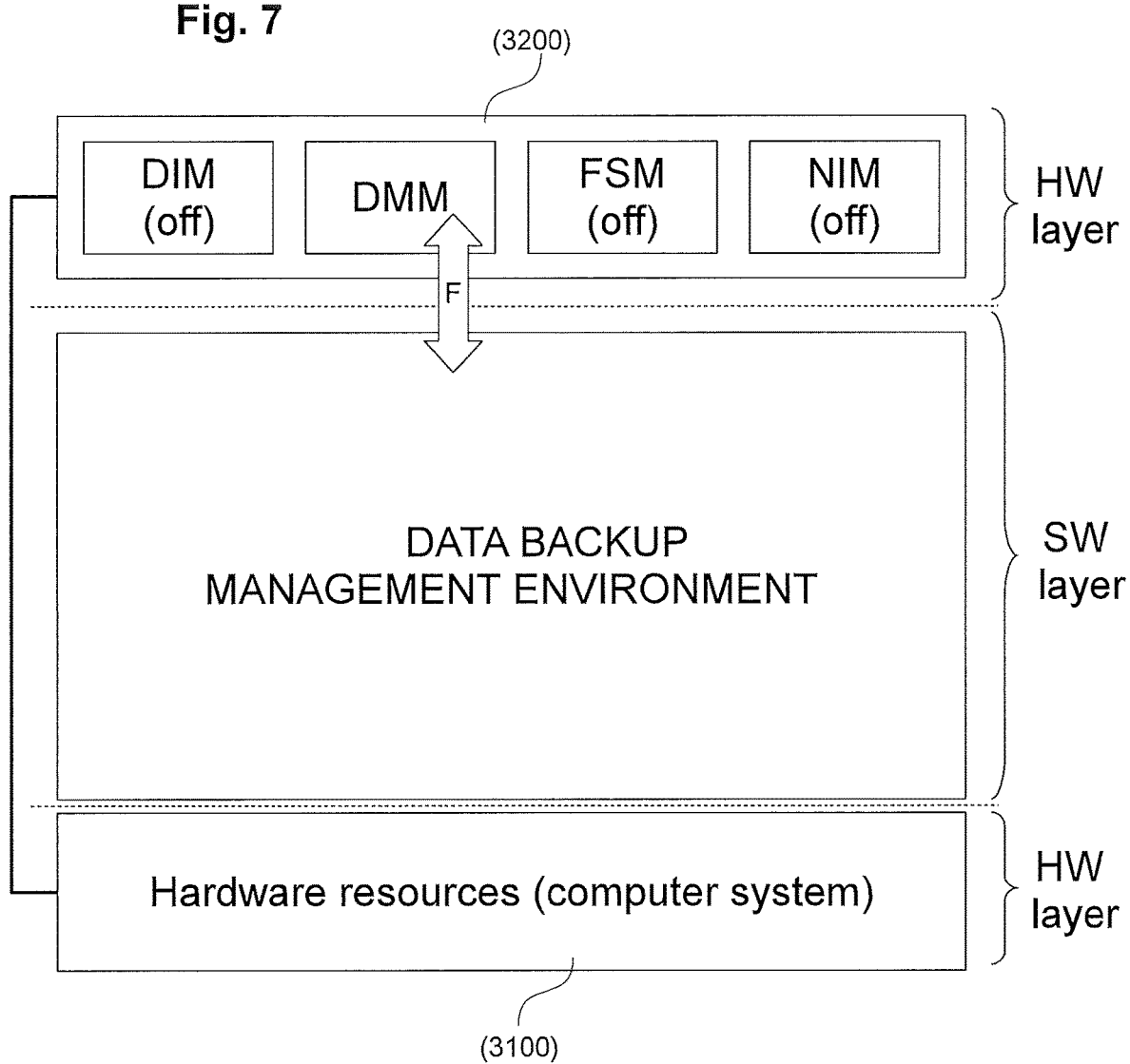
FIG. 7 is an exemplary schematic diagram showing an exemplary functional architecture of a storage control system in a data backup state according to exemplary embodiments.

FIG. 7 is an exemplary schematic diagram showing an exemplary functional architecture of a storage control system in a data backup state according to exemplary embodiments.

In FIG. 7, the hardware layers are exemplarily similar to the hardware layers of any of the exemplary embodiments of FIGS. 4 and 6A to 6C. However, after the reboot, only a data backup management environment is provided in the software layer instead of the multiple operating systems and components of FIGS. 4 and 6A to 6C. On a hardware side, the data backup management environment is preferably also executed in a low power mode in which exemplarily, the disk interface module DIM, the network interface module NIM and/or the file system management module FSM may be switched off, and/or the data backup management environment may only be executed on one single processor or processor core of the processor unit of the computer system to save battery power. This has the advantage that a more compact and more efficient battery unit may be provided as well.

In the low power mode of the second hardware layer, only the data movement management module DMM (and in particular the non-volatile memory thereof) may remain to be supplied with electric power by the battery unit.

The data backup management environment may then be efficiently be configured to obtain the data from the non-volatile memory of the data movement management module DMM via another interface F to backup the data to the computer system (e.g. in addition to backing up data from a non-volatile memory of the computer system used by the block-level management component), and in particular to one or more storage devices thereof. Thereafter, the whole system may shut down. Preferably, the interface F may be provided by means of direct memory access to save power and to provide efficient data transfer rates.

Figure 8A:
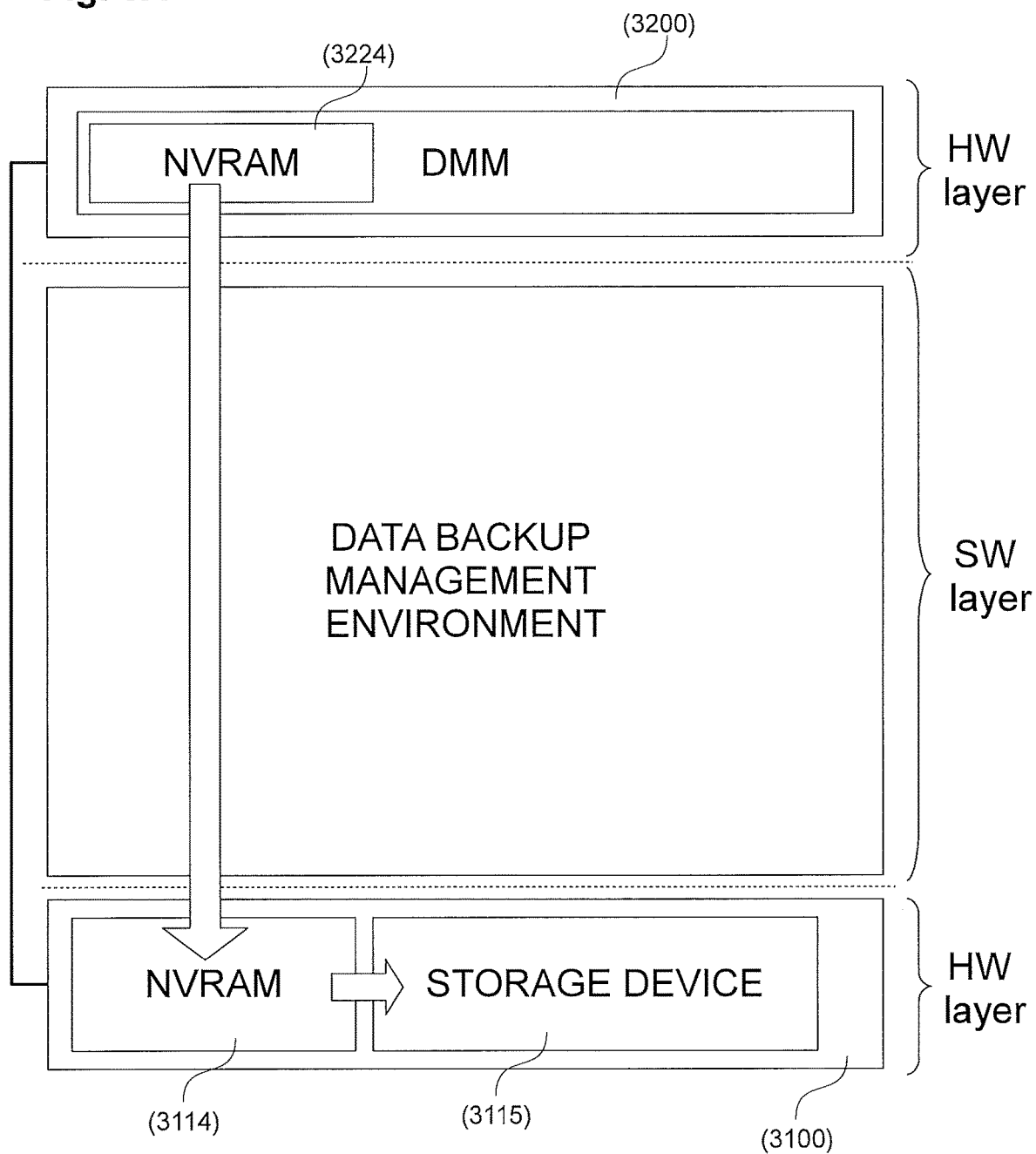
FIGS. 8A to 8C are exemplary schematic diagrams illustrating data backup and data restoration in an exemplary functional architecture of a storage control system according to exemplary embodiments.
Figure 8B:
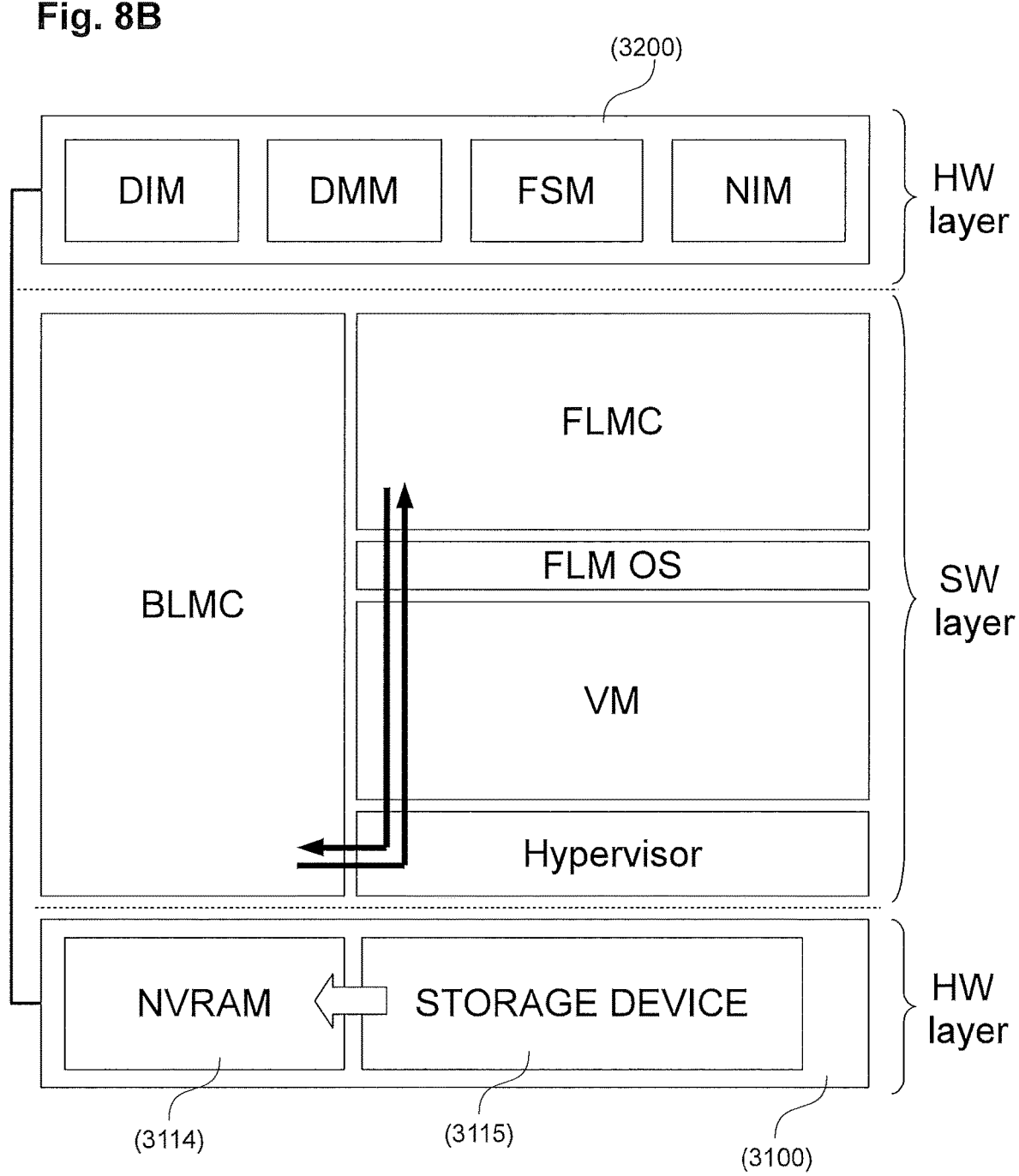
Figure 8C:
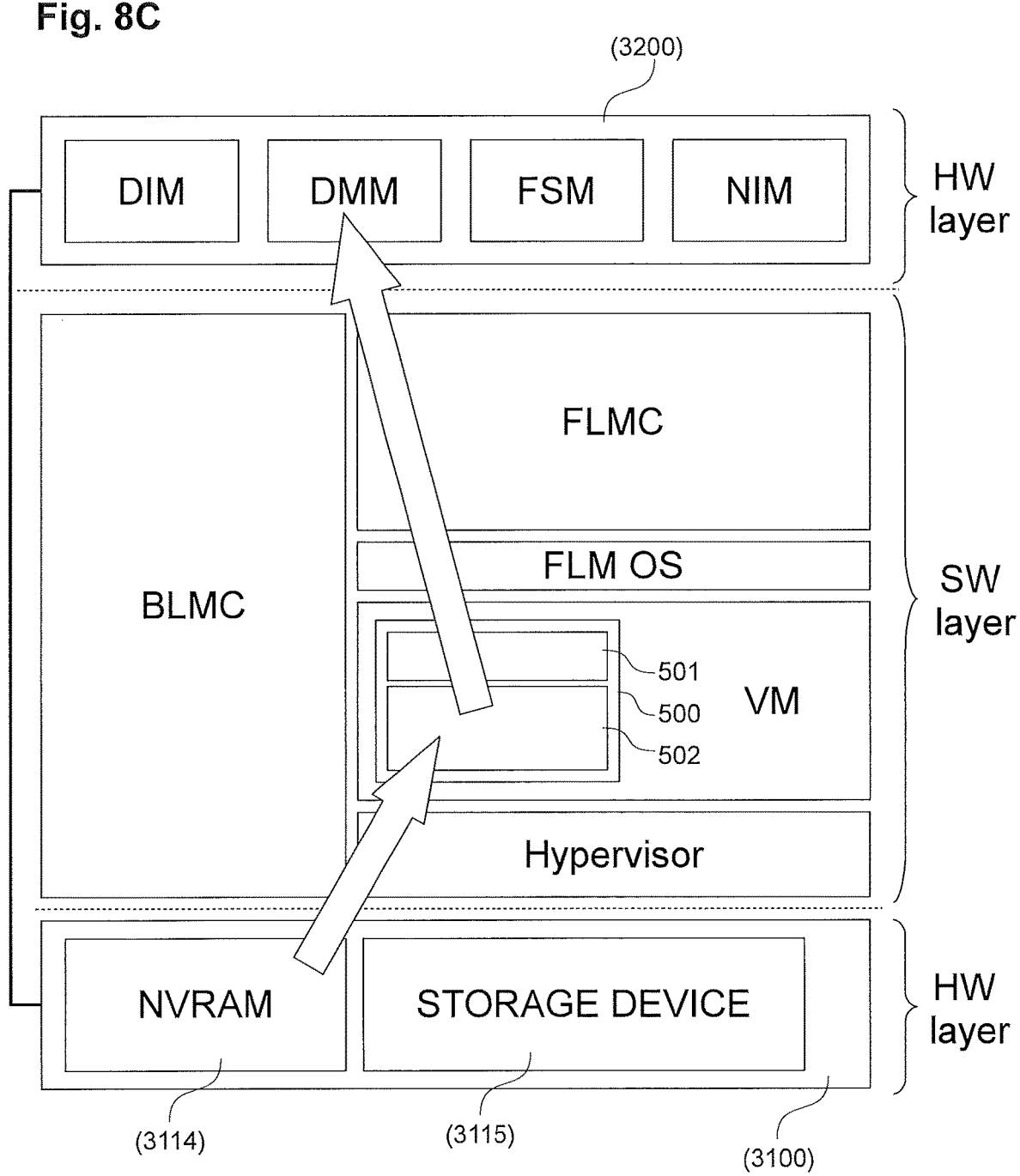

FIGS. 8A to 8C are exemplary schematic diagrams illustrating data backup and data restoration in an exemplary functional architecture of a storage control system according to exemplary embodiments.

FIG. 8A shows an exemplary embodiment of a data backup process as a special example of a process as exemplarily described in connection with FIG. 7 above.

When the power failure is detected, the apparatus/system exemplarily switches to a low power mode and exemplarily reboots to the data backup state running the data backup management environment.

In the low power mode, a non-volatile memory NVRAM (e.g. the memory 3224) of the second hardware layer (e.g. the programmable logical device) in the data movement management module DMM is still supplied with electric energy by the battery unit, and/or a non-volatile memory NVRAM (e.g. the memory 3114) of the first hardware layer (e.g. the computer system 3100) is still supplied with electric energy by the battery unit. Also, preferably the data backup management environment runs on the computer system being in a low power mode (e.g. by running on one processor or processor core or at least a reduced number of processors or processor cores among all of the processors/processor cores of the processor unit).

The data backup management environment is configured to perform a data backup process of copying the data from the NVRAMs of the first and second hardware layers to one or more storage devices of the computer system (first hardware layer). In a first step, the data backup management environment is configured to copy data from the non-volatile memory NVRAM (e.g. the memory 3224) of the second hardware layer (e.g. the programmable logical device) in the data movement management module DMM to the non-volatile memory NVRAM (e.g. the memory 3114) of the first hardware layer (e.g. the computer system 3100), in particular preferably by means of direct memory access. In a second step, the data backup management environment is configured to copy data from the non-volatile memory (e.g. the memory 3114) of the first hardware layer (e.g. the computer system 3100) to the one or more storage devices of the computer system (first hardware layer, e.g. storage device 3115, preferably a solid state drive), in particular preferably by means of direct memory access. In the second step, the backup data copied from the non-volatile memory NVRAM (e.g. the memory 3224) of the second hardware layer (e.g. the programmable logical device) is copied together with the data previously already stored (prior to the first step) in the non-volatile memory (e.g. the memory 3114) of the first hardware layer (e.g. the computer system 3100).

The above allows for efficient and reliable, as well as energy-saving backup processes of non-volatile memories in the different hardware layers, and thereafter the storage control apparatus/system can shut down to save battery power until external AC power can be supplied again.

FIGS. 8B and 8C show exemplary embodiments of a data restoration process. When the power can be supplied again externally via the power supply unit without battery supply (to additionally start re-charging of the battery unit after the occurrence of the power failure), the system reboots to the normal state as in each normal reboot or initialization sequence. After normal reboot, the software layer may be provided e.g. according to one of the examples of FIGS. 4 and 6A to 6C.

Exemplarily, in FIG. 8B, the block-level management component BLMC and the virtualization management component (Hypervisor) run in parallel (e.g. directly on the computer system or on one or two operating systems). The virtual machine VM provided by the virtualization management component (Hypervisor) runs the file-level management operating system FLM OS and the file-level management component FLMC is executed on the file-level management operating system FLM OS (the system management component SMC is omitted for purpose of conciseness of disclosure but may be present as well in some embodiments).

The block-level management component BLMC is configured to detect, after initialization, whether a data backup has occurred, and to restore the data (either only its own previous memory data of its own NVRAM or both of the backed up data from the two NVRAMs) of the backup process from the storage device.

When the file-level management component FLMC is initiated, the file-level management component FLMC is configured to communicate with the block-level management component BLMC to inquire whether a backup process occurred. As discussed above in connection with FIG. 4, the communication between the file-level management component FLMC and the block-level management component BLMC is handled via the interfaces A and B indirectly via the hypervisor (virtualization management component) as indicated by the bold black arrows in FIG. 8B. Based on this communication (e.g. by receiving backup information from the block-level management component BLMC via the hypervisor), the file-level management component FLMC is enabled to determine whether a data backup process is to be performed.

In the affirmative, as exemplarily illustrated in FIG. 8C, the file-level management component FLMC requests to set up a communication memory area 500 on the virtual machine VM (either to the hypervisor or indirectly via the file-level management operating system), wherein the communication memory area 500 includes an interface control memory area 501 and a backup data memory area 502. The file-level management component FLMC further indirectly requests, via the hypervisor and interfaces A and B, the block-level management component BLMC to access the communication memory area 500, preferably via direct memory access (structurally the communication memory area 500 will be provided in a memory unit of the computer system, functionally managed by the hypervisor as a memory area in a memory unit of the virtual machine VM).

Then, by circumventing or bypassing the hypervisor and the interfaces A and B, the file-level management component FLMC and the block-level management component BLMC can communicate directly through the communication memory area 500.

At first, a request to restore the backup data (previously backed up from the NVRAM of the second hardware layer) is written by the file-level management component FLMC to the interface control memory area 501 (i.e. the interface control memory area 501 serves as a "header area" of a protocol of messages exchanged between the file-level management component FLMC and the block-level management component BLMC).

Then, the block-level management component BLMC, upon accessing the interface control memory area 501 and processing the request, copies the requested backup data (e.g. as a whole, or in some preferred embodiments in chunks, i.e. parts of the backup data) to the backup data memory area 502 and writes a response (write confirmation) to the interface control memory area 501.

Then, the file-level management component FLMC, upon accessing the interface control memory area 501, reads the backup data from the backup data memory area 502 and restores it to the NVRAM of the second hardware layer (e.g. in the data movement management module DMM), and confirms the restoration (read confirmation) in the interface control memory area 501 (e.g. for requesting a further chunk or part of the backup data).

This process may be continued until al backup data is completely and successfully restored, e.g. after restoring all of the multiple chunks/parts of the backup data to the NVRAM of the second hardware layer (e.g. in the data movement management module DMM). The process may additionally include generation and comparison of verification data to check the validity of the restored data in further exemplary embodiments as exemplarily described below.

Figure 9:
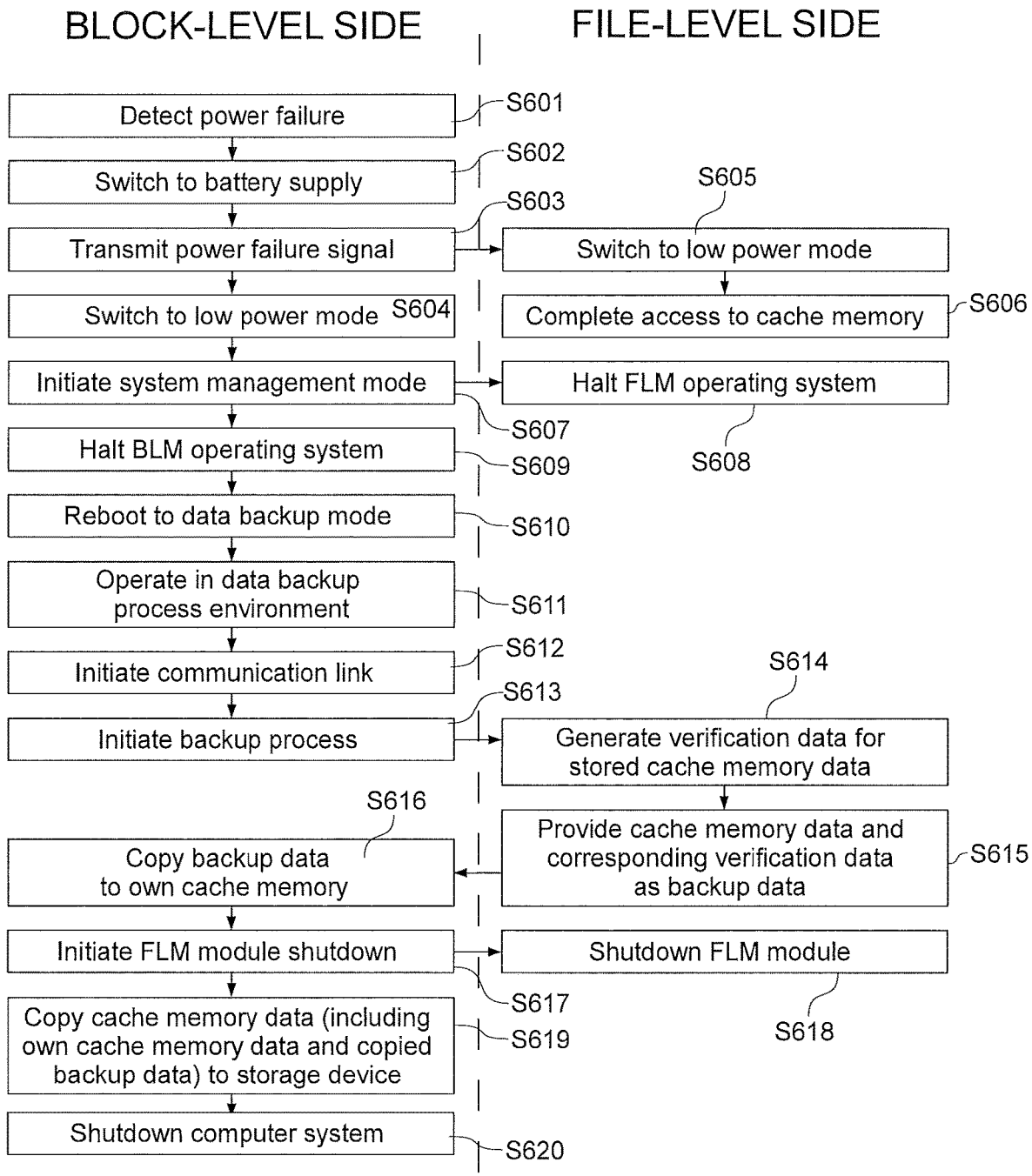
FIG. 9 is an exemplary logic flow diagram schematically showing a data backup process in accordance with exemplary embodiments.

FIG. 9 is an exemplary logic flow diagram schematically showing a data backup process in accordance with exemplary embodiments.

The left-hand side relates to steps performed on the block-level side (e.g. including the computer system and software components thereon, with the exception of the file-system management components run on the virtual machine, e.g. the virtual machine relates to the file-level side), and the right-hand side relates to steps performed by the file-level side (e.g. including the modules/portions of the programmable logical device and the file-level management component FLMC on the virtual machine VM).

In step S601, the power failure detection unit detects the occurrence of a power failure and switches to battery supply in step S602, and then the power failure signal is transmitted to the computer system and/or the file-level side (e.g. including the modules/portions of the programmable logical device (one or more of these steps may be performed by structural components of the computer system and may occur without any involvement from software).

Upon receiving the power failure signal, the computer system may switch to a low power mode in step S604 (e.g. by reducing the number of active processors or processor cores, e.g. turning down the processors used by the virtual machines or the like, reducing the number of used processors per component, etc.) and also the programmable logical device may switch to a low power mode in step S605, e.g. by deactivating modules and portions (including programmable ICs and memories thereof) which are not involved in the following backup process. Battery power will remain to be supplied to the non-volatile memory of a data movement management portion DMM of the programmable logical device.

Then, the computer system (in particular the system unit) may instruct the system management mode, e.g. by means of SMI interrupt to halt the operation systems including the file-level management operating system FLM OS and the block-level management operating system BLM OS (steps S607 and S608). Then, the computer system reboots to the data backup mode (data backup state) in step S610 and then operates under the data backup process environment in step S611.

The data backup process environment operates to establish a communication link (e.g. via the internal bus system) with the non-volatile memory of the data movement management portion DMM of the programmable logical device in step S612, e.g. for access by means of direct memory access, and initiates the backup process in step S613.

In step S614, the programmable logical device and in particular a programmable logic processing unit of the data movement management portion generates redundant verification data in connection with data stored in the non-volatile memory of the data movement management portion DMM of the programmable logical device (e.g. it may generate redundant verification data for each of a plurality of chunks into which the data may be divided logically, to then transfer the data in chunks one after another). The verification data may be calculated based on the original data in accordance with a cyclic redundancy check (CRC) code or another error-detecting code.

The data from the non-volatile memory of the data movement management portion DMM of the programmable logical device is then provided in step S615 together with the generated redundant verification data as backup data, to be accessed by direct memory access.

In step S616, the data backup process environment controls copying the backup data from the non-volatile memory of the data movement management portion DMM of the programmable logical device to the non-volatile memory of the computer system, and thereafter initiates the shutdown of the file-level management modules of the programmable logical device in step S617, so that the file-level side programmable logical device shuts down in step S618 (no further battery supply required for the file-level side).

In step S619, the data backup process environment controls copying the copied backup data and the previously stored own data from the non-volatile memory of the computer system to the storage device (e.g. a solid state drive SSD) in step S619 and the shuts down the computer system completely in step S620 to save battery power.

This advantageously allows to provide compact and efficient battery packs since the battery supply is only needed to perform the backup of non-volatile memories for a short amount of time during operation in a low power mode instead of long time battery supply to maintain the stored data in non-volatile memories in which the energy is at least needed to regularly or at least repeatedly refresh the non-volatile memories).

FIG. 10 is an exemplary logic flow diagram schematically showing a data restoration process in accordance with exemplary embodiments.

The left-hand side relates to steps performed on the block-level side (e.g. including the computer system and software components thereon, with the exception of the file-system management components run on the virtual machine, e.g. the virtual machine relates to the file-level side), and the right-hand side relates to steps performed by the file-level side (e.g. including the modules/portions of the programmable logical device and the file-level management component FLMC on the virtual machine VM).

In step S701, the block-level management operating system boots and initiates memory control (step S702) to determine whether a backup occurred (e.g. due to a power failure) in step S703. If a backup occurred (step S704 returns YES), the data of the non-volatile memory of the computer system is restored by copying the data from the storage device to the non-volatile memory of the computer system in step S705, to continue to initiate the hypervisor (virtualization management component) and the block-level management component BLMC in steps S706 and S707. If step S705 returns NO (no backup occurred), the computer system directly continues with steps S706 and S707.

The hypervisor initiates the virtual machines in step S708 and the computer system, in particular the block-level management component BLMC, starts the block-level services in step S709.

On the file-level side, once the hypervisor initiates the virtual machines in step S708, the file-level management operating system is initiated (booted) in step S710 and the file-level management component FLMC is initiated in step S711. The system management component may at the same time be initiated as well.

In step S712, the file-level management component FLMC determines whether a backup occurred (e.g. based on indirect communication with the block-level management component BLMC via the hypervisor), and if step S713 returns YES, the file-level management component FLMC sets up the communication memory area in step S714 as a memory area to be shared with the block-level management component BLMC and requests the restoration of the backup data of the non-volatile memory of the programmable logic device via the interface control memory area of the communication memory area (including an indirect request via the hypervisor that the block-level management component BLMC accesses the communication memory area).

In step S716, the block-level management component BLMC receives the request by reading the interface control memory area of the communication memory area, and copies the requested backup data from the non-volatile memory of the computer system or from the storage device to the backup data memory area of the communication memory area in step S717 (including writing a response to the interface control memory area of the communication memory area).

The file-level management component FLMC then restores the backup data from the backup data memory area of the communication memory area to the non-volatile memory of the programmable logic device in step S718. This may additionally involve generation of redundant verification data to compare it with associated redundant verification data (as generated in step S615 included in the backup data). The verification data can be compared to detect whether the restored data is valid. If the data is not valid, it can be requested again, and if the verification fails again, the error message may be output or registered in a restore process log.

In case the data is restored in chunks, steps S715 to S718 are repeated for the multiple chunks until all data is restored in the non-volatile memory of the programmable logic device.

After the data is fully restored, the file-level management component FLMC suspends the communication memory area (e.g. including an indirect request via the hypervisor to stop access of the communication memory area by the block-level management component BLMC) in step S719.

In step S720, the file-level management component FLMC checks the battery status to determine whether the battery level is sufficient (or sufficiently recharged) to support at least one more data backup process in step S721. If step S721 returns NO, the file-level management component FLMC waits and repeats steps S720 and S721 until step S721 returns YES, and then instructs to delete the backup data on the block-level side in step S722 (which is executed at the block-level side in the computer system by the block-level management component BLMC in step S723) and starts its file-level services in step S724.

The exemplary procedure of steps S720 to S724 makes advantageously sure that the backup data is not deleted and file-services are not continued until the battery unit may support at least one more data backup process in case of another power failure to prevent any accidental memory loss. A similar procedure may also be performed by the block-level management component BLMC prior to step S709.

Figure 11A:
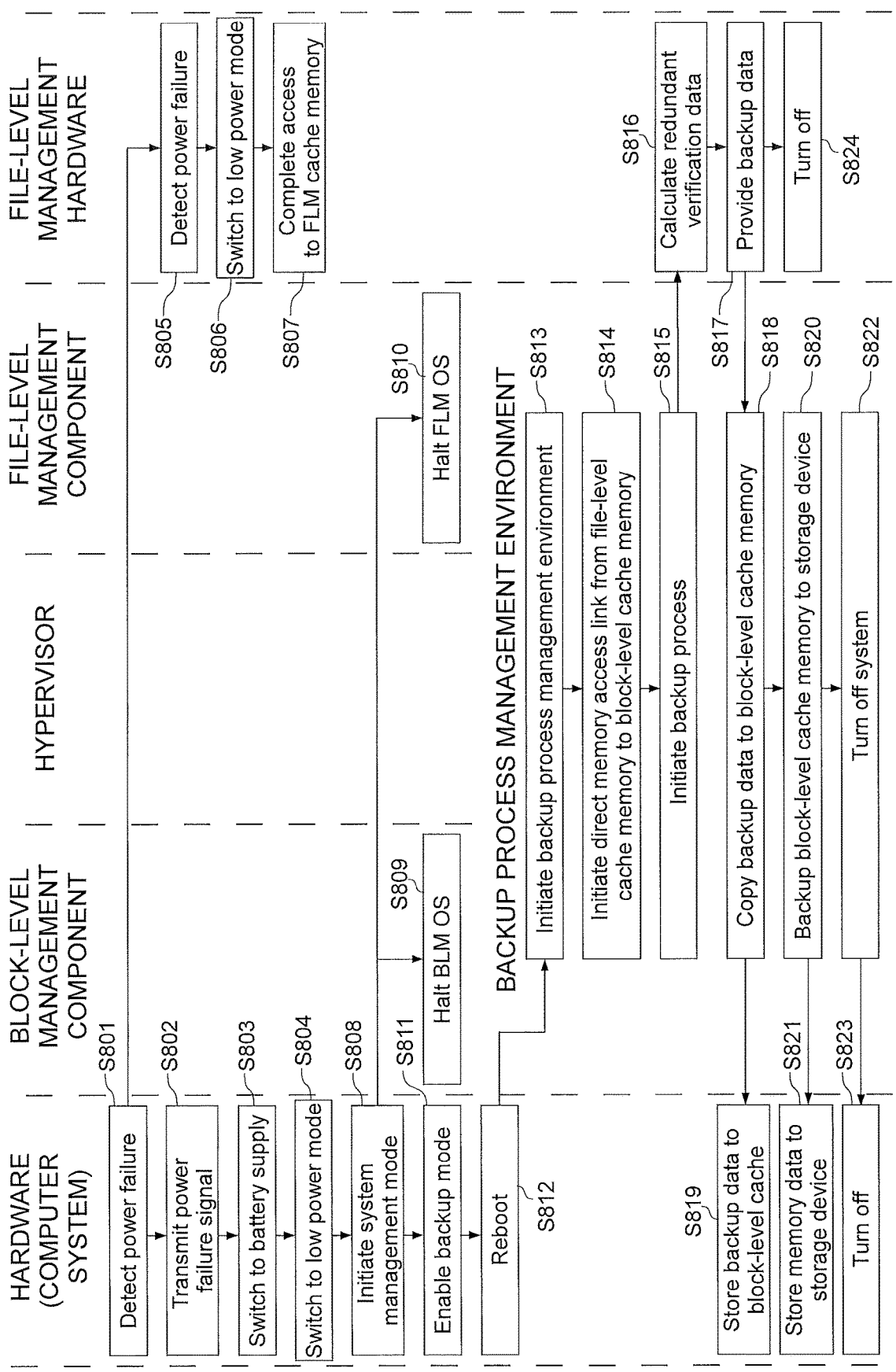
FIG. 11A is an exemplary logic flow diagram schematically showing a data backup process in accordance with exemplary embodiments.

FIG. 11A is an exemplary logic flow diagram schematically showing a data backup process in accordance with exemplary embodiments. FIG. 11A exemplarily shows steps performed by the various involved entities, including, from left to right, the computer system (hardware of first hardware layer), the block-level management component BLMC, the hypervisor, the file-level management component FLMC, and the file-level management hardware (programmable logic device).

On the hardware side of the computer system, the power failure is detected in step S801 and the power failure signal is transmitted by the power failure detection unit in step S802, so that the computer system switches to battery supply in step S803 and switches to a low power mode in step S804 (e.g. by reducing the number of activated processors or processor cores).

At the same time, e.g. based on the signal of step S802, the file-level management hardware (programmable logic device) detects the power failure in step S805 and switched to a low power mode in step S806 (e.g. by deactivating one or more modules or portions of the file-level management hardware (programmable logic device) not involved in a data backup process, but maintaining power supply at least to one or the processing units and the non-volatile memory of the data movement management module/portion DMM). In order to prevent data loss, the current access to the non-volatile memory of the data movement management module/portion DMM may be completed in step S807.

On the hardware side of the computer system, the system unit initiates the system management mode in step S808 to halt the block-level management operating system and the file-level management operating system in steps S809 and S810. Then, the hardware side of the computer system (e.g. the system unit) enables the backup mode in step S811 and reboots for initiating the backup process management environment in steps S812 and S813 (then running instead of the block-level management component BLMC, the hypervisor, and the file-level management component FLMC, as indicated in FIG. 11A).

In step S818, the backup process management environment operates to initiate a communication link for direct memory access from the file-level cache memory (e.g. the non-volatile memory of the data movement management module/portion DMM) to the block-level cache memory (e.g. the non-volatile memory of the computer system), and initiates the backup process via direct memory access in step S815.

In the backup process, the remaining processing unit (in the low power mode) of the data movement management module/portion DMM calculates the redundant verification data in connection with the data stored in the file-level cache memory (e.g. the non-volatile memory of the data movement management module/portion DMM) or for each of a plurality of chunks thereof in step S816, and then provides the data and the associated verification data for direct memory access for the backup in step S817, to then turn off in step S824 after the backup.

Prior to this, the backup process management environment controls copying the backup data including the verification data (e.g. as a whole or by repeating the steps S816, S817 and S818 for each of a plurality of data chunks) to the block-level cache memory (e.g. the non-volatile memory of the computer system) of the computer system in step S818, and the block-level cache memory of the computer system stores the backup data including the verification data in step S819.

Then, the backup process management environment controls copying all data stored in the block-level cache memory (e.g. the non-volatile memory of the computer system) of the computer system (including the backup data and associated verification data from the file-level cache memory) to the storage device in step S820, wherein the storage device stores the data in step S821.

After the data backup process is completed, and all data is stored from the block-level cache memory to the storage device, the backup process management environment controls shutdown of the whole system in step S822 and the system shuts down in step S823.

Figure 11B:
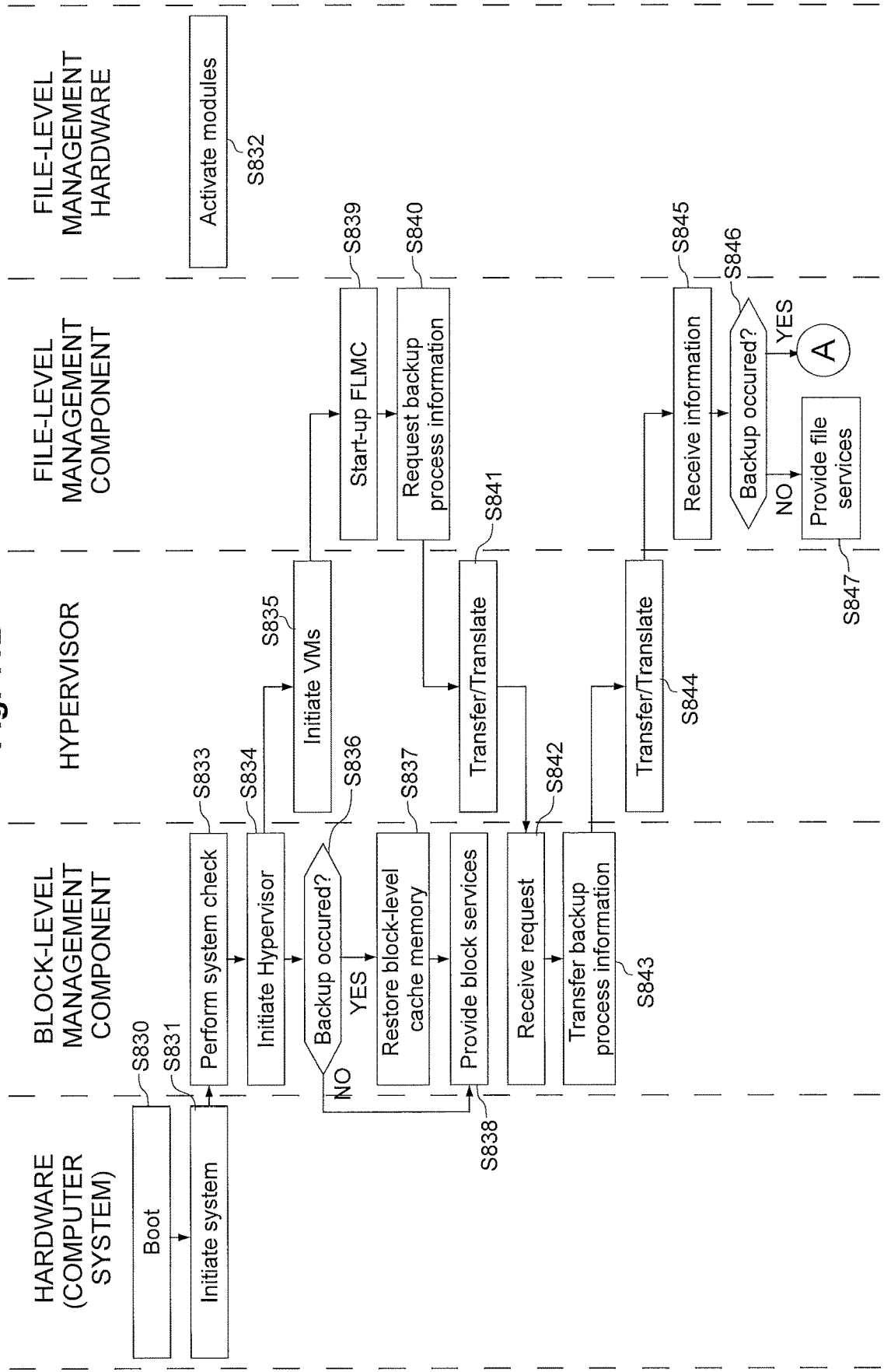

FIGS. 11B and 11C are exemplary logic flow diagrams schematically showing a data restoration process in accordance with exemplary embodiments. FIGS. 11B and 11C exemplarily show steps performed by the various involved entities, including, from left to right, the computer system (hardware of first hardware layer), the block-level management component BLMC, the hypervisor, the file-level management component FLMC, and the file-level management hardware (programmable logic device).

In step S830, the computer system boots and initiates the system in step S831. This also leads to activation of the modules of the file-level management hardware (programmable logic device) in step S832.

Upon activation, the block-level management component BLMC or the underlying operating system (or in some exemplary embodiments: a system unit) performs a system check involving a memory check in step S833. The hypervisor is initiated in step S834 and initiates the virtual machine(s) in step S835.

Meanwhile, based on the system check, the block-level management component BLMC or the underlying operating system (or in some exemplary embodiments: a system unit) detects whether a data backup process occurred prior to the last shutdown in step S836, and, in the affirmative, restores the block-level cache memory from the storage device in step S837. Then, the block-level management component BLMC (or directly after step S836 returns NO) provides the block-level services. In other embodiments, the block-level management component BLMC may determine whether the battery status indicates that the battery unit may support at least one data backup process before starting to provide the block-level services.

In parallel, when the virtual machines have been initiated by the hypervisor in step S835, the file-level management component FLMC is initiated in step S839 and operates to request backup process information from the block-level management component BLMC in step S840 to be able to determine whether a data backup has occurred. However, the request is transferred (and translated depending on the different involved interface protocols; interfaces A and B above) by the hypervisor in step S841 before being received from the hypervisor at the block-level management component BLMC in step S842, which then returns the requested backup process information (based on the outcome in step S836). The request is transferred (and translated depending on the different involved interface protocols; interfaces A and B above) by the hypervisor in step S844 before being received at the file-level management component FLMC in step S845.

Based on the received information, the file-level management component FLMC determines whether a backup process has occurred prior to the last shutdown in step S846, and starts to provide the file-level services in step S847 in case the step S846 returns NO.

Otherwise, the file-level management component FLMC sets up the communication memory area (as a shared memory between the file-level management component FLMC and the block-level management component BLMC) in step S848 and transfers the shared memory information to the block-level management component BLMC in step S849. The information message (or request to access the communication memory area) is transferred (and translated depending on the different involved interface protocols; interfaces A and B above) by the hypervisor in step S850 before being received from the hypervisor at the block-level management component BLMC in step S851. Then, the block-level management component BLMC starts accessing the communication memory area, and specifically the interface control memory area thereof, in step S852.

Meanwhile, the file-level management component FLMC (or upon receiving a confirmation information via the hypervisor that the block-level management component BLMC has started accessing the communication memory area) request restoration of the backup data (or a specific chunk thereof, e.g. including memory addresses) in step S853 by writing a corresponding request to the interface control memory area of the communication memory area (this communication now bypasses the hypervisor, as exemplarily shown also in FIG. 11C), and the block-level management component BLMC receives the request by reading the interface control memory area of the communication memory area in step S854.

Based on the request, the corresponding requested backup data (or the requested chunk data of one of the chunks of the backup data) is written to the backup data memory area of the communication memory area by the block-level management component BLMC in step S855, accompanying a corresponding response to the interface control memory area, so that the backup data can be read from the backup data memory area of the communication memory area by the file-level management component FLMC in step S856, wherein the file-level management component FLMC copies the backup data in step S857 (without the received redundant verification data included in the data written to the backup data memory area of the communication memory area) to the file-level management cache memory (non-volatile memory) of the programmable logic device (in particular of the data movement management portion/module).

The programmable logic device (in particular a processing unit of the data movement management portion/module) again calculates corresponding redundant verification data in step S858 and provides the calculated verification data to the file-level management component FLMC in step S859.

The file-level management component FLMC compares the previously received verification data (as copied from the block-level side and as backed up prior to the power failure) with the newly calculated verification data in step S860, to check whether the restored data or data chunk is valid when the compared verification data matches in step S860. Otherwise, the file-level management component FLMC requests the same data or data chunk again in another step S853 ("retry" in step S861), or, if the restored data is valid, goes to the next data chunk ("go to next chunk" step S861) in another step S853, thereby repeating steps S853 to S860, until the data is fully restored.

After the data is fully restored, the file-level management component FLMC suspends the shared memory (communication memory area) and instructs the block-level management component BLMC to stop accessing the shared memory in step S863 (either directly via the interface control memory area, or again indirectly via the hypervisor), and the block-level management component BLMC stops accessing the shared memory area (communication memory area) in step S863.

The file-level management component FLMC may then return to step S847 and start providing the file-level services. Alternatively, the file-level management component FLMC may check the battery status first and wait until the battery unit has a battery level that is sufficient to support at least one more data backup process, if not already sufficient, before starting to provide the file-level services and/or instructing to delete the backup data on the block-level side.

Figure 12A:
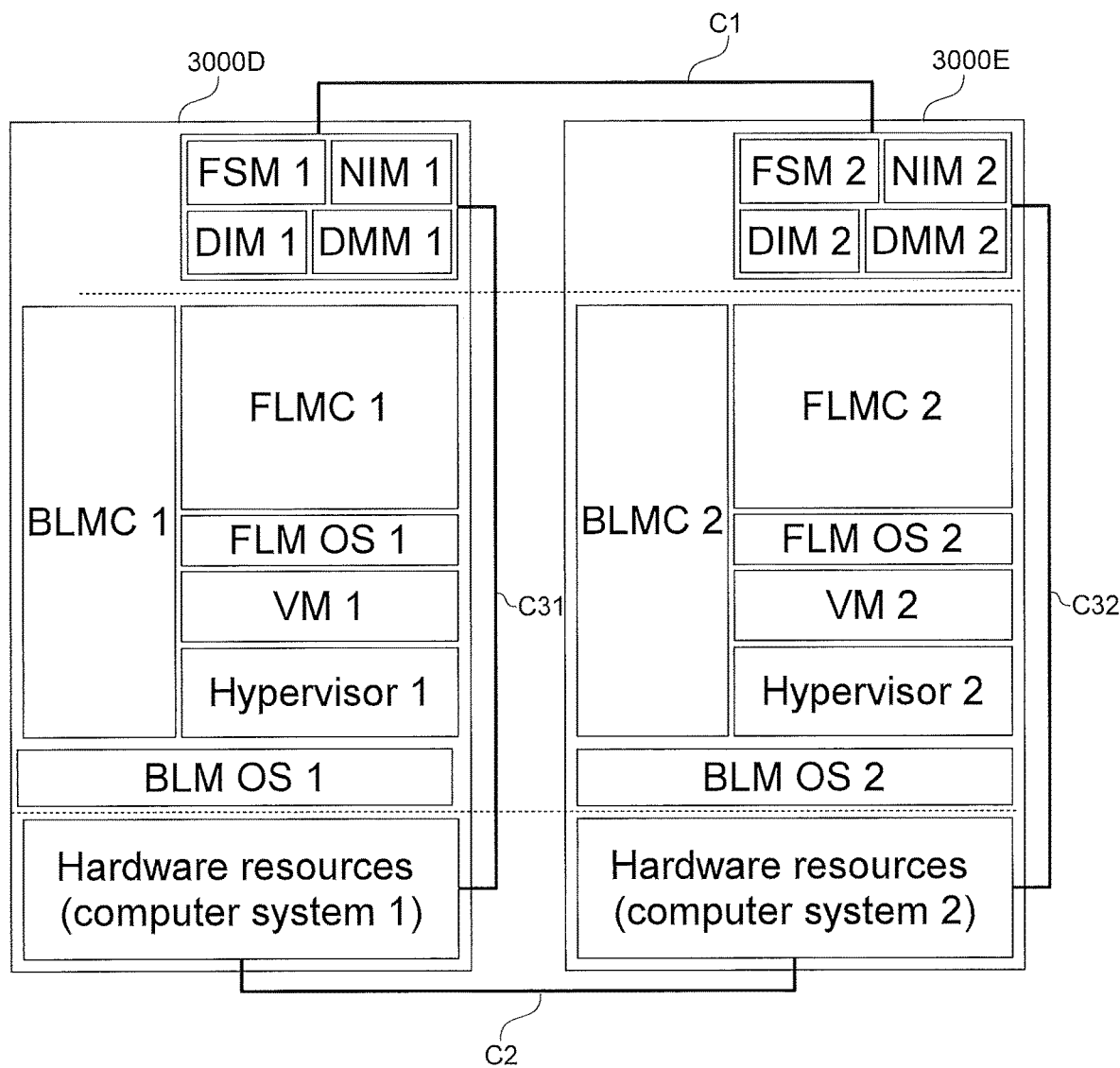
FIGS. 12A and 12B are exemplary schematic diagrams showing further exemplary functional architectures of respective storage control systems in normal operation state according to further exemplary embodiments.
Figure 12B:
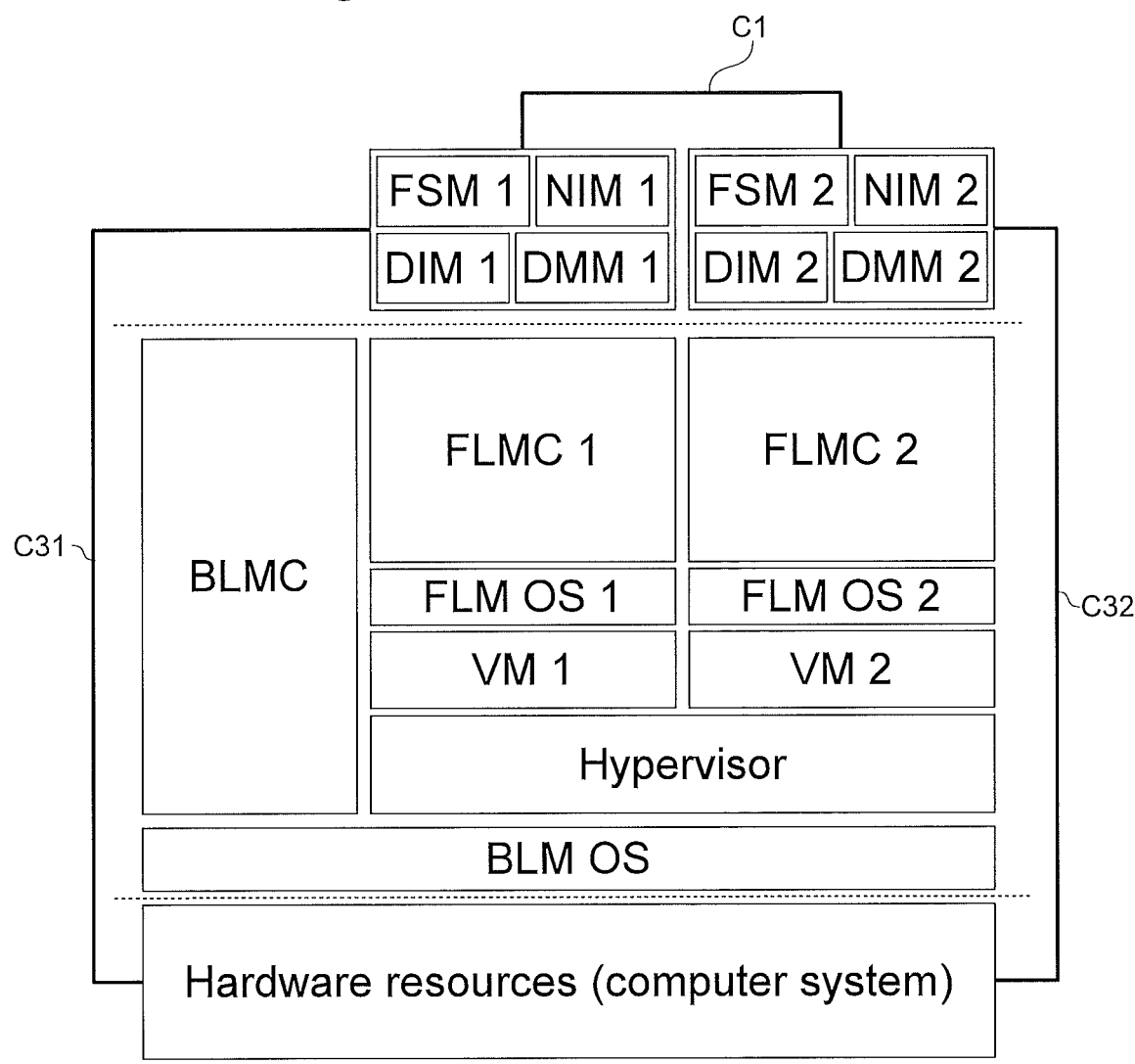

FIGS. 12A and 12B are exemplary schematic diagrams showing further exemplary functional architectures of respective storage control systems in normal operation state according to further exemplary embodiments, in particular in embodiments including multiple programmable logical devices.

In particular, FIG. 12A exemplarily shows a system in which two nodes 3000D and 3000E are interconnected by communication connections. Each of the nodes 3000D and 3000E exemplarily has an architecture similar to the system of FIG. 4 (exemplarily omitting the system management component SMC and the other virtual machine supporting an application APP).

Connections may be provided respectively between the computer systems of the two nodes 3000D and 3000E (connection C2), between the programmable logic devices (including the modules DIM1/DIM2, DMM1/DMM2, FSM1/FSM2, and NIM1/NIM2) of the two nodes 3000D and 3000E (connection C1), and via the respective internal bus systems between the respective computer system and the respective programmable logic device (connections C31 and C32). The two nodes may be provided integrated into one chassis or in two separate chassis.

In such embodiments, while the principle operations may be the same on each of the nodes as in other exemplary embodiments discussed above, the respective connections between the computer systems of the two nodes 3000D and 3000E (connection C2) and between the programmable logic devices (connection C1) allows that the system of the two nodes additionally provides the optional preferred function that the non-volatile memory of the computer system of one node is continuously mirrored in the non-volatile memory of the computer system of the other node, and/or that the non-volatile memory of the programmable logical device of one node is continuously mirrored in the non-volatile memory of the programmable logical device of the other node.

Such system of two (or more nodes) with mirrored non-volatile memories provides two further advantages over above-described embodiments. For example, in some exemplary embodiments, in the data backup restoration process, if the data restoration fails for one or more chunks on one of the nodes (e.g. if a comparison of the redundant verification data generated during the backup and restore processes does not match) even after one or more retries on one of the nodes, the respective backup data can be restored from the other node to further reduce the risk of data loss due to power failures.

Furthermore, in some exemplary embodiments, after the data backup restoration process, when the battery status is checked and the battery level on one of the nodes cannot yet support another data restoration process (in which case in above embodiments, the single node would preferably wait until the battery unit is re-charged further to support at least one data backup process before starting the file-services), the node still can reliably and securely start the file-services if the battery unit of the other node already has a battery level sufficient to support at least one data backup process of its own non-volatile memory (which is the mirror of the other node's non-volatile memory).

FIG. 12B exemplarily shows a system which exemplarily has an architecture similar to the system of FIG. 4 but with the difference that each of the virtual machines VM 1 and VM2 supports and runs its own file-level management component FLMC 1 and FLMC 2 on respective operating systems FLM OS 1 and FLM OS 2, respectively, and wherein each of the file-level management component FLMC 1 and FLMC 2 has a respective associated programmable logical device (including the modules DIM1/DIM2, DMM1/DMM2, FSM1/FSM2, and NIM1/NIM2, respectively).

Each of the programmable logical devices may be connected with the computer system via internal bus connections C31 and C32, and the programmable logical devices may be interconnected by connection C1 (e.g. similar to the programmable logical devices of the two nodes in FIG. 12A or via an internal bus connection).

In such embodiments, while the principle operations may be the same on each of the file-level management sides as in other exemplary embodiments discussed above, the connection C1 between the programmable logic devices allows that the system additionally provides the optional preferred function that the non-volatile memory of one programmable logical device is continuously mirrored in the non-volatile memory of the other programmable logical device.

Such system of two (or more programmable logical devices) with mirrored non-volatile memories provides the further advantage that, in some exemplary embodiments, in the data backup restoration process, if the data restoration fails for one or more chunks on one of the programmable logical devices (e.g. if a comparison of the redundant verification data generated during the backup and restore processes does not match) even after one or more retries, the respective backup data can be restored from the other programmable logical device to further reduce the risk of data loss due to power failures.

FIGS. 13A to 13F are exemplary schematic diagrams illustrating data backup and data restoration in another exemplary functional architecture of a computer system according to exemplary embodiments.

In the system of FIGS. 13A to 13F, the principles of the above data backup processes and data restoration processes according to exemplary aspects and exemplary embodiments is provided independently of storage system control and may not relate to storage related services such as file-level or block-level services.

Figure 13A:
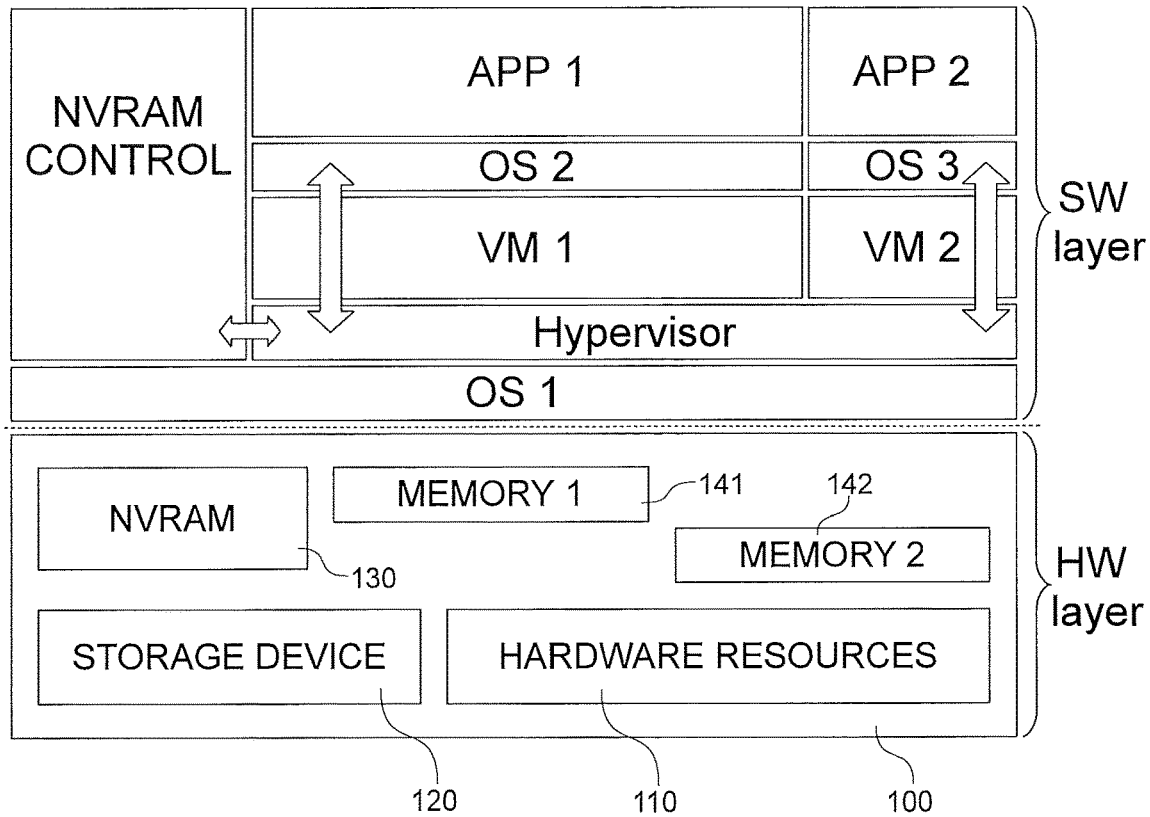
FIGS. 13A to 13F are exemplary schematic diagrams illustrating data backup and data restoration in another exemplary functional architecture of a computer system according to exemplary embodiments.

According to the exemplary architecture of FIG. 13A, an operating system OS 1 is running on a computer system 100 which includes, among other hardware resources 110 (such as processor units, I/O units, system units or others), a storage device 120, a non-volatile memory 130 and memories 141 and 142. As the software components running on the operating system OS 1, the software layer of the system includes the control software component NVRAM CONTROL which is configured to control access to the non-volatile memory 130 and a hypervisor (virtualization management component) to provide the virtual machines VM 1 and VM2 based on hardware resources of the computer system 100, wherein the memories 141 and 142 (volatile or non-volatile memories) are assigned to the virtual machines VM 1 and VM2, respectively.

On the virtual machines VM 1 and VM2, the operating systems OS 2 and OS 3, as well as the applications APP1 and APP2 are running, respectively. The application APP1 uses the memory 141 to temporarily store data and the application APP2 uses the memory 141 to temporarily store data.

Figure 13B:
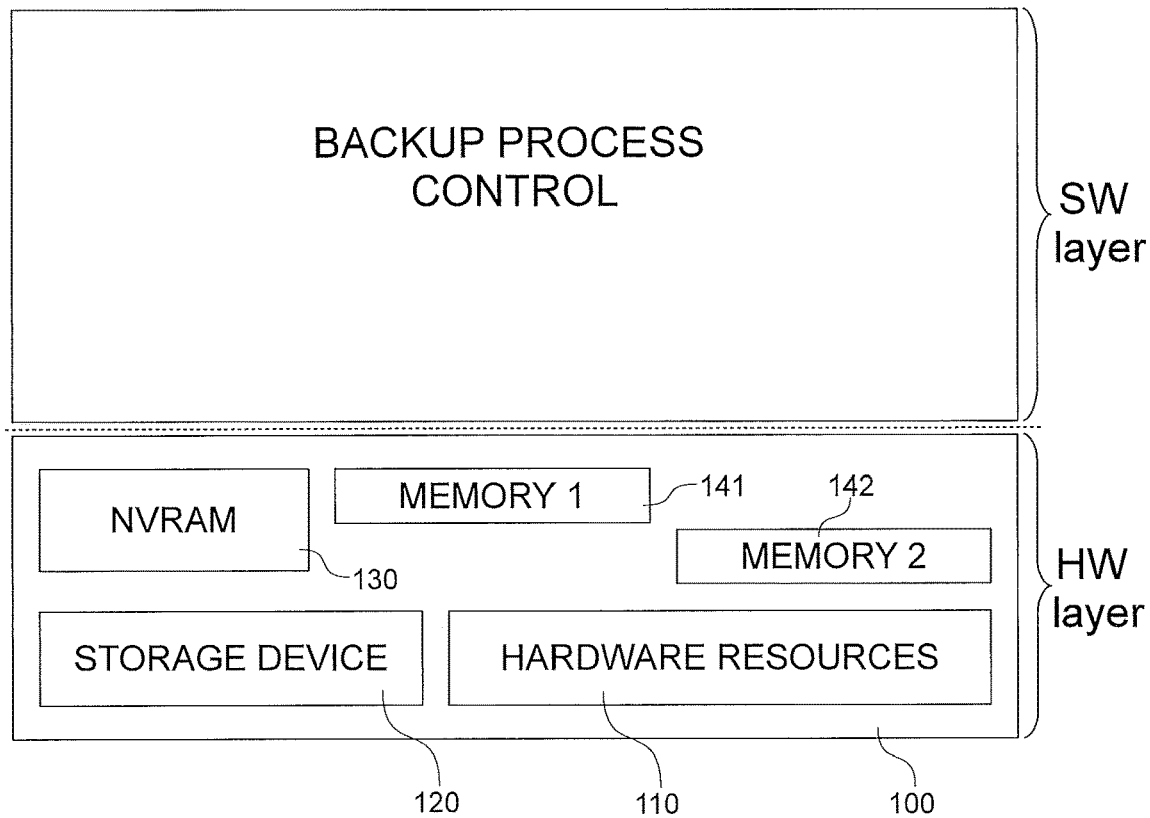

Now, if a power failure is detected, e.g. by a power failure detection unit of the computer system 100 (part of the hardware resources 110) and the computer system 100 is supplied with electric energy from a battery unit of the computer system 100 (part of the hardware resources 110), the system may preferably reboot (e.g. after going to a low power mode including reducing the number of used processors or processor cores) to a data backup state to operate a backup process control environment 200 on the computer system 100, as exemplarily shown in FIG. 13B.

The backup process control environment 200 exemplarily operates on the computer system 100 instead of the previous software components, and in particular instead of the hypervisor and the applications APP1 and APP2 (e.g. taking over for or as part of the control software component NVRAM CONTROL, or as independent control software or firmware).

Figure 13C:
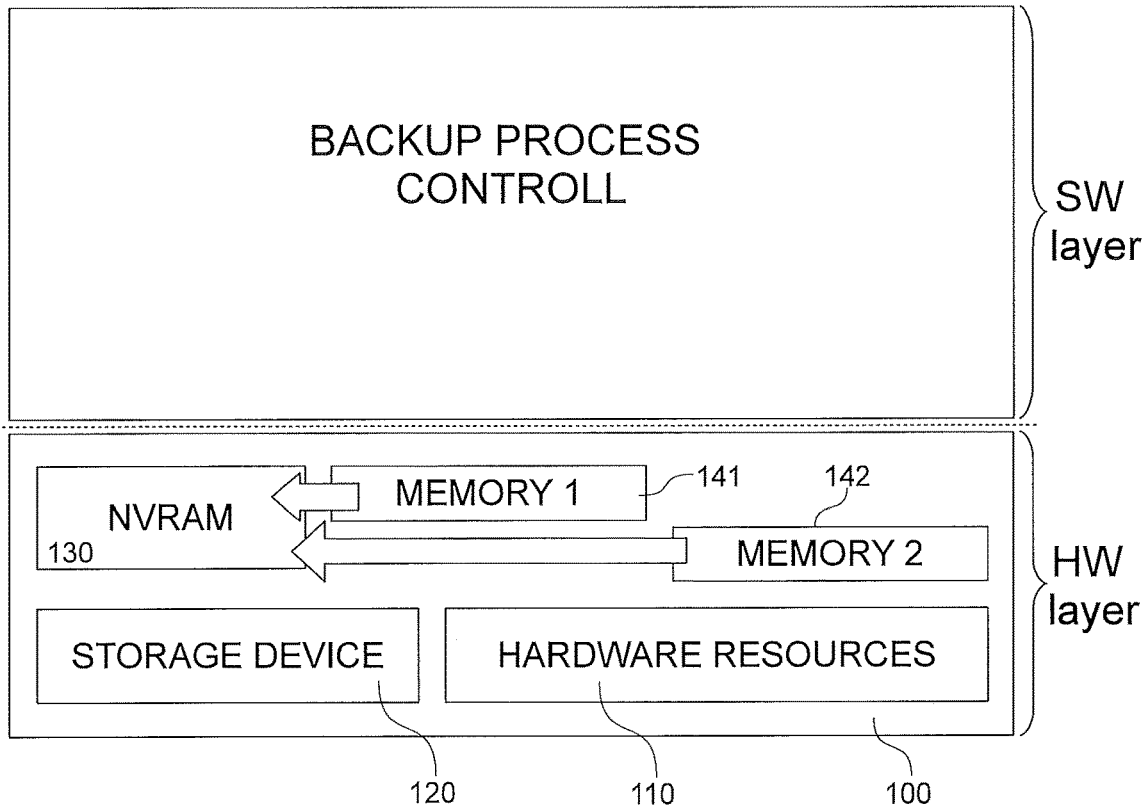

As illustrated in FIG. 13C, exemplarily, the backup process control environment 200 may control a data backup process, under battery supply, of copying data from the memories 141 and 142 previously used by the applications APP1 and APP2 to the non-volatile memory 130 previously controlled by the control software component NVRAM CONTROL during normal operation.

Figure 13D:
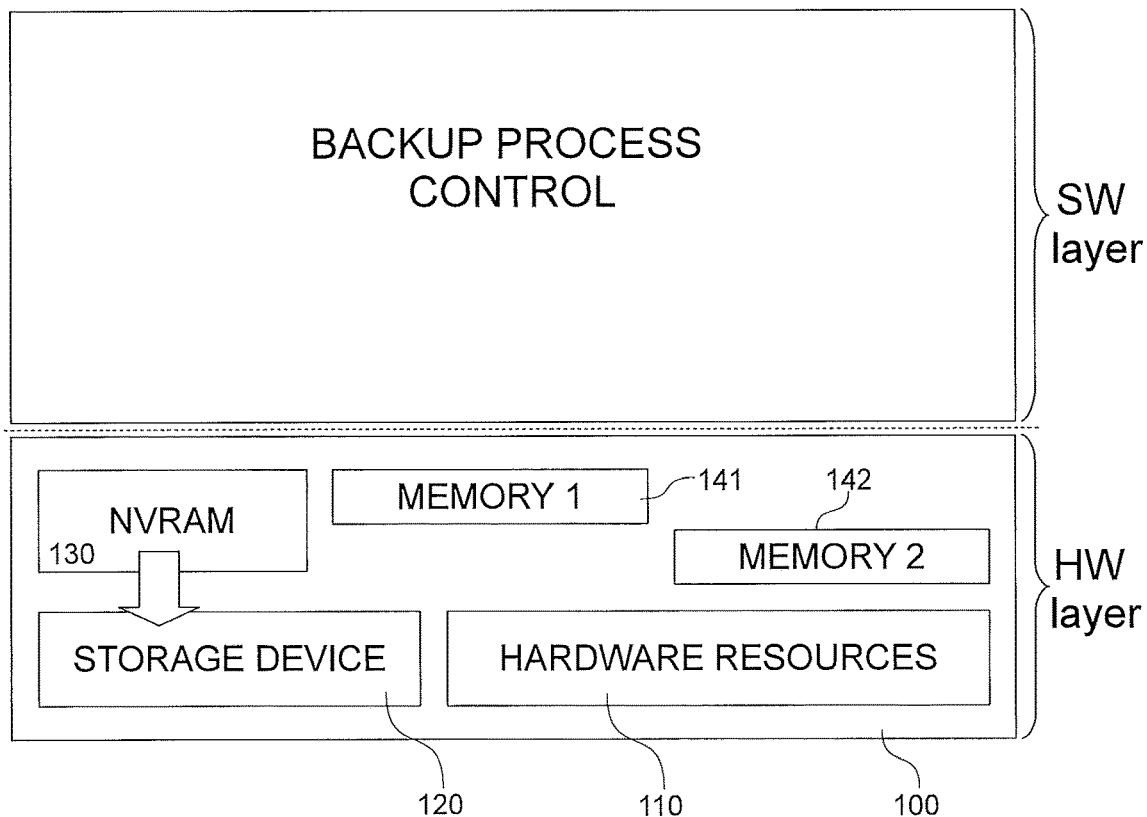

Then, as illustrated in FIG. 13D, exemplarily, the backup process control environment 200 may control another step in the data backup process, under battery supply, of copying data from the non-volatile memory 130 (now including the copied data from the memories 141 and 142) to the storage device 120 (which may be implemented by one or more hard disk drives or, more preferably, by one or more solid state drives). Thereafter, the system may shut down to save battery power. This allows to use compact and efficient battery units since the battery units only need to support the backup process but do not need to continue to support non-volatile memories during the power failure.

Figure 13E:
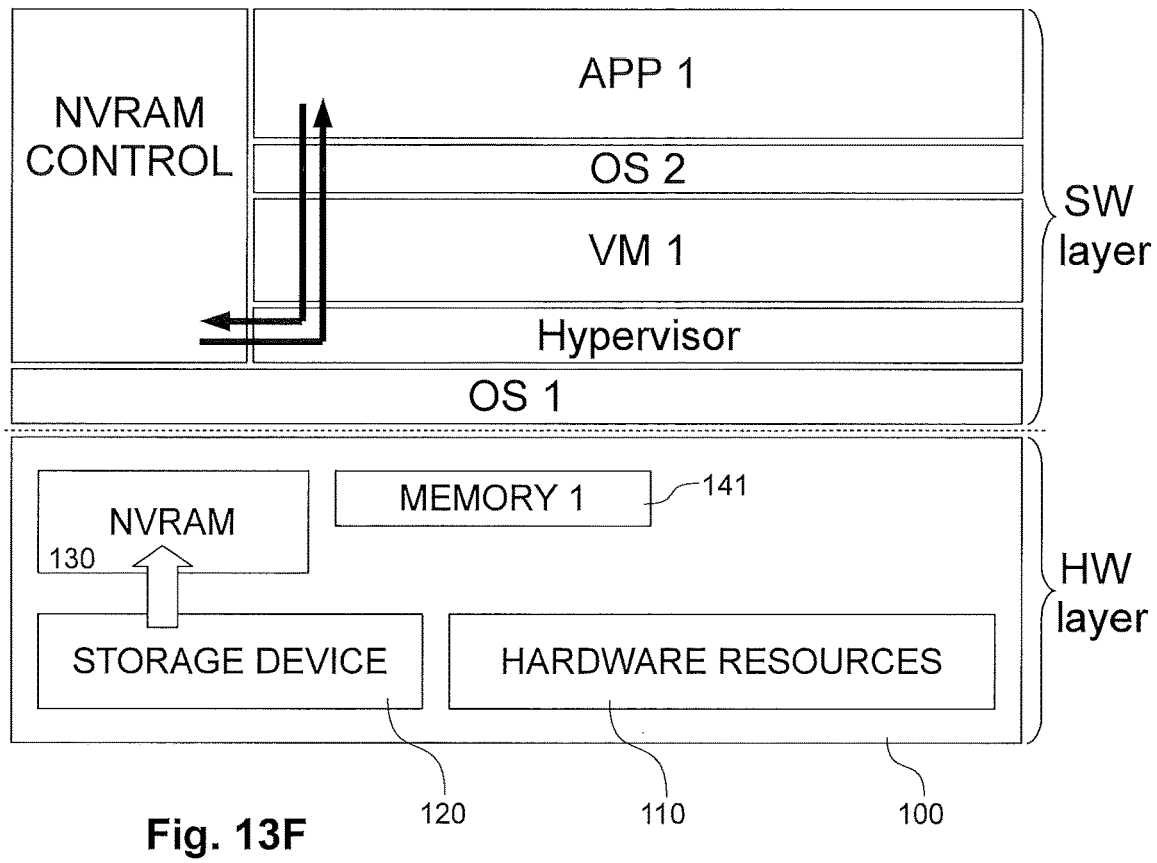

According to the exemplary FIG. 13E, which shows a system state after reboot when the external power supply is available (corresponding to FIG. 13A but omitting the items associated with APP2 for reasons of simplicity, as the procedure may be applied similarly also to the data restoration of memory 142), the control software component NVRAM CONTROL may detect that a backup of NVRAM data of the non-volatile memory 130 has occurred prior to the last shutdown, and the control software component NVRAM CONTROL controls copying the data back from the storage device 120 to the non-volatile memory 120.

Meanwhile, when the hypervisor has initiated the virtual machine VM 1 after reboot and when the application APP 1 is initiated and executed, the application APP 1 may inquire indirectly through the hypervisor (e.g. similar to above exemplary embodiments, interfaces A and B) to the control software component NVRAM CONTROL whether a data backup process has occurred or to request backup information indicating whether a data restoration process is required. A response may be sent also indirectly through the hypervisor from the control software component NVRAM CONTROL to the application APP 1.

Figure 13F:
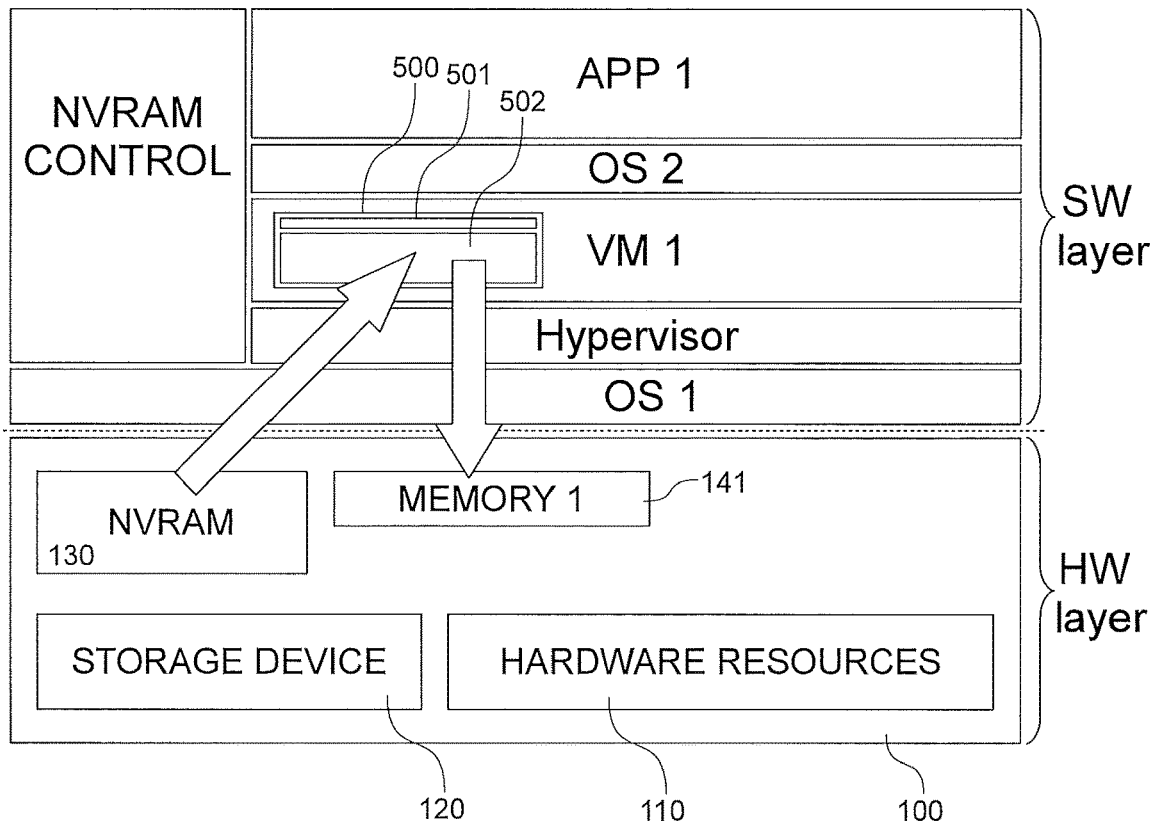

Then, if a data restoration process, according to FIG. 13F, the application APP1 sets up a communication memory area 500 on the virtual machine VM1, wherein the communication memory area 500 may again include an interface control memory area 501 and a backup data memory area 502 for direct communication between the application APP1 and the control software component NVRAM CONTROL, bypassing the hypervisor, through the shared memory of the interface control memory area 501, and the control software component NVRAM CONTROL copies the requested backup data from the non-volatile memory 130 (if previously restored from the storage device, or from the storage device) to the backup data memory area 502. Then, the application APP1 can copy the backup data from the backup data memory area 502 to the memory 141, and start to provide its application services.

Figure 14:
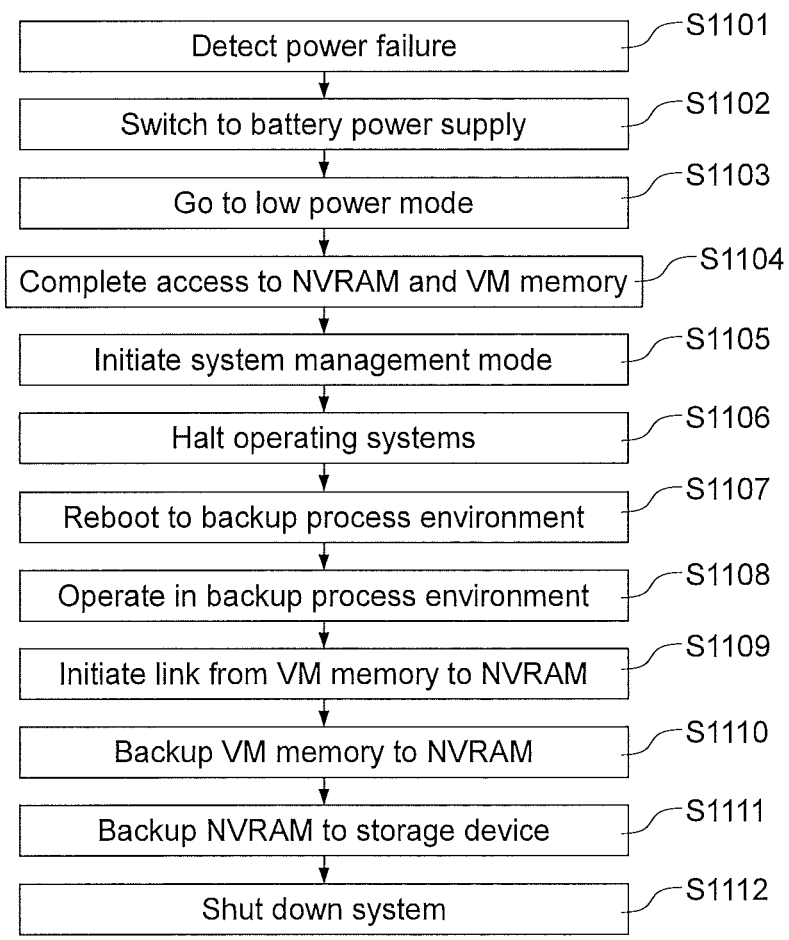
FIG. 14 is an exemplary logic flow diagram schematically showing another data backup process in accordance with further exemplary embodiments.

FIG. 14 is an exemplary logic flow diagram schematically showing another data backup process in accordance with further exemplary embodiments, based on FIGS. 13A to 13F.

In step S1101, the computer system 100 detects an occurrence of a power failure and switches to battery power supply in step S1102, to then switch to a low power mode in step S1103. Such low power mode may deactivate components and modules not needed in a data backup process and may reduce the number of cores or processors used in a multi-core or multi-processor environment. It may also include switching non-volatile memories to a self-refresh mode.

In addition, the step S1104 may be executed to complete all ongoing access to the non-volatile memory 130 of the computer system 100 and to volatile or non-volatile memories of virtual machines operated/managed by the hypervisor to prevent accidental data loss. In step S1105, the system mode may be initiated to halt all operating systems in step S1106. Then, the step S1107 reboots to the data backup process environment 200 and the computer system 100 operates under the data backup process environment 200 in step S1108.

Then, the data backup process environment 200 is configured to initiate a communication link, preferably for direct memory access, between the memories previously used by virtual machines, including memory 141 of virtual machine VM 1 used by the application APP1, and the non-volatile memory 130 in step S1109.

Once the link is established, preferably by means of direct memory access, the data backup process environment 200 controls to copy data from the memories previously used by virtual machines, including memory 141 of virtual machine VM 1 used by the application APP1, to the non-volatile memory 130 in step S1110, and to then copy the data stored in the non-volatile memory 130 to the storage device 120 in step S1111, including the data copied from the memories previously used by virtual machines, including memory 141 of virtual machine VM 1 used by the application APP1 (and potentially also including generated verification data, in some exemplary embodiments). Then, the computer system 100 shuts down in step S112.

Figure 15:
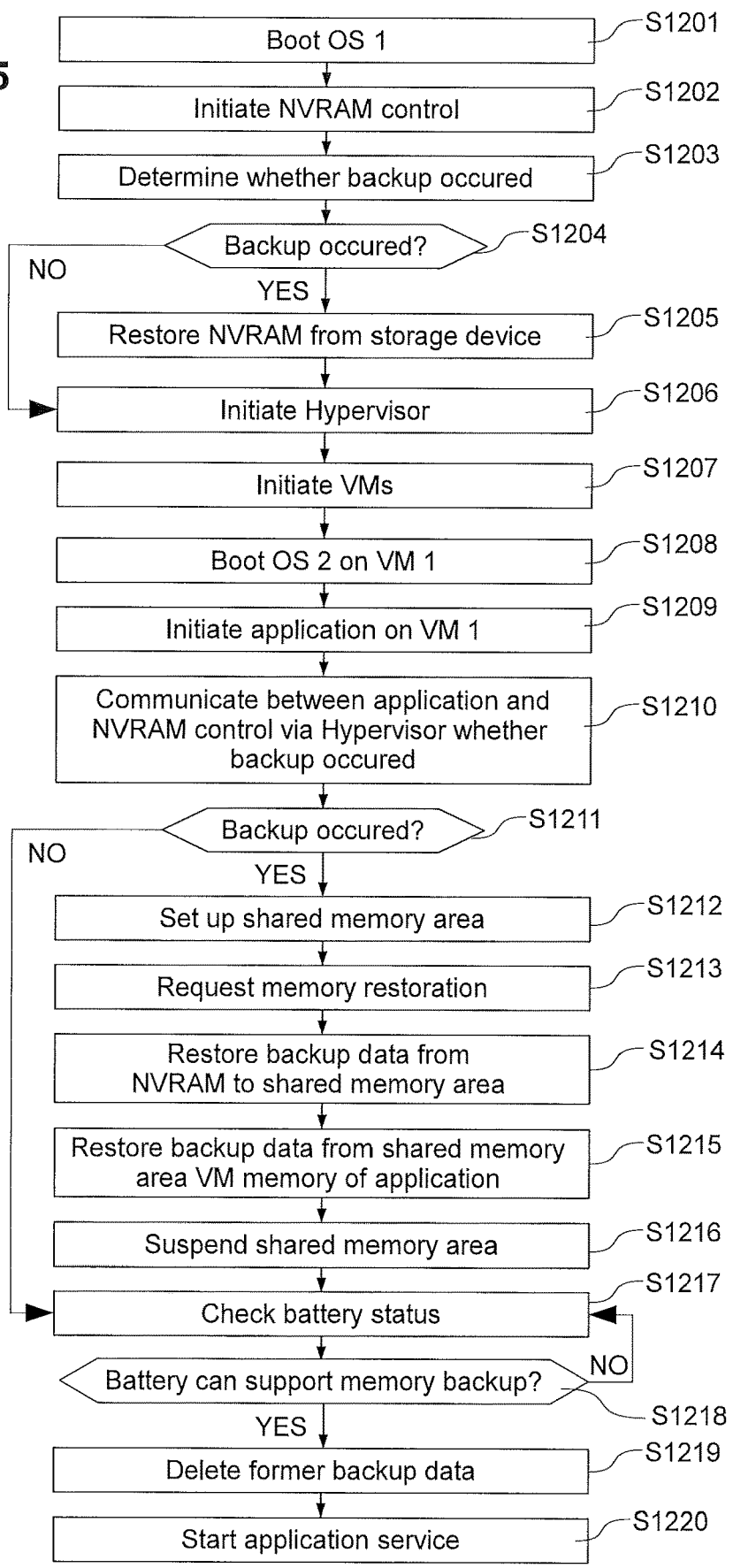
FIG. 15 is an exemplary logic flow diagram schematically showing another data restoration process in accordance with further exemplary embodiments.

FIG. 15 is an exemplary logic flow diagram schematically showing another data restoration process in accordance with further exemplary embodiments, based on FIGS. 13A to 13F.

In step S1201, the operating system OS 1 is booted on the computer system 100, and the NVRAM control is initiated in step S1202 by starting the control software component NVRAM CONTROL on the operating system OS 1. Then, the control software component NVRAM CONTROL determines whether a data backup process has occurred prior to the last shutdown in step S1203, e.g. based on system information, and if a data backup process has occurred (step S1204 returns YES), the control software component NVRAM CONTROL controls a data restoration process in which the backup data is restored/copied from the storage device 120 to the non-volatile memory 130 in step S1205.

Then or meanwhile, the hypervisor is initiated in step S1206 (also in case step S1204 gives NO, then skipping step S1205), and starts to provide the virtual machines including VM 1 in step S1207. Then, the operating system OS 2 is booted on the virtual machine VM 1 and the application APP1 is initiated on the operating system OS 2 on virtual machine VM 1 in steps S1208 and S1209.

Upon being initialized, the application APP1 communicates with the control software component NVRAM CONTROL indirectly via the hypervisor whether a data backup has occurred or whether a data restoration process is required in step S1210, e.g. by requesting backup information data, and upon receiving a response from the control software component NVRAM CONTROL indirectly via the hypervisor, the application APP1 determines whether a data backup has occurred or whether a data restoration process is required in step S1211.

If step S1211 returns YES, the application APP1 sets up the communication memory area 500 in step S1212 and requests memory restoration in step S1213 (as exemplarily explained above by requesting the control software component NVRAM CONTROL indirectly via the hypervisor to observe the communication memory area 500, and requesting restoration of data via the interface control memory area 501 of the communication memory area 500). Otherwise, if step S1211 gives NO, the application APP 1 continues with step S1217 (or directly with step S1220, note that step S1219 would also be skipped if step S1211 gives NO in any case because no backup data should exist in this situation).

The control software component NVRAM CONTROL copies, in response to the request, the backup data from the non-volatile memory 130 or from the storage device 120 to the backup data memory area 502 of the of the communication memory area 500 in step S1214, either as a whole or in chunks in multiple repeated steps S1213, S1214 and S1215, wherein step S1215 includes the control of copying the backup data from the backup data memory area 502 of the of the communication memory area 500 to the memory 141 of the virtual machine VM 1 by the application APP 1. After the restoration process is complete and all data is restored to the memory 141 of the virtual machine VM 1 by the application APP 1, the application APP 1 suspends the communication memory area 500 in step S1216 and exemplarily checks the battery status of the battery unit in step S1217.

If the battery status indicates that the battery can support at least one more data backup process (step S1218 gives YES), the application APP 1 continues to request deletion of the backup data by the control software component NVRAM CONTROL in the non-volatile memory 130 and/or the storage device 120 in step S1219 to delete the formed backup data, and starts the application services in step S1220. Otherwise, if step S1218 gives NO, the application APP 1 waits and then repeats steps S1217 and S1218.

As will be appreciated by one of skill in the art, the present invention and aspects and exemplary embodiments, as described hereinabove and in connection with the accompanying figures, may be embodied as a method (e.g., a computer-implemented process, a business process, or any other process), apparatus (including a device, machine, system, computer program product, and/or any other apparatus), or a combination of the foregoing.

Accordingly, exemplary embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages generated, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. A storage control system being configured to provide both of file-level storage services and block-level storage services to one or more host computers connectable to the storage control system, the storage control system comprising:
- a programmable logic device including (i) a first I/O unit configured to receive file-level storage related requests from the one or more host computers and (ii) one or more programmable hardware-implemented processing units configured to process file-level storage related requests received from the one or more host computers by the first I/O unit and to create first block-level storage related requests corresponding to the file-level storage related requests;
- a computer system configured to communicate with the programmable logic device and to manage both of the file-level storage services and the block-level storage services, the computer system including (iii) a second I/O unit configured to receive second block-level storage related requests from the one or more host computers and (iv) a processor unit configured to execute a first operating system and further software components executed on the first operating system; and
- a battery unit configured to supply electric energy to the computer system and the programmable logic device in case of an external power failure;
- wherein the software components executed on the first operating system of the processor unit include a block-level storage management software configured to manage the block-level storage services related to the first block-level storage related requests sent from the programmable logic device and the second block-level storage related requests sent from the second I/O unit, and the software components further include a virtualization management software configured to manage one or more virtual machines on the computer system and to communicate with the block-level storage management software,
- wherein one of the virtual machines managed by the virtualization management software is configured to execute a second operating system and a file-level storage management software executed on the second operating system, the file-level storage management software being configured to communicate with the programmable hardware-implemented processing units of the programmable logic device and to manage the programmable hardware-implemented processing units of the programmable logic device for providing the file-level storage services related to file-level storage related requests,
- wherein the computer system includes a first memory unit to temporarily store data and a storage unit including one or more storage devices, and the programmable logic device includes a second memory unit to temporarily store data,
- wherein an interface unit of the programmable logic device is configured to transmit the first block-level storage related requests converted from corresponding file-level storage related requests to the computer system,
- wherein, in case of an external power failure and when being supplied with electric energy from the battery unit, the storage control system is configured to perform a data backup process including copying data stored in the first memory unit of the computer system as first backup data and data stored in the second memory unit of the programmable logic device as second backup data to one or more storage devices of the storage unit of the computer system, and
- wherein copying data in the data backup process includes copying the second backup data from the second memory unit of the programmable logic device to the first memory unit of the computer system, stopping supply of electric energy from the battery unit to the programmable logic device, and thereafter copying the first backup data and the second backup data from the first memory unit of the computer system to the one or more storage devices of the storage unit of the computer system.

2. The storage control system according to claim 1, wherein
the file-level storage management software, the programmable logic device or the at least one of the one or more programmable hardware-implemented processing units of the programmable logic device is configured to convert the file-level storage related requests received by the first I/O unit to the corresponding first block-level storage related requests on the basis of file system metadata.

3. The storage control system according to claim 1, further comprising
a power failure detection unit configured to detect an occurrence of an external power failure;
wherein, when the power failure detection unit detects an occurrence of an external power failure, the programmable logic device is configured to operate in a low power mode including deactivation of portions not involved in the execution of the data backup process; and/or
wherein, when the power failure detection unit detects an occurrence of an external power failure, the computer system is configured to reboot to a data backup state in which the processor unit of the computer system is configured to execute a data backup process environment configured to perform the data backup process,
wherein the computer system, upon being rebooted to the data backup state, is configured to obtain data stored in the second memory unit of the programmable logic device including the second backup data, in particular via direct memory access.

4. The storage control system according to claim 1, wherein
the programmable logic device is configured to generate redundant verification data for the data stored in the second memory unit of the programmable logic device, in particular for the second backup data,
wherein the generated redundant verification data is copied together with the data stored in the second memory unit of the programmable logic device in the data backup process, in particular the second backup data and redundant verification data associated with the second backup data.

5. The storage control system according to claim 1, wherein, when restarting after an external power failure, the computer system is configured to determine whether data restoration to the first memory unit from the one or more storage devices of the storage unit is required, and to copy at least the first backup data or both of the first and second backup data from the one or more storage devices of the storage unit to the first memory unit; and/or when restarting after an external power failure, the file-level storage management software is configured to determine whether data restoration to the second memory unit is required, in particular by inquiring the first operating system or the block-level management software indirectly via the virtualization management software, and to manage or request a data restoration process of restoring the second backup data to the second memory unit.

6. The storage control system according to claim 5, wherein,
in the data restoration process, the programmable logic device is configured to generate redundant verification data for the second backup data restored from the first memory unit or the one or more storage devices of the storage unit, and the programmable logic device or the file-level storage management software is configured to compare the generated redundant verification data with redundant verification data generated for the second backup data in the data backup process.

7. The storage control system according to claim 1, wherein,
when restarting after an external power failure, the computer system is configured to provide a shared communication storage memory area for data restoration of the second backup data, the shared communication storage memory area being accessible by each of the file-level storage management software and the block-level storage management software for data restoration to the second memory unit, in particular via direct memory access.

8. The storage control system according to claim 7, wherein
the shared communication storage memory area includes an interface control memory area and a backup data memory area; and
wherein the file-level storage management software and the block-level storage management software are configured to exchange backup process protocol commands and backup process protocol responses by access to the interface control memory area,
wherein the block-level storage management software is configured to copy the second backup data from the first memory unit or the one or more storage devices to the backup data memory area of the shared communication storage memory area, and/or
wherein the file-level storage management software is configured to copy the second backup data from the backup data memory area of the shared communication storage memory area to the second memory unit.

9. The storage control system according to claim 1, wherein,
when restarting after an external power failure and after restoring the second backup data to the second memory unit, the file-level storage management software is configured to detect a battery status of the battery unit of the computer system, and to start providing file-level storage services to the one or more host computers when it is detected that the battery unit is able to support another data backup process to backup data stored in the second memory unit.

10. The storage control system according to claim 1, comprising a first node and a second node communicably connectable to the first node,
wherein the first node includes the computer system including the second I/O unit, the processor unit, the first memory unit, and the storage unit; and the programmable logic device including the first I/O unit, a first interface unit interfacing with the computer system, the one or more programmable hardware-implemented processing units, and the second memory unit; and the second node comprises:
a second programmable logic device including (i) a third I/O unit, configured to receive file-level storage related requests from the one or more host computers and (ii) one or more second programmable hardware-implemented processing units configured to process file-level storage related requests received from the one or more host computers by the third I/O unit and to create first block-level storage related requests corresponding to the file-level storage related requests; and
a second computer system configured to communicate with the second programmable logic device by interfacing with a second interface unit of the second programmable logic device and to manage both of file-level storage services and block-level storage services, the second computer system including (iii) a fourth i/O unit configured to receive second block-level storage related requests from the one or more host computers and (iv) a second processor unit configured to execute a third operating system and further software components executed on the third operating system;
wherein the software components executed on the third operating system of the second processor unit include a second block-level storage management software configured to manage the block-level storage services related to the first block-level storage related requests sent from the programmable logic device and the second block-level storage related requests sent from the fourth I/O unit, the software components further include and a second virtualization management software configured to manage one or more virtual machines on the second computer system and to communicate with the second block-level storage management software; and
wherein one of the virtual machines managed by the second virtualization management software is configured to execute a fourth operating system and a second file-level storage management software executed on the fourth operating system, the second file-level storage management software being configured to communicate with the second programmable hardware-implemented processing units of the second programmable logic device and to manage the one or more second programmable hardware-implemented processing units of the second programmable logic device for providing the file-level storage services related to file-level storage related requests;
wherein the second node further comprises a second battery unit configured to supply electric energy to the second computer system and the second programmable logic device in case of an external power failure;
wherein the second computer system includes a third memory unit to temporarily store data and a second storage unit including one or more storage devices, and the second programmable logic device includes a fourth memory unit to temporarily store data;
wherein, in case of an external power failure and when being supplied with electric energy from the second battery unit, the second node is configured to perform a data backup process including copying data stored in the third memory unit of the second computer system as third backup data and data stored in the fourth memory unit of the second programmable logic device as fourth backup data to one or more storage devices of the second storage unit of the second computer system; and wherein the programmable logic device of the first node is communicably connectable to the second programmable logic device of the second node, and the storage control system is configured to manage the fourth memory unit of the second node as a data mirror of the second memory unit of the first node.

11. The storage control system according to claim 10, wherein, in a data restoration process of restoring the second backup data to the second memory unit performed at the first node, when it is determined that an error occurred based on a comparison of redundant verification data generated for the second backup data during the data backup process and redundant verification data generated for the second backup data during the data restoration process in the first node, the storage control system is configured to restore at least part of the second backup data to the second memory unit in the first node on the basis of the fourth backup data from the second node, and/or when restarting after an external power failure and after restoring the second backup data to the second memory unit in the first node, the file-level storage management software of the first node is configured to detect a battery status of the first battery unit of the first node and the battery status of the second battery unit of the second node, and to start providing file-level storage services to the one or more host computers when it is detected that at least one of the first battery unit of the first node and the second battery unit of the second node is able to support another data backup process.

12. A control method for controlling a storage control system being configured to provide both of file-level storage services and block-level storage services to one or more host computers connectable to the storage control system, the storage control system comprising:

a programmable logic device including (i) a first I/O unit configured to receive file-level storage related requests from the one or more host computers and (ii) one or more programmable hardware-implemented processing units configured to process file-level storage related requests received from the one or more host computers by the first I/O unit and to create first block-level storage related requests corresponding to the file-level storage related requests;

a computer system interfacing configured to communicate with the programmable logic device and to manage both of the file-level storage services and the block-level storage services, the computer system including (iii) a second I/O unit configured to receive second block-level storage related requests from the one or more host computers and (iv) a processor unit configured to execute a first operating system and further software components executed on the first operating system; and a battery unit configured to supply electric energy to the computer system and the programmable logic device in case of an external power failure;

the control method comprising:

executing the software components on the first operating system of the processor unit including executing a block-level storage management software for managing the block-level storage services related to the first block-level storage related requests sent from the programmable logic device and the second block-level storage related requests sent from the second I/O unit, and executing a virtualization management software for managing one or more virtual machines on the computer system and for communicating with the block-level storage management software; and executing, on one of the virtual machines managed by the virtualization management software, a second operating system and a file-level storage management software executed on the second operating system, the file-level storage management software communicating with the programmable hardware-implemented processing units of the programmable logic device and managing the programmable hardware-implemented processing units of the programmable logic device for providing the file-level storage services related to file-level storage related requests;

wherein the computer system includes a first memory unit to temporarily store data and a storage unit including one or more storage devices, and the programmable logic device includes a second memory unit to temporarily store data, wherein an interface unit of the programmable logic device is configured to transmit the first block-level storage related requests converted from corresponding file-level storage related requests to the computer system, wherein, in case of an external power failure and when being supplied with electric energy from the battery unit, the storage control system is configured to perform a data backup process including copying data stored in the first memory unit of the computer system as first backup data and data stored in the second memory unit of the programmable logic device as second backup data to one or more storage devices of the storage unit of the computer system, and wherein copying data in the data backup process includes copying the second backup data from the second memory unit of the programmable logic device to the first memory unit of the computer system, stopping supply of electric energy from the battery unit to the programmable logic device, and thereafter copying the first backup data and the second backup data from the first memory unit of the computer system to the one or more storage devices of the storage unit of the computer system.

13. A computer program product comprising computer-readable program instructions which, when running on or loaded into a storage control system, cause the storage control system to execute a control method for controlling the storage control system to provide both of file-level storage services and block-level storage services to one or more host computers connectable to the storage control system, the storage control system comprising:

a programmable logic device including (i) a first I/O unit configured to receive file-level storage related requests from the one or more host computers, and (ii) one or more programmable hardware-implemented processing units configured to process file-level storage related requests received from the one or more host computers by the first I/O unit and to create first block-level storage related requests corresponding to the file-level storage related requests;
a computer system configured to communicate with the programmable logic device and to manage both of the file-level storage services and the block-level storage services, the computer system including (iii) a second I/O unit configured to receive second block-level storage related requests from the one or more host computers and a (iv) processor unit configured to execute a first operating system and further software components executed on the first operating system; and
a battery unit configured to supply electric energy to the computer system and the programmable logic device in case of an external power failure;
the control method comprising:
  executing the software components on the first operating system of the processor unit including executing a block-level storage management software for managing the block-level storage services related to the first block-level storage related requests sent from the programmable logic device and the second block-level storage related requests sent from the second I/O unit, and executing a virtualization management software for managing one or more virtual machines on the computer system and for communicating with the block-level storage management software; and
  executing, on one of the virtual machines managed by the virtualization management software, a second operating system and a file-level storage management software executed on the second operating system, the file-level storage management software communicating with the programmable hardware-implemented processing units of the programmable logic device and managing the programmable hardware-implemented processing units of the programmable logic device for providing the file-level storage services related to file-level storage related requests,
wherein the computer system includes a first memory unit to temporarily store data and a storage unit including one or more storage devices, and the programmable logic device includes a second memory unit to temporarily store data,
wherein an interface unit of the programmable logic device is configured to transmit the first block-level storage related requests converted from corresponding file-level storage related requests to the computer system,
wherein, in case of an external power failure and when being supplied with electric energy from the battery unit the storage control system is configured to perform a data backup process including copying data stored in the first memory unit of the computer system as first backup data and data stored in the second memory unit of the programmable logic device as second backup data to one or more storage devices of the storage unit of the computer system, and
wherein copying data in the data backup process includes copying the second backup data from the second memory unit of the programmable logic device to the first memory unit of the computer system, stopping supply of electric energy from the battery unit to the programmable logic device and thereafter copying the first backup data and the second backup data from the first memory unit of the computer system to the one or more storage devices of the storage unit of the computer system.

* * * * *